US010676016B2

(12) United States Patent
Kasaba et al.

(10) Patent No.: US 10,676,016 B2
(45) Date of Patent: Jun. 9, 2020

(54) CONTROL DEVICE FOR VEHICLE LAMP, AND VEHICLE LAMP SYSTEM

(71) Applicant: Koito Manufacturing Co., Ltd., Tokyo (JP)

(72) Inventors: Yusuke Kasaba, Shizuoka (JP); Masashi Yamazaki, Shizuoka (JP); Atsushi Toda, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 204 days.

(21) Appl. No.: 15/641,253

(22) Filed: Jul. 4, 2017

(65) Prior Publication Data
US 2017/0297477 A1 Oct. 19, 2017

Related U.S. Application Data

(63) Continuation of application No. PCT/JP2016/050058, filed on Jan. 5, 2016.

(30) Foreign Application Priority Data

Jan. 14, 2015 (JP) .................................. 2015-005108
Jan. 22, 2015 (JP) .................................. 2015-010181
Feb. 3, 2015 (JP) .................................. 2015-019468

(51) Int. Cl.
*B60Q 1/08* (2006.01)
*B60Q 1/115* (2006.01)

(52) U.S. Cl.
CPC ................ *B60Q 1/08* (2013.01); *B60Q 1/115* (2013.01); *B60Q 2300/112* (2013.01);
(Continued)

(58) Field of Classification Search
CPC .... B60Q 1/08; B60Q 1/115; B60Q 2300/112; B60Q 2300/114; B60Q 2300/116;
(Continued)

(56) References Cited

U.S. PATENT DOCUMENTS 6,193,398 B1 * 2/2001 Okuchi .................. B60Q 1/115
                                                    362/276
10,001,361 B2 * 6/2018 Yamashita ............... G01C 9/08
(Continued)

FOREIGN PATENT DOCUMENTS

CN         101508267 A      8/2009
CN         102785609 A     11/2012
(Continued)

OTHER PUBLICATIONS

Chinese Office Action (The First Office Action) dated Feb. 25, 2019 issued by the Chinese Patent Office in corresponding Chinese Patent Application No. 201680005893.6, with English translation (38 pages).
(Continued)

*Primary Examiner* — Sze-Hon Kong
(74) *Attorney, Agent, or Firm* — Buchanan Ingersoll & Rooney PC

(57) ABSTRACT

A vehicle-lamp control device includes a control unit that adjusts an optical axis with respect to a change in a total angle that includes a road surface angle and a vehicle attitude angle while the vehicle is at rest, and maintains the optical axis with respect to a change in the total angle while the vehicle is traveling. The control unit fixes the optical axis angle when a fault state of the control device is detected. Upon the control device having recovered from a fault state, the control unit generates an adjustment signal either upon estimating a current vehicle attitude angle on the basis of an output value from the tilt sensor obtained while the vehicle is traveling, or upon receiving a signal indicating a current vehicle attitude angle from an external device.

4 Claims, 20 Drawing Sheets

(52) U.S. Cl.
CPC .. *B60Q 2300/114* (2013.01); *B60Q 2300/116* (2013.01); *B60Q 2300/132* (2013.01); *B60Q 2300/146* (2013.01); *B60Q 2300/324* (2013.01)

(58) Field of Classification Search
CPC ........ B60Q 2300/132; B60Q 2300/146; B60Q 2300/324
See application file for complete search history.

(56) References Cited

U.S. PATENT DOCUMENTS

| | | | |
|---|---|---|---|
| 2003/0038537 A1 | 2/2003 | Okai | |
| 2003/0107898 A1* | 6/2003 | Smith | B60Q 1/10 362/465 |
| 2005/0002195 A1* | 1/2005 | Katayama | B60Q 1/115 362/460 |
| 2010/0014302 A1* | 1/2010 | Okumura | B60Q 1/10 362/466 |
| 2010/0194549 A1 | 8/2010 | Tonokawa et al. | |
| 2012/0101692 A1* | 4/2012 | Kasaba | B60Q 1/10 701/49 |
| 2012/0155098 A1* | 6/2012 | Kasaba | B60Q 1/10 362/466 |
| 2013/0308326 A1* | 11/2013 | Kasaba | B60Q 1/10 362/465 |
| 2014/0286025 A1* | 9/2014 | Kamitani | B60Q 1/115 362/466 |
| 2016/0288698 A1* | 10/2016 | Foltin | B60Q 1/10 |
| 2016/0339834 A1* | 11/2016 | Oshima | F21S 41/29 |
| 2017/0129390 A1* | 5/2017 | Akaza | F21S 41/657 |

FOREIGN PATENT DOCUMENTS

| | | |
|---|---|---|
| EP | 2 402 212 | 1/2012 |
| EP | 2 664 494 | 11/2013 |
| EP | 2 724 889 | 4/2014 |
| JP | H06-074968 A | 3/1994 |
| JP | 2002-022766 A | 1/2002 |
| JP | 2005-291860 A | 10/2005 |
| JP | 2009-269558 A | 11/2009 |
| JP | 2012-030782 A | 2/2012 |
| JP | 2012-030783 A | 2/2012 |
| JP | 2012-126232 A | 7/2012 |
| JP | 2014-100979 A | 6/2014 |

OTHER PUBLICATIONS

International Search Report from International Application No. PCT/JP2016/050058, dated Mar. 22, 2016.
International Preliminary Report on Patentability from International Application No. PCT/JP2016/050058, dated Mar. 22, 2016 (in Japanese); English translation issued on Jul. 18, 2017.
Extended European Search Report from corresponding EP patent application No. 16737230.9, dated Dec. 13, 2018.
Office Action dated Nov. 4, 2019 in corresponding Chinese Patent Application No. 201680005893.6 with English Translation, 17 pages.
Japanese Office Action and English Translation issued in corresponding Japanese Application No. 2016-569300, dated Dec. 3, 2019 (5 pages).

* cited by examiner

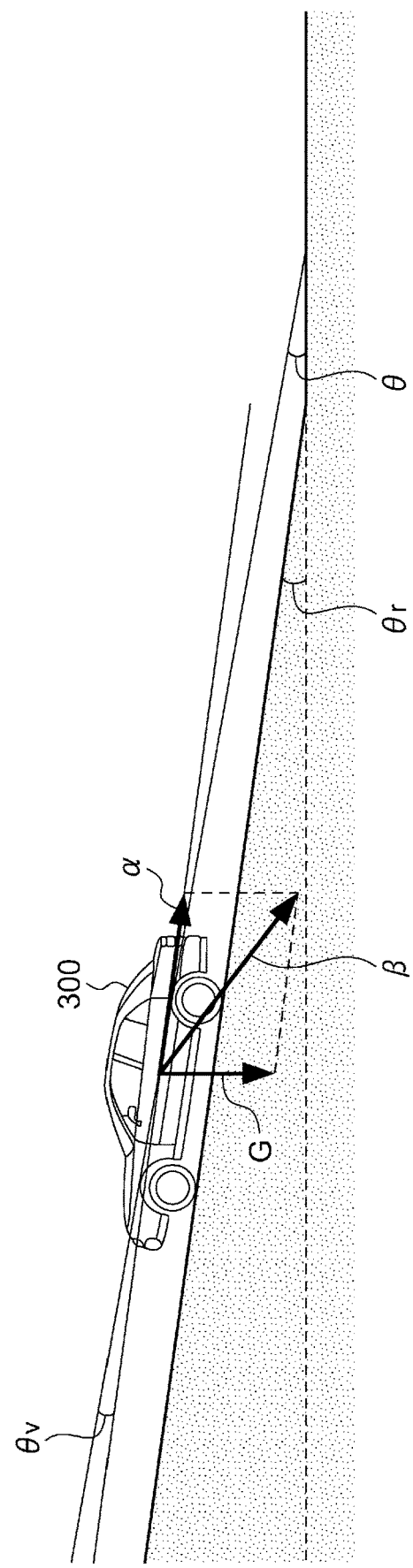

FIG. 15
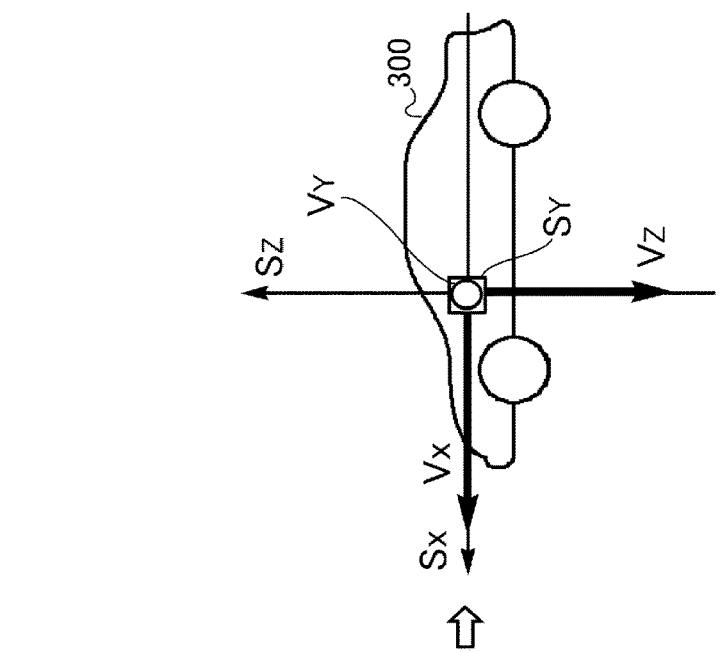
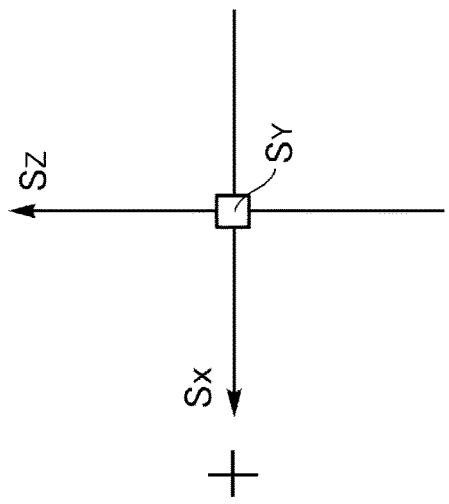
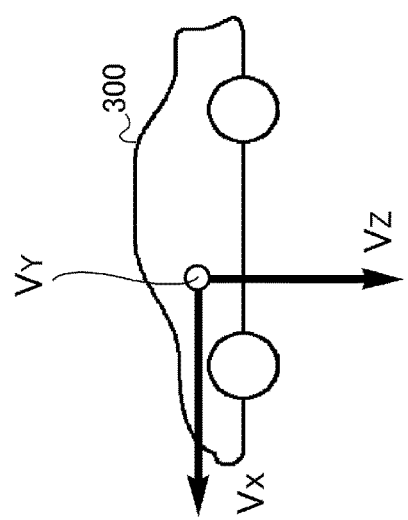

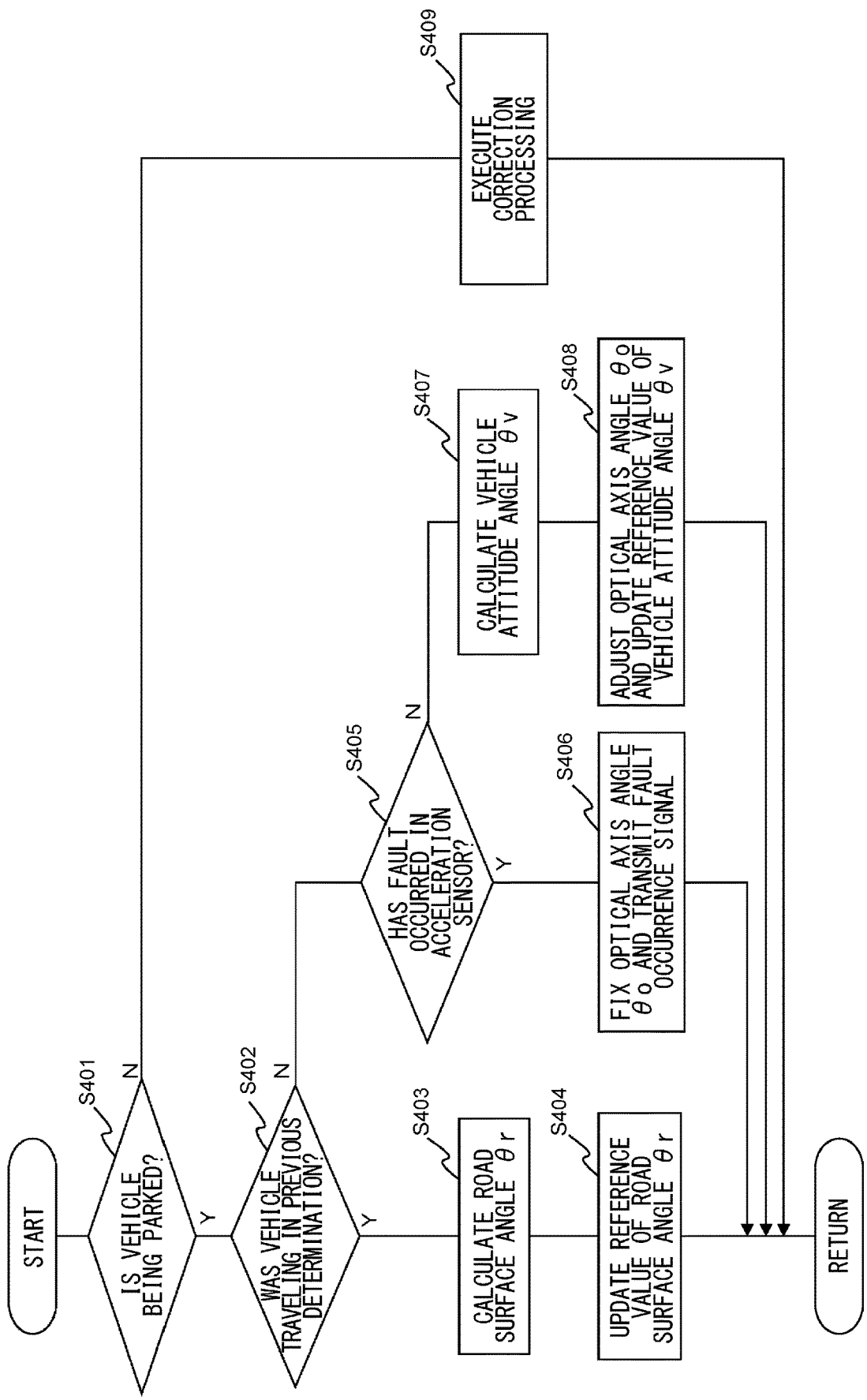

CONTROL DEVICE FOR VEHICLE LAMP, AND VEHICLE LAMP SYSTEM

CROSS-REFERENCE TO RELATED APPLICATIONS

This application is based upon and claims the benefit of priority from the prior Japanese Patent Application No. 2015-005108, filed on Jan. 14, 2015, Japanese Patent Application No. 2015-010181, filed on Jan. 22, 2015, Japanese Patent Application No. 2015-019468, filed on Feb. 3, 2015, and International Patent Application No. PCT/JP2016/050058, filed on Jan. 5, 2016, the entire content of each of which is incorporated herein by reference.

BACKGROUND

Field of the Invention

The present invention relates to control devices for vehicle lamps, and to vehicle lamp systems, and in particular relates to a control device for a vehicle lamp and vehicle lamp systems used in automobiles and the like.

Description of the Related Art

Conventionally, self-leveling control is known in which the position of an optical axis of a vehicle headlamp is adjusted automatically in accordance with the angle of inclination of the vehicle and the direction in which the headlamps shine is changed. In the self-leveling control, generally, the position of the optical axis of the headlamp is adjusted on the basis of the pitch angle of the vehicle derived from an output value from a vehicle-height sensor. In contrast, patent documents 1 and 2 disclose a control device for a vehicle lamp that carries out self-leveling control with the use of a tilt sensor, such as an acceleration sensor.

Patent document 1: JP2012-030782
Patent document 2: JP2012-030783

A self-leveling system can be made less expensive and more lightweight when a tilt sensor, such as an acceleration sensor, a gyro sensor (angular velocity sensor, angular acceleration sensor), or a geomagnetic sensor, is used than when a vehicle-height sensor is used. This can serve to reduce the cost and lighten the weight of the vehicle as a result. Meanwhile, there is a demand that the performance of self-leveling control be enhanced even when a tilt sensor, such as an acceleration sensor, is used. In addition, there is a demand that the accuracy of self-leveling control be increased even when a tilt sensor, such as an acceleration sensor, is used.

Through diligent examinations to enhance the performance of self-leveling control, the present inventors have come to an understanding that conventional control devices for vehicle lamps have room for enhanced performance of self-leveling control. In addition, the present inventors have come to an understanding that conventional control devices have room for increased accuracy of self-leveling control.

SUMMARY OF THE INVENTION

One single objective of the present invention, brought about in view of such circumstances, is to make available technology for enhancing performance in self-leveling control of vehicle lamps.

Another single objective of the present invention is to make available technology for enhancing accuracy in self-leveling control of vehicle lamps.

An aspect of the present invention provides a control device for a vehicle lamp. The control device includes a reception unit that receives a signal indicating an output value from a tilt sensor enabled for deriving a total angle, the total angle being an angle of inclination of a vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; and a control unit that executes control, the control including holding a road surface angle reference value and a vehicle attitude angle reference value, generating an adjustment signal for an optical axis angle of the vehicle lamp with respect to a change in the total angle while the vehicle is at rest, storing a vehicle attitude angle obtained by including an amount of change in the total angle into the vehicle attitude angle reference value as a new reference value, avoiding generation or output of an adjustment signal or outputting a maintaining signal instructing that the optical axis angle be maintained with respect to a change in the total angle while the vehicle is traveling, and storing a road surface angle obtained by including an amount of change in the total angle into the road surface angle reference value as a new reference value. The control unit includes a fault detecting unit that detects the control device for the vehicle lamp having entered a fault state and having recovered from the fault state and fixes the optical axis angle to a current angle or a predetermined reference angle when the fault detecting unit detects the control device having entered the fault state. Upon the fault detecting unit detecting the control device having recovered from the fault state, either the control unit estimates a current vehicle attitude angle on the basis of the output value from the tilt sensor obtained while the vehicle is traveling, releases the state in which the optical axis angle is fixed, and generates the adjustment signal by using the estimated vehicle attitude angle, or the control unit receives a signal indicating a current vehicle attitude angle from an external device, releases the state in which the optical axis angle is fixed, and generates the adjustment signal by using the received vehicle attitude angle.

Another aspect of the present invention provides a vehicle lamp system. The vehicle lamp system includes a vehicle lamp with an adjustable optical axis; a tilt sensor enabled for deriving a total angle, the total angle being an angle of inclination of a vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; and a control device that controls an adjustment of an optical axis angle of the vehicle lamp. The control device includes a reception unit that receives a signal indicating an output value from the tilt sensor, and a control unit that executes control, the control including holding a road surface angle reference value and a vehicle attitude angle reference value, generating an adjustment signal for the optical axis angle of the vehicle lamp with respect to a change in the total angle while the vehicle is at rest, storing a vehicle attitude angle obtained by including an amount of change in the total angle into the vehicle attitude angle reference value as a new reference value, avoiding generation or output of an adjustment signal or outputting a maintaining signal instructing that the optical axis angle be maintained with respect to a change in the total angle while the vehicle is traveling, and storing a road surface angle obtained by including an amount of change in the total angle into the road surface angle reference value as a new reference value. The control unit includes a fault detecting unit that detects the control device having entered a fault state and having recovered from the fault state and fixes the optical axis angle to a current angle or a predetermined reference angle when the fault detecting unit detects the control device having entered the fault state. Upon the fault detecting unit detecting the control device having recovered from the fault state, either the control unit estimates a current vehicle attitude angle on the basis of the output value from the tilt sensor obtained while the vehicle is traveling, releases the state in which the optical axis angle is fixed, and generates the adjustment signal by using the estimated vehicle attitude angle, or the control unit receives a signal indicating a current vehicle attitude angle from an external device, releases the state in which the optical axis angle is fixed, and generates the adjustment signal by using the received vehicle attitude angle.

Another aspect of the present invention provides a control device for a vehicle lamp. The control device includes a reception unit that receives a signal indicating an output value from a tilt sensor having a self-failure-diagnosis function; and a control unit that derives either an angle of inclination of a vehicle or an amount of change in the angle by using the output value from the tilt sensor and that outputs an adjustment signal for an optical axis angle of the vehicle lamp. The control unit includes a diagnosis instructing unit that outputs to the tilt sensor a signal instructing execution of a failure diagnosis (execution-instructing signal). The diagnosis instructing unit outputs the execution-instructing signal when the vehicle is in a stable state in which an amount of change in the output value from the tilt sensor is no greater than a predetermined amount.

Another aspect of the present invention provides a vehicle lamp system. The vehicle lamp system includes a vehicle lamp with an adjustable optical axis; a tilt sensor having a self-failure-diagnosis function; and a control device that controls an adjustment of an optical axis angle of the vehicle lamp. The control device includes a reception unit that receives a signal indicating an output value from the tilt sensor, and a control unit that derives either an angle of inclination of a vehicle or an amount of change in the angle by using the output value from the tilt sensor and that outputs an adjustment signal for an optical axis angle of the vehicle lamp. The control unit includes a diagnosis instructing unit that outputs to the tilt sensor an execution-instructing signal of a failure diagnosis. The diagnosis instructing unit outputs the execution-instructing signal when the vehicle is in a stable state in which an amount of change in the output value is no greater than a predetermined amount.

Another aspect of the present invention provides a control device for a vehicle lamp. The control device includes a reception unit that receives a signal indicating an output value from a vehicle-speed sensor provided in a vehicle and a signal indicating an output value from an acceleration sensor provided in the vehicle; and a control unit that derives either an angle of inclination of the vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between an acceleration derived from the output value from the vehicle-speed sensor and an acceleration in a front-and-back direction of the vehicle derived from the output value from the acceleration sensor obtained while the vehicle is traveling.

Another aspect of the present invention provides a vehicle lamp system. The vehicle lamp system includes a vehicle lamp with an adjustable optical axis; a vehicle-speed sensor; an acceleration sensor; and a control device that controls an adjustment of an optical axis angle of the vehicle lamp. The control device includes a reception unit that receives a signal indicating an output value from the vehicle-speed sensor and an output value from the acceleration sensor, and a control unit that derives either an angle of inclination of a vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between an acceleration derived from the output value from the vehicle-speed sensor and an acceleration in a front-and-back direction of the vehicle derived from the output value from the acceleration sensor obtained while the vehicle is traveling.

Another aspect of the present invention provides a control device for a vehicle lamp. The control device includes a reception unit that receives a signal indicating an output value from an acceleration sensor provided in a vehicle; and a control unit that derives either an angle of inclination of the vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between a gravitational acceleration at a position where the vehicle is present and an acceleration in a top-and-bottom direction of the vehicle derived from the output value from the acceleration sensor.

Another aspect of the present invention provides a vehicle lamp system. The vehicle lamp system includes a vehicle lamp with an adjustable optical axis; an acceleration sensor; and a control device that controls an adjustment of an optical axis angle of the vehicle lamp. The control device includes a reception unit that receives a signal indicating an output value from the acceleration sensor, and a control unit that derives either an angle of inclination of a vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between a gravitational acceleration at a position where the vehicle is present and an acceleration in a top-and-bottom direction of the vehicle derived from the output value from the acceleration sensor.

It is to be noted that an embodiment obtained by combining the elements described above as appropriate can also be encompassed by the scope of the invention for which patent protection is sought through the present patent application.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a schematic diagram for describing an acceleration vector produced in a vehicle and an angle of inclination of the vehicle that can be detected by a tilt sensor;

FIG. 15 is a schematic diagram for describing a relationship between a sensor coordinate system and a vehicle coordinate system according to Embodiment 4;

FIG. 20 is a flowchart illustrating an example of self-leveling control executed by a control device for a vehicle lamp according to Embodiment 6.

DETAILED DESCRIPTION OF THE INVENTION

Figure 1:
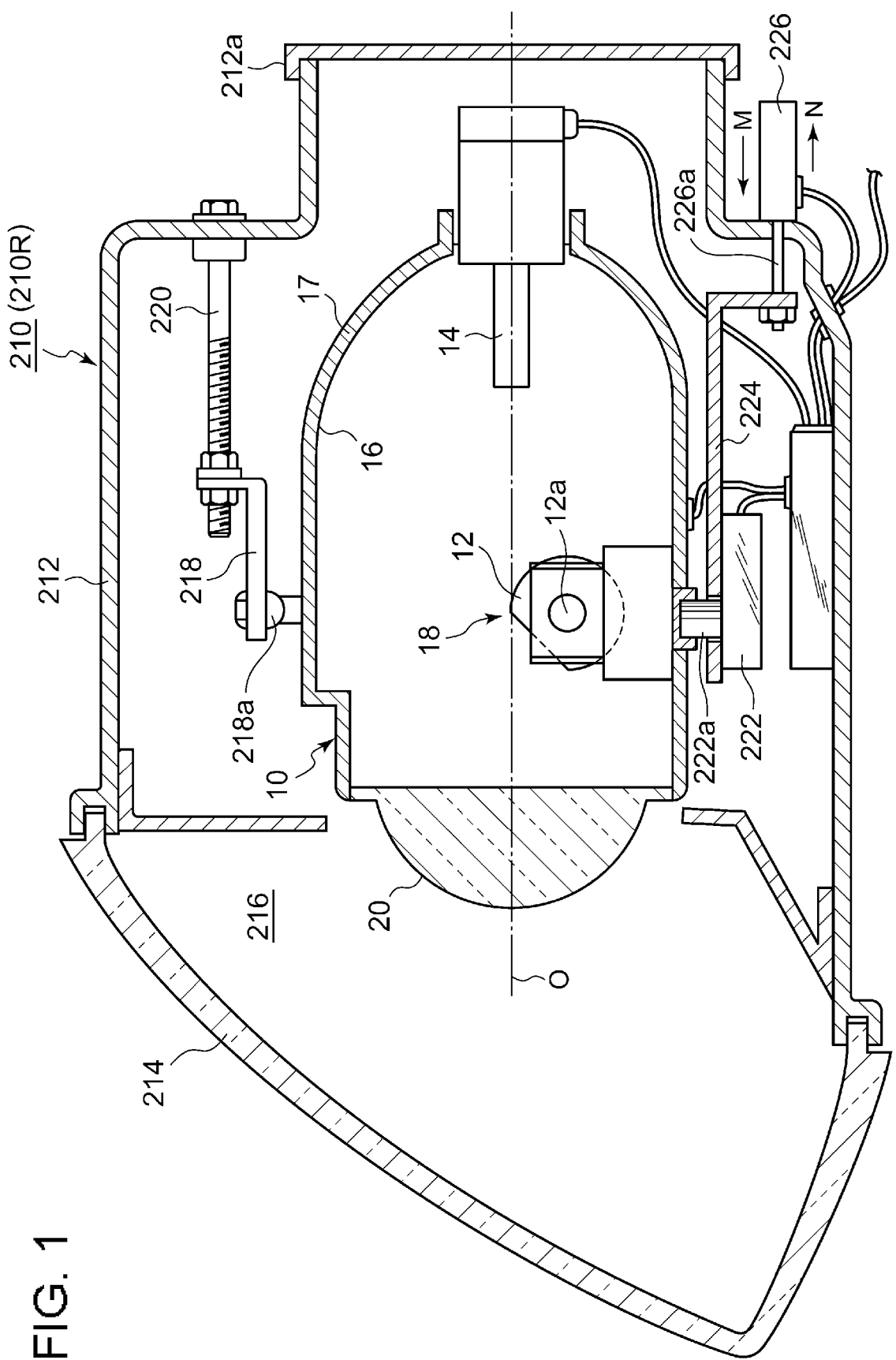
FIG. 1 is a schematic vertical sectional view of a headlamp unit that includes a vehicle lamp to be controlled by a control device according to each of the embodiments.

An embodiment of the present invention provides a control device for a vehicle lamp. The control device includes a reception unit that receives a signal indicating an output value from a tilt sensor enabled for deriving a total angle, the total angle being an angle of inclination of a vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; and a control unit that executes control, the control including holding a road surface angle reference value and a vehicle attitude angle reference value, generating an adjustment signal for an optical axis angle of the vehicle lamp with respect to a change in the total angle while the vehicle is at rest, storing a vehicle attitude angle obtained by including an amount of change in the total angle into the vehicle attitude angle reference value as a new reference value, avoiding generation or output of an adjustment signal or outputting a maintaining signal instructing that the optical axis angle be maintained with respect to a change in the total angle while the vehicle is traveling, and storing a road surface angle obtained by including an amount of change in the total angle into the road surface angle reference value as a new reference value. The control unit includes a fault detecting unit that detects the control device for the vehicle lamp having entered a fault state and having recovered from the fault state and fixes the optical axis angle to a current angle or a predetermined reference angle when the fault detecting unit detects the control device having entered the fault state. Upon the fault detecting unit detecting the control device having recovered from the fault state, either the control unit estimates a current vehicle attitude angle on the basis of the output value from the tilt sensor obtained while the vehicle is traveling, releases the state in which the optical axis angle is fixed, and generates the adjustment signal by using the estimated vehicle attitude angle, or the control unit receives a signal indicating a current vehicle attitude angle from an external device, releases the state in which the optical axis angle is fixed, and generates the adjustment signal by using the received vehicle attitude angle. According to the control device of this embodiment, the performance of self-leveling control of the vehicle lamp can be enhanced.

In the above embodiment, the tilt sensor may be an acceleration sensor capable of detecting an acceleration in a front-and-back direction of the vehicle and an acceleration in a top-and-bottom direction of the vehicle, and when estimating the vehicle attitude angle, the control unit may plot the output value obtained while the vehicle is traveling onto coordinates in which the acceleration in the front-and-back direction of the vehicle is set in a first axis and the acceleration in the top-and-bottom direction of the vehicle is set in a second axis and may estimate the vehicle attitude angle by using a slope of either a straight line or a vector obtained from a plurality of plotted points. The control device may further include a buffer amount changing unit that periodically changes the number of the output value used to derive either the straight line or the vector. With this configuration, the accuracy of the self-leveling control can be increased.

Another embodiment of the present invention provides a vehicle lamp system. The vehicle lamp system includes a vehicle lamp with an adjustable optical axis; a tilt sensor enabled for deriving a total angle, the total angle being an angle of inclination of a vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; and a control device that controls an adjustment of an optical axis angle of the vehicle lamp. The control device includes a reception unit that receives a signal indicating an output value from the tilt sensor, and a control unit that executes control, the control including holding a road surface angle reference value and a vehicle attitude angle reference value, generating an adjustment signal for the optical axis angle of the vehicle lamp with respect to a change in the total angle while the vehicle is at rest, storing a vehicle attitude angle obtained by including an amount of change in the total angle into the vehicle attitude angle reference value as a new reference value, avoiding generation or output of an adjustment signal or outputting a maintaining signal instructing that the optical axis angle be maintained with respect to a change in the total angle while the vehicle is traveling, and storing a road surface angle obtained by including an amount of change in the total angle into the road surface angle reference value as a new reference value. The control unit includes a fault detecting unit that detects the control device having entered a fault state and having recovered from the fault state and fixes the optical axis angle to a current angle or a predetermined reference angle when the fault detecting unit detects the control device having entered the fault state. Upon the fault detecting unit detecting the control device having recovered from the fault state, either the control unit estimates a current vehicle attitude angle on the basis of the output value from the tilt sensor obtained while the vehicle is traveling, releases the state in which the optical axis angle is fixed, and generates the adjustment signal by using the estimated vehicle attitude angle, or the control unit receives a signal indicating a current vehicle attitude angle from an external device, releases the state in which the optical axis angle is fixed, and generates the adjustment signal by using the received vehicle attitude angle.

Another embodiment of the present invention provides a control device for a vehicle lamp. The control device includes a reception unit that receives a signal indicating an output value from a tilt sensor having a self-failure-diagnosis function; and a control unit that derives either an angle of inclination of a vehicle or an amount of change in the angle by using the output value from the tilt sensor and that outputs an adjustment signal for an optical axis angle of the vehicle lamp. The control unit includes a diagnosis instructing unit that outputs to the tilt sensor a signal instructing execution of a failure diagnosis (execution-instructing signal). The diagnosis instructing unit outputs the execution-instructing signal when the vehicle is in a stable state in which an amount of change in the output value from the tilt sensor is no greater than a predetermined amount. According to the control device of this embodiment, the failure diagnosis of the tilt sensor can be carried out with higher accuracy. Thus, the possibility of failing to find a failure of the tilt sensor can be reduced, and thus the accuracy of the self-leveling control of the vehicle lamp can be increased.

In the above embodiment, the diagnosis instructing unit may periodically output the execution-instructing signal. In addition, in any of the above embodiments, the tilt sensor may be an acceleration sensor capable of detecting an acceleration in a front-and-back direction of the vehicle and an acceleration in a top-and-bottom direction of the vehicle; a total angle being derivable from the output value, the total angle being an angle of inclination of the vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; a value output during the failure diagnosis may be contained in the output value; the control unit may execute at least one of first control and second control, the first control including holding a road surface angle reference value and a vehicle attitude angle reference value, deriving the total angle by using the output value from the tilt sensor, outputting the adjustment signal with respect to a change in the total angle while the vehicle is at rest, storing a vehicle attitude angle obtained by including an amount of change in the total angle into the vehicle attitude angle reference value as a new reference value, avoiding generation or output of an adjustment signal or outputting a maintaining signal instructing that the optical axis angle be maintained with respect to a change in the total angle while the vehicle is traveling, and storing a road surface angle obtained by including an amount of change in the total angle into the road surface angle reference value as a new reference value, the second control including plotting the output value from the tilt sensor obtained while the vehicle is traveling onto coordinates in which the acceleration in the front-and-back direction of the vehicle is set in a first axis and the acceleration in the top-and-bottom direction of the vehicle is set in a second axis, deriving the vehicle attitude angle by using a slope of either a straight line or a vector obtained from a plurality of plotted points, and outputting the adjustment signal by using the obtained vehicle attitude angle; and the output value excluding the output value during the failure diagnosis may be used when the total angle is derived in the first control or when the vehicle attitude angle is derived in the second control.

In addition, in any of the above embodiments, the tilt sensor may be an acceleration sensor capable of detecting an acceleration in a front-and-back direction of the vehicle and an acceleration in a top-and-bottom direction of the vehicle; a total angle being derivable from the output value, the total angle being an angle of inclination of the vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; a value output during the failure diagnosis may be contained in the output value; the control unit may execute at least one of first control and second control, the first control including holding a road surface angle reference value and a vehicle attitude angle reference value, repeatedly deriving the total angle by using a plurality of the output values from the tilt sensor while the vehicle is at rest, outputting the adjustment signal with respect to a change in the total angle, storing a vehicle attitude angle obtained by including an amount of change in the total angle into the vehicle attitude angle reference value as a new reference value, avoiding generation or output of an adjustment signal or outputting a maintaining signal instructing that the optical axis angle be maintained while the vehicle is traveling with respect to a change in the total angle, and storing a road surface angle obtained by including an amount of change in the total angle before and after the vehicle moves into the road surface angle reference value as a new reference value when the vehicle is stopping, the second control including plotting the output value from the tilt sensor obtained while the vehicle is traveling onto coordinates in which the acceleration in the front-and-back direction of the vehicle is set in a first axis and the acceleration in the top-and-bottom direction of the vehicle is set in a second axis, deriving the vehicle attitude angle by using a slope of either a straight line or a vector obtained from a plurality of plotted points, and outputting the adjustment signal by using the obtained vehicle attitude angle; and the diagnosis instructing unit may output the execution-instructing signal such that a plurality of the output values used in a single instance of deriving the total angle in the first control or used in a single instance of deriving the vehicle attitude angle in the second control include the output value during the failure diagnosis in no greater than a predetermined number.

In addition, in any of the above embodiments, the control unit may include at least one of a halt detecting unit that detects a halt of the vehicle, a load change detecting unit that detects a passenger getting in or out of the vehicle or luggage being loaded onto or removed from the vehicle, and an ignition detecting unit that detects on/off of an ignition switch; and the diagnosis instructing unit may output the execution-instructing signal when at least one of a halt of the vehicle, a passenger getting in or out of the vehicle or luggage being loaded onto or removed from the vehicle, and a switch between on and off of the ignition switch is detected. With these embodiments, the accuracy of the self-leveling control can be increased even further.

Another embodiment of the present invention provides a vehicle lamp system. The vehicle lamp system includes a vehicle lamp with an adjustable optical axis; a tilt sensor having a self-failure-diagnosis function; and a control device that controls an adjustment of an optical axis angle of the vehicle lamp. The control device includes a reception unit that receives a signal indicating an output value from the tilt sensor, and a control unit that derives either an angle of inclination of a vehicle or an amount of change in the angle by using the output value from the tilt sensor and that outputs an adjustment signal for an optical axis angle of the vehicle lamp. The control unit includes a diagnosis instructing unit that outputs to the tilt sensor an execution-instructing signal of a failure diagnosis. The diagnosis instructing unit outputs the execution-instructing signal when the vehicle is in a stable state in which an amount of change in the output value is no greater than a predetermined amount.

Another embodiment of the present invention provides a control device for a vehicle lamp. The control device includes a reception unit that receives a signal indicating an output value from a vehicle-speed sensor provided in a vehicle and a signal indicating an output value from an acceleration sensor provided in the vehicle; and a control unit that derives either an angle of inclination of the vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between an acceleration derived from the output value from the vehicle-speed sensor and an acceleration in a front-and-back direction of the vehicle derived from the output value from the acceleration sensor obtained while the vehicle is traveling. According to this embodiment, a fault occurring in the acceleration sensor can be detected, and thus the accuracy of the self-leveling control of the vehicle lamp can be increased.

In the above embodiment, the acceleration sensor may be provided, and the acceleration sensor may detect accelerations along an X-axis, a Y-axis, and a Z-axis that are orthogonal to one another, the X-axis and a front-and-back axis of the vehicle may be nonparallel to each other, and at least either the Y-axis and a right-and-left axis of the vehicle or the Z-axis and a top-and-bottom axis of the vehicle may be nonparallel to each other. According to this embodiment, a fault on a plurality axes of the acceleration sensor can be determined, and thus the accuracy of the self-leveling control can be further increased.

Another embodiment of the present invention provides a vehicle lamp system. The vehicle lamp system includes a vehicle lamp with an adjustable optical axis; a vehicle-speed sensor; an acceleration sensor; and a control device that controls an adjustment of an optical axis angle of the vehicle lamp. The control device includes a reception unit that receives a signal indicating an output value from the vehicle-speed sensor and an output value from the acceleration sensor, and a control unit that derives either an angle of inclination of a vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between an acceleration derived from the output value from the vehicle-speed sensor and an acceleration in a front-and-back direction of the vehicle derived from the output value from the acceleration sensor obtained while the vehicle is traveling.

Another embodiment of the present invention provides a control device for a vehicle lamp. The control device includes a reception unit that receives a signal indicating an output value from an acceleration sensor provided in a vehicle; and a control unit that derives either an angle of inclination of the vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between a gravitational acceleration at a position where the vehicle is present and an acceleration in a top-and-bottom direction of the vehicle derived from the output value from the acceleration sensor. According to this embodiment as well, a fault occurring in the acceleration sensor can be detected, and thus the accuracy of the self-leveling control of the vehicle lamp can be increased.

In the above embodiment, the acceleration sensor may be provided, and the acceleration sensor may detect accelerations along an X-axis, a Y-axis, and a Z-axis that are orthogonal to one another, the Z-axis and the top-and-bottom axis of the vehicle may be nonparallel to each other, and at least either the X-axis and a front-and-back axis of the vehicle or the Y-axis and a right-and-left axis of the vehicle may be nonparallel to each other. According to this embodiment, a fault on a plurality axes of the acceleration sensor can be determined, and thus the accuracy of the self-leveling control can be further increased. In addition, in any of the above embodiments, the fault determining unit may execute a fault determination of the acceleration sensor while the vehicle is at rest. According to this embodiment, the accuracy of the fault determination of the acceleration sensor can be increased.

Another embodiment of the present invention provides a vehicle lamp system. The vehicle lamp system includes a vehicle lamp with an adjustable optical axis; an acceleration sensor; and a control device that controls an adjustment of an optical axis angle of the vehicle lamp. The control device includes a reception unit that receives a signal indicating an output value from the acceleration sensor, and a control unit that derives either an angle of inclination of a vehicle or an amount of change in the angle by using the output value from the acceleration sensor and that outputs an adjustment signal for an optical axis angle of the vehicle lamp. The control unit includes a fault determining unit that determines a fault of the acceleration sensor. The fault determining unit determines the fault of the acceleration sensor on the basis of a difference between a gravitational acceleration at a position where the vehicle is present and an acceleration in a top-and-bottom direction of the vehicle derived from the output value from the acceleration sensor.

Hereinafter, the present invention will be described on the basis of exemplary embodiments with reference to the drawings. Identical or equivalent constituent elements, members, and processes illustrated in the drawings are given identical reference characters, and duplicate descriptions thereof will be omitted as appropriate. In addition, the embodiments are not intended to limit the invention but illustrative in nature. Not all the features described in the embodiments and combinations thereof are necessarily essential to the invention.

In the present specification, the expression "while a vehicle is traveling" refers, for example, to a period from when the detection value (or the output value) of a vehicle-speed sensor, which will be described later, exceeds 0 to when the detection value of the vehicle-speed sensor becomes 0. The expression "when a vehicle is stopping" refers, for example, to a point at which the detection value of either a tilt sensor or an acceleration sensor, which will be described later, stabilizes after the detection value of the vehicle-speed sensor has become 0. The expression "immediately after a vehicle starts traveling" refers, for example, to a predetermined period from when the detection value of the vehicle-speed sensor exceeds 0. The expression "immediately before a vehicle starts traveling" refers, for example, to a time preceding, by a predetermined period of time, a point at which the detection value of the vehicle-speed sensor exceeds 0. The expression "while a vehicle is at rest" refers, for example, to a period from when the detection value of either the tilt sensor or the acceleration sensor stabilizes to when the detection value of the vehicle-speed sensor exceeds 0. The expression "when the detection value stabilizes" may mean the time when an amount of change in the output value from either the tilt sensor or the acceleration sensor per unit time becomes no greater than a predetermined amount or may mean the time when a predetermined period of time has passed (for example, 1 to 2 seconds later) after the detection value of the vehicle-speed sensor becomes 0. The "stable state" of the output value from the tilt sensor is a state in which an amount of change in the output value from the tilt sensor per unit time is no greater than a predetermined amount, and the "unstable state" is a state in which this amount of change exceeds the predetermined amount. The expression "the vehicle 300 is being parked" means that the vehicle 300 is in the state of "when a vehicle is stopping" or "while a vehicle is at rest." The aforementioned "while a vehicle is traveling," "when a vehicle is stopping," "immediately after a vehicle starts traveling," "immediately before a vehicle starts traveling," "while a vehicle is at rest," "when the detection value stabilizes," "stable state," "unstable state," and "predetermined amount" can be set as appropriate on the basis of an experiment or a simulation by the designer.

Embodiment 1

FIG. 1 is a schematic vertical sectional view of a headlamp unit that includes a vehicle lamp to be controlled by a control device according to Embodiment 1. The structure of a headlamp unit 210 is such that a pair of headlamp units, which are formed to be horizontally symmetric, are disposed at respective right and left sides of a vehicle in the widthwise direction of the vehicle. A headlamp unit 210R on the right side and a headlamp unit 210L on the left side have substantially identical configurations, and thus the structure of the headlamp unit 210R on the right side will be described, hereinafter. The headlamp unit 210R includes a lamp body 212 having an opening facing the forward direction of the vehicle and a translucent cover 214 that covers the opening. The lamp body 212 includes a detachable cover 212a provided in the rearward direction of the vehicle. The lamp body 212 and the translucent cover 214 form a lamp room 216. A lamp unit 10, which serves as a vehicle lamp, is housed in the lamp room 216.

A lamp bracket 218 having a pivot mechanism 218a, about which the lamp unit 10 swings in the top-and-bottom and horizontal directions, is formed on the lamp unit 10. The lamp bracket 218 is screwed onto an aiming adjusting screw 220 supported by the lamp body 212. A rotation shaft 222a of a swivel actuator 222 is fixed to a lower surface of the lamp unit 10. The swivel actuator 222 is fixed to a unit bracket 224. A leveling actuator 226 is connected to the unit bracket 224. The leveling actuator 226 is constituted, for example, by a motor or the like that expands or contracts a rod 226a in the direction of the arrow M or N. The lamp unit 10 takes a backward-tilted attitude or a forward-tilted attitude as the rod 226a is expanded or contracted in the direction of the arrow M or N, which enables the leveling adjustment of directing the pitch angle of an optical axis O downward or upward.

The lamp unit 10 includes a shade mechanism 18 that includes a rotating shade 12, a light source 14, a lamp housing 17 that supports a reflector 16 on its inner wall, and a projection lens 20. An incandescent lightbulb, a halogen lamp, a discharge lamp, an LED, or the like can be used as the light source 14. The reflector 16 is at least partially ellipsoidal and reflects light radiated from the light source 14. Some of the light from the light source 14 and of the light reflected by the reflector 16 is guided to the projection lens 20 via the rotating shade 12. The rotating shade 12 is a cylindrical member rotatable about a rotation shaft 12a and includes a notch portion and a plurality of shade plates (not illustrated). Either the notch portion or the shade plates are moved onto the optical axis O, and a predetermined light-distribution pattern is thus formed. The projection lens 20 is constituted by a plano-convex aspherical lens and projects an inverted image of a light source image formed in its posterior focal plane onto a virtual vertical screen in front of the lamp.

Figure 2:
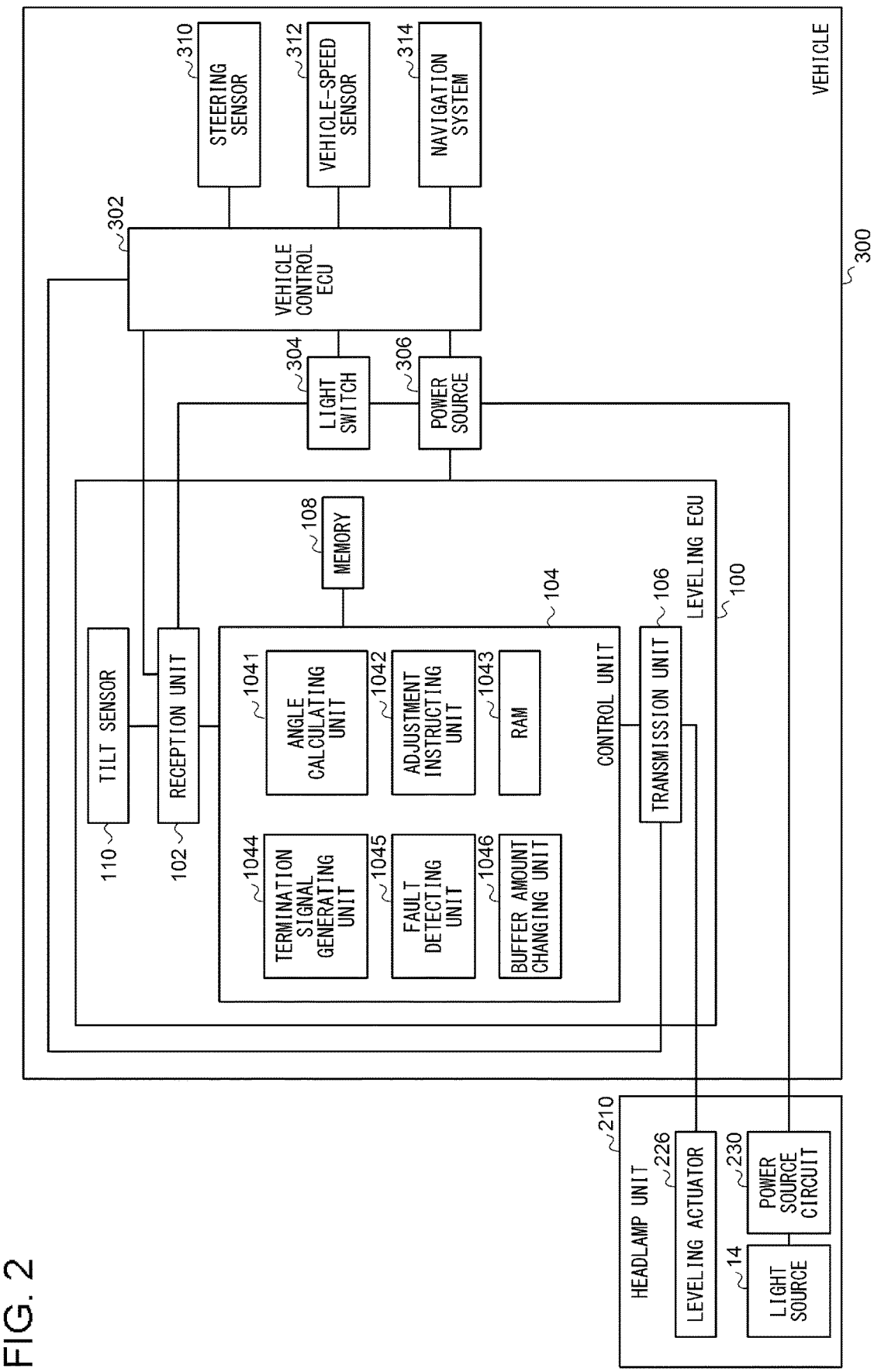
FIG. 2 is a functional block diagram illustrating cooperation of a headlamp unit, a vehicle control ECU, and a leveling ECU according to Embodiment 1.

FIG. 2 is a functional block diagram illustrating cooperation of a headlamp unit, a vehicle control ECU, and a leveling ECU. In FIG. 2, the headlamp unit 210R and the headlamp unit 210L are indicated collectively as the headlamp unit 210. A leveling ECU 100 is implemented by elements such as a CPU and a memory of a computer and circuits in terms of the hardware configuration and is implemented by a computer program or the like in terms of the software configuration. In FIG. 2, the leveling ECU 100 is depicted as a functional block implemented through cooperation of the above. Thus, it is to be understood by a person skilled in the art that these functional blocks can be implemented in a variety of forms through combinations of hardware and software.

The leveling ECU 100, which serves as a control device for the vehicle lamp, includes a reception unit 102, a control unit 104, a transmission unit 106, a memory 108, and a tilt sensor 110. The leveling ECU 100 is installed, for example, in the vicinity of the dashboard of a vehicle 300. The position at which the leveling ECU 100 is installed is not particularly limited, and the leveling ECU 100 may be provided, for example, inside the headlamp unit 210. The tilt sensor 110 may be provided outside the leveling ECU 100. A vehicle control ECU 302 and a light switch 304 are connected to the leveling ECU 100. Signals output from the vehicle control ECU 302 and the light switch 304 are received by the reception unit 102. In addition, the reception unit 102 receives a signal indicating an output value from the tilt sensor 110.

A steering sensor 310, a vehicle-speed sensor 312, a navigation system 314, and so on are connected to the vehicle control ECU 302. Signals output from these sensors are received by the reception unit 102 of the leveling ECU 100 via the vehicle control ECU 302. The light switch 304 transmits a signal instructing that the headlamp unit 210 be turned on/off, a signal instructing that self-leveling control be executed, or the like to a power source 306, the vehicle control ECU 302, the leveling ECU 100, and so on in accordance with the content of an operation by the driver.

A signal received by the reception unit 102 is transmitted to the control unit 104. The control unit 104 executes the self-leveling control of adjusting the pitch angle of the optical axis O of the lamp unit 10 (hereinafter, this angle is referred to as an optical axis angle θo, as appropriate) by using the output value from the tilt sensor 110. The control unit 104 includes an angle calculating unit 1041, an adjustment instructing unit 1042, a RAM 1043, a termination signal generating unit 1044, a fault detecting unit 1045, and a buffer amount changing unit 1046.

The angle calculating unit 1041 generates pitch angle information of the vehicle 300 by using the output value from the tilt sensor 110 and information stored in the RAM 1043. The adjustment instructing unit 1042 generates an adjustment signal instructing that the optical axis angle θo of the lamp unit 10 be adjusted by using the pitch angle information generated by the angle calculating unit 1041. The control unit 104 outputs the adjustment signal generated by the adjustment instructing unit 1042 to the leveling actuator 226 via the transmission unit 106. The leveling actuator 226 operates in accordance with the received adjustment signal, and the optical axis O of the lamp unit 10 in the pitch angle direction is adjusted accordingly. The termination signal generating unit 1044 generates a termination signal indicating that the operation of the leveling ECU 100 is terminated normally when power supply from the power source 306 is shut off. The fault detecting unit 1045 detects the leveling ECU 100 having entered a fault state and the leveling ECU 100 having recovered from the fault state. The buffer amount changing unit 1046 periodically changes the number of output values from the tilt sensor 110 to be used in a single instance of deriving either a straight line or a vector in the processing of estimating a vehicle attitude angle θv, which will be described later. Operation of each of the units included in the control unit 104 will be described later in detail.

The power source 306 that supplies power to the leveling ECU 100, the vehicle control ECU 302, and the headlamp unit 210 is mounted in the vehicle 300. Upon an instruction to turn on the headlamp unit 210 being issued through the operation of the light switch 304, power is supplied to the light source 14 from the power source 306 via a power source circuit 230. Power is supplied from the power source 306 to the leveling ECU 100 when an ignition switch (not illustrated) is on, and the power supply is shut off when the ignition switch is off.

Subsequently, the self-leveling control by the leveling ECU 100 having the above-described configuration will be described in detail. FIG. 3 is a schematic diagram for describing an acceleration vector produced in the vehicle and an angle of inclination of the vehicle that can be detected by the tilt sensor.

For example, when luggage is in the trunk in the back side of the vehicle or when a passenger is in the backseat, the vehicle has a backward-tilted attitude. Meanwhile, when luggage is removed from the trunk or when a passenger in the backseat gets out of the vehicle, the vehicle enters a more forward-tilted state than that of the backward-tilted attitude. When the vehicle has a backward-tilted attitude or a forward-tilted attitude, the direction in which the lamp unit 10 shines varies in the top-and-bottom direction accordingly, and the forward range increases or decreases. Thus, the leveling ECU 100 derives either the angle of inclination of the vehicle 300 in the pitch direction or a change in the angle of inclination from the output value from the tilt sensor 110 and brings the optical axis angle θo to an angle corresponding to the attitude of the vehicle. Carrying out the self-leveling control of adjusting the leveling of the lamp unit 10 in real time on the basis of the attitude of the vehicle makes it possible to adjust the range of the forward irradiation light to an optimum even when the attitude of the vehicle changes.

In the present embodiment, the tilt sensor 110 is a triaxial acceleration sensor having an X-axis, a Y-axis, and a Z-axis that are orthogonal to one another. The tilt sensor 110 is attached to the vehicle 300 at a desired posture and detects the acceleration vector produced in the vehicle 300. The gravitational acceleration and the motion acceleration produced through the movement of the vehicle 300 are produced in the traveling vehicle 300. Thus, as illustrated in FIG. 3, the tilt sensor 110 can detect a composite acceleration vector β in which the gravitational acceleration vector G and the motion acceleration vector α are combined. In addition, while the vehicle 300 is at rest, the tilt sensor 110 can detect the gravitational acceleration vector G. The tilt sensor 110 outputs the numerical value of each of the axial components of the detected acceleration vector.

Since the tilt sensor 110 is attached to the vehicle 300 at a desired posture, the X-axis, the Y-axis, and the Z-axis of the tilt sensor 110 (the axes of the sensor) in the state in which the tilt sensor 110 is mounted in the vehicle 300 do not necessarily coincide with the front-and-back axis, the right-and-left axis, and the top-and-bottom axis of the vehicle 300 (the axes of the vehicle) that determine the attitude of the vehicle 300. Therefore, the control unit 104 needs to convert the components on the three axes output from the tilt sensor 110, or in other words, the components on the sensor coordinate system into the components on the three axes of the vehicle 300, or in other words, into the components on the vehicle coordinate system. In order to convert the axial components of the tilt sensor 110 into the axial components of the vehicle 300 and to calculate the angle of inclination of the vehicle 300, referential axial information is needed that indicates the positional relationship among the axes of the tilt sensor 110 in the state of being attached to the vehicle 300, the axes of the vehicle 300, and the road surface angle. Thus, the control unit 104 generates the referential axial information in the following manner, for example.

First, at a manufacturing plant of a vehicle manufacturer, a service facility of an auto dealer, or the like, for example, the vehicle 300 is placed on a road surface designed to be parallel to the horizontal plane (hereinafter, this road surface is referred to as a referential road surface, as appropriate), and this state is set as a first referential state. In the first referential state, the vehicle 300 is in a state in which one passenger is in the driver's seat. Then, an initialization signal is transmitted through a switch operation of an initialization processing apparatus at the plant, communication on a CAN (Controller Area Network) system, or the like. Upon receiving the initialization signal, the control unit 104 executes predetermined initialization processing. In the initialization processing, an initial aiming adjustment is carried out, and the optical axis O of the lamp unit 10 is made to match an initial angle. In addition, the control unit 104 maps the positional relationship among the coordinate system of the tilt sensor 110, the coordinate system of the vehicle 300, and the referential road surface on which the vehicle 300 is located (in other words, the horizontal plane).

Specifically, the control unit 104 records the output value from the tilt sensor 110 in the first referential state into the RAM 1043 of the control unit 104 or into the memory 108 in the form of a first referential vector S1=(X1, Y1, Z1). The memory 108 is a non-volatile memory. With this operation, the positional relationship between the axes of the tilt sensor and the referential road surface is mapped. Next, the vehicle 300 is brought into a second state that differs from the first state only in the pitch angle of the vehicle 300. The vehicle 300 can be brought into the second state, for example, by placing a load on the front portion or the back portion of the vehicle 300 that is in the first state. The control unit 104 records the output value from the tilt sensor 110 obtained when the vehicle 300 is in the second state into the RAM 1043 or the memory 108 in the form of a second referential vector S2=(X2, Y2, Z2).

The difference between the Z-axis of the tilt sensor 110 and the top-and-bottom axis of the vehicle 300 can be grasped by acquiring the first referential vector S1. In addition, the difference between the front-and-back axis of the vehicle 300 and the X-axis of the tilt sensor 110 and the difference between the right-and-left axis of the vehicle 300 and the Y-axis of the tilt sensor 110 can be grasped from the changes in the components of the second referential vector S2 relative to the first referential vector S1. Thus, the positional relationship between the axes of the tilt sensor and the axes of the vehicle is mapped, and the positional relationship between the axes of the vehicle and the referential road surface is mapped as a result. The control unit 104 records, as the referential axial information, a conversion table that maps the numerical values of the axial components in the output value from the tilt sensor 110 (including the numerical value of the referential road surface) to the numerical values of the respective axial components of the vehicle 300 into the memory 108.

The numerical values of the components on the X-axis, the Y-axis, and the Z-axis output from the tilt sensor 110 are converted to the components on the front-and-back axis, the right-and-left axis, and the top-and-bottom axis of the vehicle 300 by the angle calculating unit 1041 of the control unit 104 with the use of the conversion table. Therefore, the accelerations in the front-and-back direction of the vehicle, the right-and-left direction of the vehicle, and the top-and-bottom direction of the vehicle can be detected from the output value from the tilt sensor 110.

The inclination of the vehicle 300 relative to the gravitational acceleration vector G can be derived from the output value from the tilt sensor 110 while the vehicle is at rest. Specifically, a total angle θ, which is the angle of inclination of the vehicle 300 relative to the horizontal plane, including a road surface angle θr, which is the angle of inclination of the road surface relative to the horizontal plane, and a vehicle attitude angle θv, which is the angle of inclination of the vehicle 300 relative to the road surface, is derivable. The road surface angle θr, the vehicle attitude angle θv, and the total angle θ are the angles in the pitch direction of the vehicle 300.

The self-leveling control aims to keep the forward range of the irradiation light to an optimum by absorbing a change in the forward range of the vehicle lamp associated with a change in the angle of inclination of the vehicle 300 in the pitch direction. Therefore, the angle of inclination of the vehicle 300 required in the self-leveling control is the vehicle attitude angle θv. Specifically, in the self-leveling control, it is desirable that the optical axis angle θo of the lamp unit 10 be adjusted when the vehicle attitude angle θv has changed and that the optical axis angle θo of the lamp unit 10 be maintained when the road surface angle θr has changed. In order to achieve this, information on the vehicle attitude angle θv needs to be extracted from the total angle θ.

In this respect, as basic control in self-leveling, the control unit 104 estimates that a change in the total angle θ while the vehicle is traveling is a change in the road surface angle θr and that a change in the total angle θ while the vehicle is at rest is a change in the vehicle attitude angle θv and derives the vehicle attitude angle θv from the total angle θ. While the vehicle is traveling, a change in the vehicle attitude angle θv caused by a change in the load or in the number of passengers rarely occurs, and thus it can be estimated that a change in the total angle θ while the vehicle is traveling is a change in the road surface angle θr. In addition, a change in the road surface angle θr caused by the movement of the vehicle 300 rarely occurs while the vehicle is at rest, and thus it can be estimated that a change in the total angle θ while the vehicle is at rest is a change in the vehicle attitude angle θv.

For example, in the initialization processing described above, the angle calculating unit 1041 converts the output value from the tilt sensor 110 in the first referential state to the components along the three axes of the vehicle 300 by using the generated referential axial information and stores these values into the RAM 1043 as the reference value of the road surface angle θr (θr=0°) and the reference value of the vehicle attitude angle θv (θv=0°). In addition, these reference values are written into the memory 108 as necessary. Then, the control unit 104 generates an adjustment signal for the optical axis angle θo of the lamp unit 10 with respect to a change in the total angle θ while the vehicle is at rest. Aside from this, the control unit 104 stores, as a new reference value, the vehicle attitude angle θv obtained by including the amount of the stated change in the total angle θ into the stored reference value of the vehicle attitude angle θv. In addition, the control unit 104 avoids generation or output of an adjustment signal or outputs a maintaining signal instructing that the optical axis angle θo be maintained with respect to a change in the total angle θ while the vehicle is traveling. Aside from this, the control unit 104 stores, as a new reference value, the road surface angle θr obtained by including the amount of the stated change in the total angle θ into the stored reference value of the road surface angle θr.

For example, in a condition in which the vehicle 300 is actually used, the control unit 104 refrains from driving the leveling actuator 226 with respect to a change in the total angle θ while the vehicle is traveling. The control unit 104 can refrain from driving the leveling actuator 226 as the adjustment instructing unit 1042 avoids generation or output of an adjustment signal or outputs a maintaining signal instructing that the optical axis angle θo be maintained. Then, the angle calculating unit 1041 calculates the current total angle θ (when the vehicle is stopping) from the output value from the tilt sensor 110 when the vehicle is stopping. Subsequently, the angle calculating unit 1041 subtracts the reference value of the vehicle attitude angle θv from the current total angle θ to obtain the road surface angle θr (θr=θ−θv reference value). Then, with the obtained road surface angle θr serving as a new reference value of the road surface angle θr, the reference value of the road surface angle θr stored in the RAM 1043 is updated. With this operation, the amount of change in the total angle θ while the vehicle is traveling that is estimated to be the amount of change in the road surface angle θr is taken into the reference value of the road surface angle θr.

Alternatively, the angle calculating unit 1041 calculates a difference Δθ1 in the total angle θ before and after the vehicle moves (an amount of change in the total angle θ) when the vehicle is stopping. Then, the angle calculating unit 1041 calculates the new reference value of the road surface angle θr by adding the difference Δθ1 into the reference value of the road surface angle θr (new θr reference value=θr reference value+Δθ1) and updates the reference value of the road surface angle θr. With this operation, the change in the total angle θ while the vehicle is traveling that is estimated to be the change in the road surface angle θr is taken into the reference value of the road surface angle θr. The angle calculating unit 1041 can calculate the difference Δθ1 in the following manner. Specifically, the angle calculating unit 1041 stores the total angle θ held immediately before the vehicle starts traveling as the reference value of the total angle θ immediately after the vehicle 300 starts traveling. Then, the angle calculating unit 1041 calculates the difference Δθ1 by subtracting the reference value of the total angle θ from the current total angle θ when the vehicle is stopping.

In addition, the control unit 104 drives the leveling actuator 226 to adjust the optical axis angle θo with respect to a change in the total angle θ while the vehicle is at rest. Specifically, while the vehicle is at rest, the angle calculating unit 1041 calculates the current total angle θ from the output value from the tilt sensor 110 repeatedly at predetermined timings. The calculated total angle θ is stored into the RAM 1043. Then, the angle calculating unit 1041 obtains the vehicle attitude angle θv by subtracting the reference value of the road surface angle θr from the current total angle θ (θv=θ−θr reference value). In addition, with the obtained vehicle attitude angle θv serving as a new reference value of the vehicle attitude angle θv, the reference value of the vehicle attitude angle θv stored in the RAM 1043 is updated. With this operation, the amount of change in the total angle θ while the vehicle is at rest that is estimated to be the amount of change in the vehicle attitude angle θv is taken into the reference value of the vehicle attitude angle θv.

Alternatively, the angle calculating unit 1041 calculates a difference Δθ2 between the current total angle θ and the stored reference value of the total angle θ (the amount of change in the total angle θ) while the vehicle is at rest. The reference value of the total angle θ used in this case, for example, is the total angle θ obtained when the difference Δθ1 has been calculated in the case of calculating the difference Δθ2 for the first time after the vehicle 300 has stopped (i.e., the total angle θ when the vehicle is stopping) or is the total angle θ obtained when the difference Δθ2 has been calculated in the previous instance in the second and later times. Then, the angle calculating unit 1041 calculates a new reference value of the vehicle attitude angle θv by adding the difference Δθ2 into the reference value of the vehicle attitude angle θv (new θv reference value=θv reference value+Δθ2) and updates the reference value of the vehicle attitude angle θv. With this operation, the change in the total angle θ while the vehicle is at rest that is estimated to be the change in the vehicle attitude angle θv is taken into the reference value of the vehicle attitude angle θv.

Then, the adjustment instructing unit 1042 generates an adjustment signal for the optical axis angle θo by using the calculated vehicle attitude angle θv or the updated new reference value of the vehicle attitude angle θv. For example, the adjustment instructing unit 1042 determines the optical axis angle θo by using a conversion table, recorded in advance in the memory 108, that maps the values of the vehicle attitude angle θv to the values of the optical axis angle θo and generates the adjustment signal. The adjustment signal is output from the transmission unit 106 to the leveling actuator 226.

Control when Power Supply from Power Source 306 is Shut Off

The control unit 104 is driven on the power supplied from the power source 306. Therefore, when the power supply from the power source 306 is shut off, the reference value of the road surface angle θr and the reference value of the vehicle attitude angle θv stored in the RAM 1043 are lost. Thus, when the ignition switch enters an off state, the control unit 104 writes the reference value of the road surface angle θr and the reference value of the vehicle attitude angle θv stored in the RAM 1043 into the memory 108, which is a non-volatile memory.

To be more specific, upon the ignition switch entering an off state, the angle calculating unit 1041 writes the reference value of the road surface angle θr and the reference value of the vehicle attitude angle θv stored in the RAM 1043 into the memory 108. With this operation, the leveling ECU 100 can hold the reference values of the vehicle attitude angle θv and of the road surface angle θr even if the ignition switch is turned off and the power supply from the power source 306 is shut off. In addition, upon the reference value of the road surface angle θr and the reference value of the vehicle attitude angle θv having been written into the memory 108, the termination signal generating unit 1044 generates a termination signal indicating that the operation of the leveling ECU 100 has been terminated normally and writes the termination signal into the memory 108.

The power required for the duration from when the ignition switch is turned off to when writing of the reference values of the road surface angle θr and of the vehicle attitude angle θv and writing of the termination signal are finished can be covered, for example, by the power supplied from the power source 306 until the power supply from the power source 306 is shut off upon the ignition switch entering an off state and the power supplied from an accumulating element (not illustrated), such as a condenser (capacitor), provided in the vicinity of the power source 306 or in the leveling ECU 100.

Control when Power Supply from Power Source 306 is Started

A change in the road surface angle θr in association with the movement of the vehicle 300 rarely occurs when the ignition switch is off. Therefore, it can be estimated that a change in the total angle θ in a period from when the ignition switch is off to when the ignition switch is turned on, or in other words, while the power supply from the power source 306 is being shut off is a change in the vehicle attitude angle $\theta v$. Thus, upon the power supply from the power source 306 being started, the angle calculating unit 1041 obtains the current vehicle attitude angle $\theta v$ by subtracting the reference value of the road surface angle $\theta r$ read out from the memory 108 from the current total angle $\theta$, as initial control after being started. Then, the obtained vehicle attitude angle $\theta v$ is stored into the RAM 1043 as a reference value. In addition, an adjustment signal is generated by using the obtained vehicle attitude angle $\theta v$. With this operation, the change in the vehicle attitude angle $\theta v$ while the power supply from the power source 306 is being shut off can be taken into the reference value, and the optical axis angle $\theta o$ can be adjusted to an appropriate position. Accordingly, the accuracy of the self-leveling control can be increased.

Optical Axis Control when Leveling ECU has Entered Fault State

As described above, in the basic control of self-leveling, the reference value of the vehicle attitude angle $\theta v$ or of the road surface angle $\theta r$ is subtracted from the total angle $\theta$, and the reference value is repeatedly updated. Alternatively, the difference $\Delta\theta 1$ between the changes in the total angle $\theta$ is added into the reference value of the road surface angle $\theta r$, and the difference $\Delta\theta 2$ is added into the reference value of the vehicle attitude angle $\theta v$; thus, the reference value is repeatedly updated. With this operation, the changes in the road surface angle $\theta r$ and in the vehicle attitude angle $\theta v$ are taken into the respective reference values.

Therefore, when a fault occurs in the leveling ECU 100, the reference value of the road surface angle $\theta r$ and the reference value of the vehicle attitude angle $\theta v$ are not updated while the leveling ECU 100 is in the fault state, and thus the amount of change in the road surface angle $\theta r$ and the amount of change in the vehicle attitude angle $\theta v$ arising while the leveling ECU 100 is in the fault state cannot be taken into the reference values. Then, when the leveling ECU 100 recovers from the fault state, the optical axis angle $\theta o$ is adjusted by using the reference values into which the changes in the road surface angle $\theta r$ and in the vehicle attitude angle $\theta v$ arising while the leveling ECU 100 has been in the fault state are not taken in the self-leveling control restarted after the recovery. Therefore, even if the leveling ECU 100 recovers from the fault state, it is difficult to execute the self-leveling control with high accuracy thereafter.

Therefore, the leveling ECU 100 executes the following control when the leveling ECU 100 enters a fault state. First, one of the fault states of the leveling ECU 100 can be a state in which information required for the self-leveling control, such as the output values from various sensors including the tilt sensor 110 and the vehicle-speed sensor 312, is not input to the reception unit 102 in the state in which the power supply to the leveling ECU 100 is retained. When the leveling ECU 100 enters this fault state, the fault detecting unit 1045 determines that the leveling ECU 100 has entered the fault state, generates a fault occurrence signal indicating that the leveling ECU 100 has entered the fault state, and transmits the fault occurrence signal to the adjustment instructing unit 1042. The fault detecting unit 1045 can determine that the leveling ECU has entered a fault state when an input of an output value from the vehicle-speed sensor 312 or the tilt sensor 110 is not present for a predetermined period of time, for example. What causes the input of the output values from various sensors to stop includes a failure of the various sensors themselves and a break between the leveling ECU 100 and the various sensors. The fault detecting unit 1045 can also determine that the leveling ECU 100 has entered a fault state by receiving a failure signal from the various sensors.

Upon receiving a fault occurrence signal from the fault detecting unit 1045, the adjustment instructing unit 1042 fixes the optical axis angle $\theta o$ to a current angle or to a predetermined reference angle. Examples of the reference angle include an initial angle and a safe angle. The initial angle is an angle set in the attitude of the vehicle 300 in the initialization processing described above (the attitude in the first referential state), or in other words, the optical axis angle corresponding to $\theta v=0°$. The safe angle is an optical axis angle at which glare caused to others is reduced. The safe angle can be an optical axis angle that aims more downward than the horizontal plane, or for example, that aims in the most downward direction. To which angle the reference angle is set can be determined, as appropriate, from the viewpoint of suppressing glare caused to drivers of other vehicles and improving visibility of the driver of the vehicle. For example, the initial angle is suitable for the reference angle when reduction of glare and improvement of visibility are both taken into consideration. In addition, when reduction of glare takes priority, the safe angle is suitable for the reference angle.

Thereafter, upon the leveling ECU 100 recovering from the fault state, the fault detecting unit 1045 determines that the leveling ECU 100 has recovered from the fault state, generates a fault recovery signal indicating that the leveling ECU 100 has recovered from the fault state, and transmits the fault recovery signal to the angle calculating unit 1041 and the adjustment instructing unit 1042. When the fault detecting unit 1045 detects an input of output values from various sensors after generating a fault occurrence signal, for example, the fault detecting unit 1045 can determine that the leveling ECU 100 has recovered from the fault state.

Upon receiving a fault recovery signal from the fault detecting unit 1045, the angle calculating unit 1041 estimates the current vehicle attitude angle $\theta v$ on the basis of the output value from the tilt sensor 110 obtained while the vehicle is traveling. Then, the adjustment instructing unit 1042 releases the fixed state of the optical axis angle $\theta o$ and generates an adjustment signal by using the estimated vehicle attitude angle $\theta v$. The optical axis angle $\theta o$ is kept in the fixed state until the current vehicle attitude angle $\theta v$ is estimated.

In addition, the angle calculating unit 1041 stores, into the RAM 1043, the estimated vehicle attitude angle $\theta v$ as a new reference value of the vehicle attitude angle $\theta v$. With this operation, the change in the vehicle attitude angle $\theta v$ arising while the leveling ECU 100 is in the fault state can be taken into the reference value. In addition, the change in the road surface angle $\theta r$ arising while the leveling ECU 100 is in the fault state can be taken into the reference value through an update of the reference value of the road surface angle $\theta r$ carried out thereafter when the vehicle is stopping.

Figure 4A:
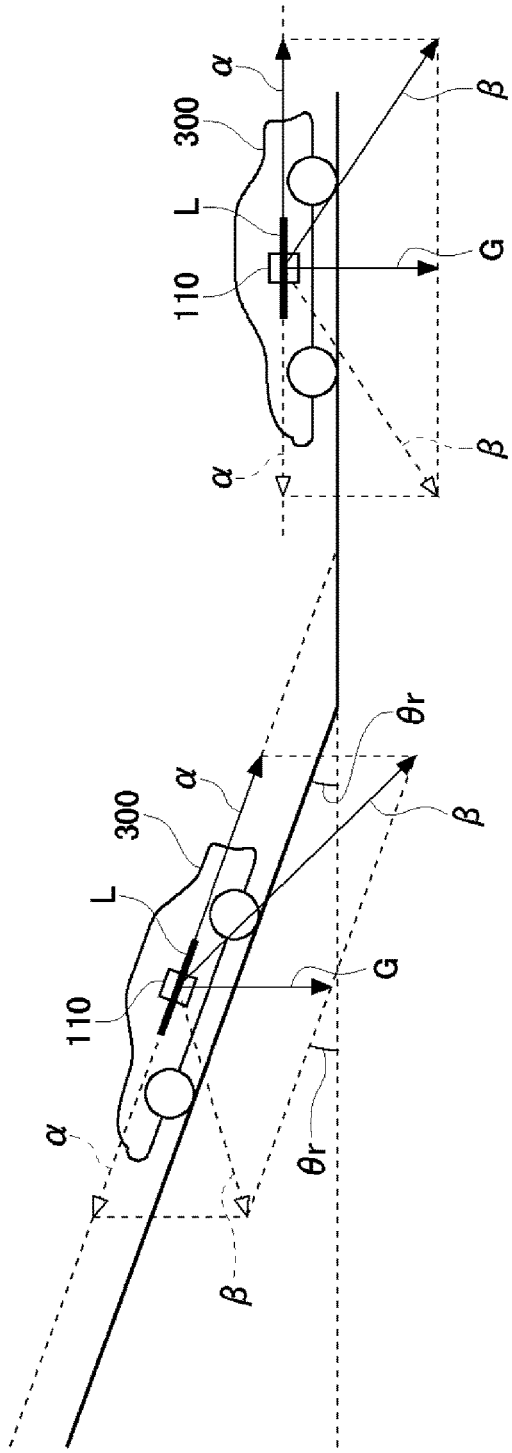
FIG. 4A and FIG. 4B are schematic diagrams for describing a relationship between the direction of a motion acceleration vector of a vehicle and a vehicle attitude angle.
Figure 4B:
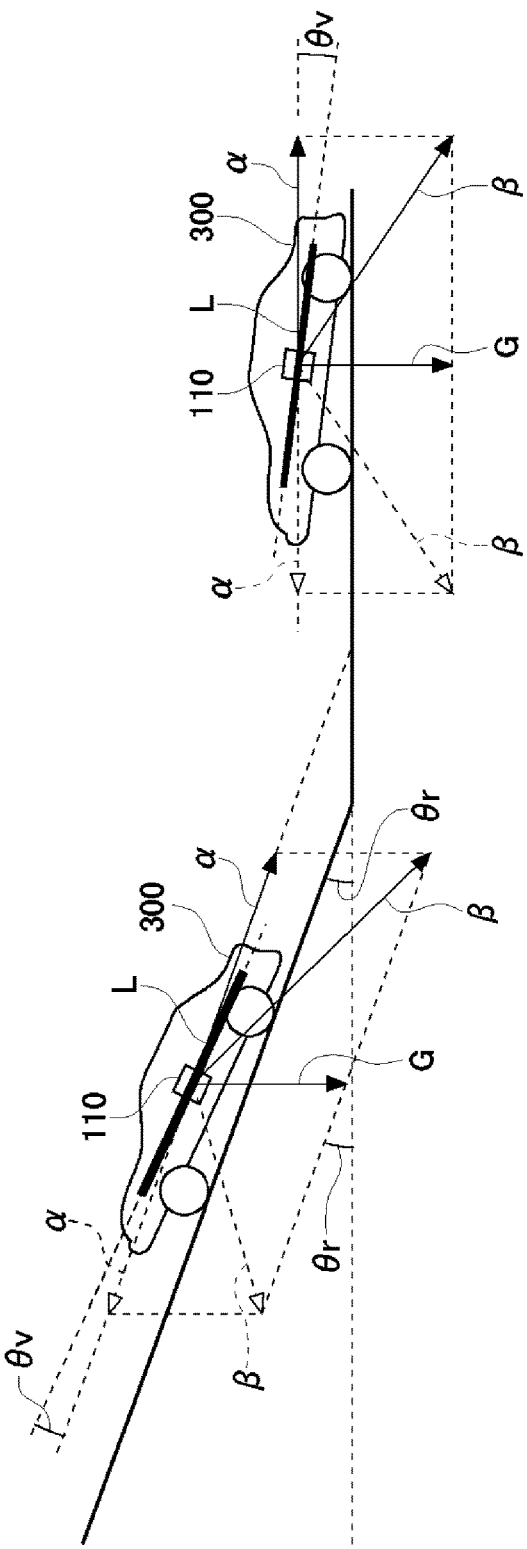
Figure 5:
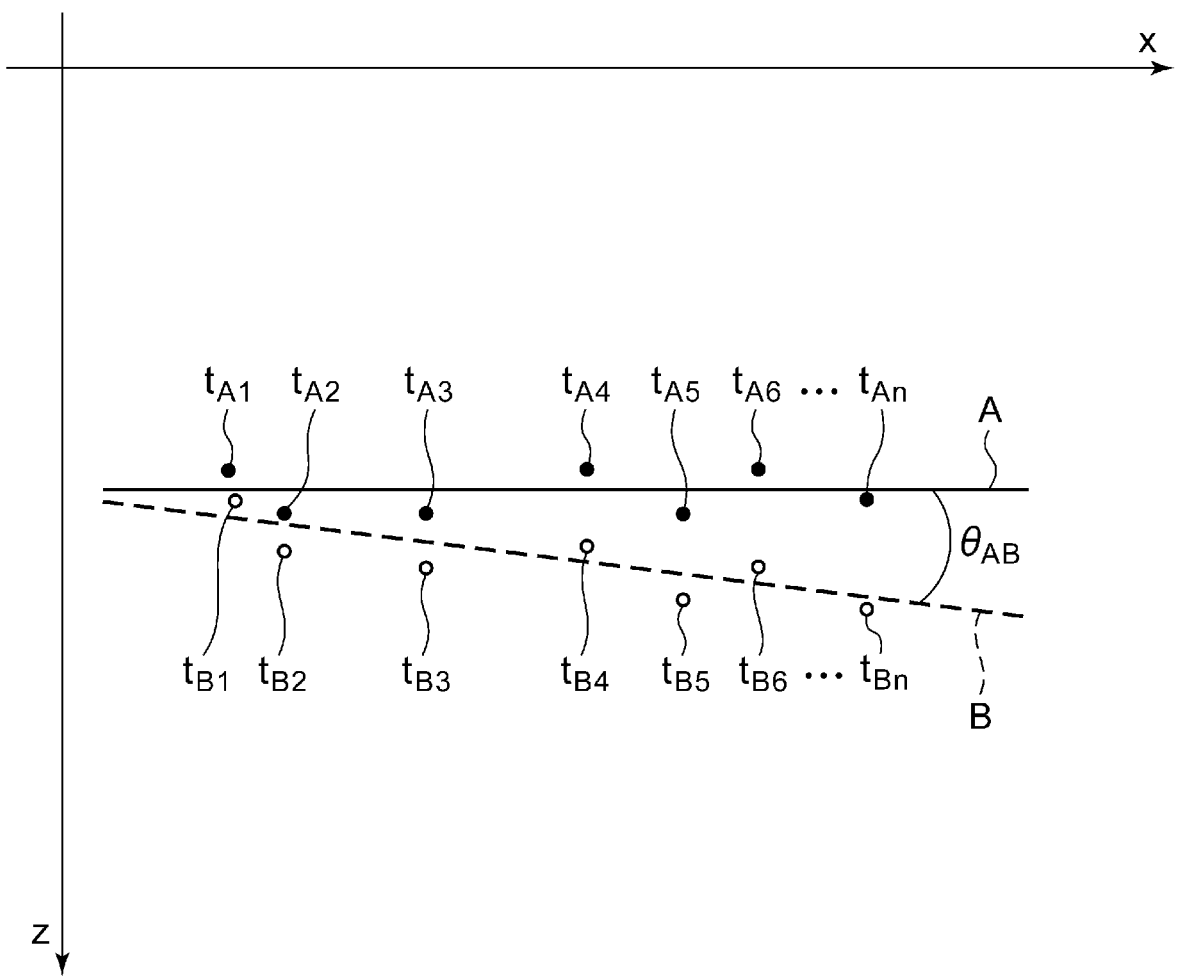
FIG. 5 is a graph illustrating a relationship between an acceleration in a front-and-back direction of a vehicle and an acceleration in a top-and-bottom direction of the vehicle.

Hereinafter, processing of estimating the vehicle attitude angle $\theta v$ based on the output value from the tilt sensor 110 obtained while the vehicle is traveling will be described. FIG. 4A and FIG. 4B are schematic diagrams for describing a relationship between the direction of the motion acceleration vector of the vehicle and the vehicle attitude angle. FIG. 4A illustrates a state in which the vehicle attitude angle $\theta v$ is 0°, and FIG. 4B illustrates a state in which the vehicle attitude angle $\theta v$ has changed from 0°. In addition, in FIG. 4A and FIG. 4B, the motion acceleration vector $\alpha$ produced when the vehicle 300 moves forward and the composite acceleration vector $\beta$ are indicated by the solid arrows, and the motion acceleration vector $\alpha$ produced when the vehicle 300 reduces its speed or moves backward and the composite acceleration vector β are indicated by the dashed arrows. FIG. 5 is a graph illustrating a relationship between the acceleration in the front-and-back direction of the vehicle and the acceleration in the top-and-bottom direction of the vehicle.

The vehicle 300 moves parallel to the road surface. Thus, the motion acceleration vector α is a vector parallel to the road surface regardless of the vehicle attitude angle θv. In addition, as illustrated in FIG. 4A, when the vehicle attitude angle θv of the vehicle 300 is 0°, theoretically, the front-and-back axis L of the vehicle 300 (or the X-axis of the tilt sensor 110) is parallel to the road surface. Thus, the motion acceleration vector α is a vector parallel to the front-and-back axis L of the vehicle 300. Thus, when the magnitude of the motion acceleration vector α changes in association with the acceleration and deceleration of the vehicle 300, the trajectory of the leading end of the composite acceleration vector β detected by the tilt sensor 110 is a straight line parallel to the front-and-back axis L of the vehicle 300.

Meanwhile, as illustrated in FIG. 4B, when the vehicle attitude angle θv is not 0°, the front-and-back axis L of the vehicle 300 is inclined relative to the road surface, and thus the motion acceleration vector α is a vector extending diagonally relative to the front-and-back axis L of the vehicle 300. Then, the trajectory of the leading end of the composite acceleration vector β when the magnitude of the motion acceleration vector α changes in association with the acceleration or deceleration of the vehicle 300 is a straight line inclined relative to the front-and-back axis L of the vehicle 300.

When the output values from the tilt sensor 110 obtained while the vehicle is traveling are plotted on the coordinates in which the acceleration in the front-and-back direction of the vehicle is set in a first axis (X-axis) and the acceleration in the top-and-bottom direction of the vehicle is set in a second axis (Z-axis), the result illustrated in FIG. 5 can be obtained. In FIG. 5, points $t_{A1}$ to $t_{An}$ are the detection values at times $t_1$ to $t_n$ in the state illustrated in FIG. 4A. Points $t_{B1}$ to $t_{Bn}$ are the detection values at times $t_1$ to $t_n$ in the state illustrated in FIG. 4B. Plotting of these output values includes plotting of the acceleration values on the vehicle coordinate system obtained from the output values from the tilt sensor 110.

The vehicle attitude angle θv can be estimated by deriving either a straight line or a vector from at least two points plotted in this manner and by obtaining the slope of either the straight line or the vector. For example, linear approximation equations A and B are obtained by using the least-squares method, the moving-average method, or the like on the plurality of plotted points $t_{A1}$ to $t_{An}$ and $t_{B1}$ to $t_{Bn}$, and the slopes of the linear approximation equations A and B are calculated. When the vehicle attitude angle θv is 0°, the linear approximation equation A that is parallel to the x-axis can be obtained from the output values from the tilt sensor 110. In other words, the slope of the linear approximation equation A is 0. In contrast, when the vehicle attitude angle θv is not 0°, the linear approximation equation B having a slope corresponding to the vehicle attitude angle θv can be obtained from the output values from the tilt sensor 110. Thus, the angle formed by the linear approximation equation A and the linear approximation equation B ($θ_{AB}$ in FIG. 5) or the slope of the linear approximation equation B serves as the vehicle attitude angle θv. Therefore, the vehicle attitude angle θv can be estimated from the slope of either a straight line or a vector obtained by plotting the output values from the tilt sensor 110 while the vehicle is traveling.

Accordingly, the angle calculating unit 1041 plots the output values from the tilt sensor 110 obtained while the vehicle is traveling onto the coordinates in which the acceleration in the front-and-back direction of the vehicle is set in the first axis and the acceleration in the top-and-bottom direction of the vehicle is set in the second axis. Then, the vehicle attitude angle θv is estimated by using the slope of either a straight line or a vector obtained from the plurality of plotted points, and the reference value of the vehicle attitude angle θv is corrected on the basis of the estimated vehicle attitude angle θv. Alternatively, the estimated vehicle attitude angle θv is stored as a new reference value. In addition, the adjustment instructing unit 1042 adjusts the optical axis angle θo on the basis of the estimated vehicle attitude angle θv. Thereafter, the basic control described above is restarted with the corrected or updated vehicle attitude angle θv serving as the reference value of the vehicle attitude angle θv and with the road surface angle θr obtained from the current total angle θ and the reference value of the stated vehicle attitude angle θv serving as the reference value of the road surface angle θr.

In the processing of estimating the vehicle attitude angle θv, the angle calculating unit 1041 starts estimating the vehicle attitude angle θv upon determining that the vehicle 300 is traveling on the basis of the output value from the vehicle-speed sensor 312. The output value from the tilt sensor 110 is transmitted to the control unit 104 repeatedly at a predetermined time interval. The output value from the tilt sensor 110 transmitted to the control unit 104 is stored into the RAM 1043 or the memory 108. In addition, the buffer amount changing unit 1046 counts the number of stored output values from the tilt sensor 110. Then, the buffer amount changing unit 1046 transmits, to the angle calculating unit 1041, a signal indicating that the number of the output values has reached a buffer amount when the number of the output values has reached a predetermined number required for a single instance of deriving either a straight line or a vector, or in other words, the buffer amount.

Upon receiving the signal from the buffer amount changing unit 1046, the angle calculating unit 1041 plots the output values from the tilt sensor 110 onto the coordinates described above and derives either a straight line or a vector. Alternatively, the angle calculating unit 1041 may plot the output value onto the coordinates each time the angle calculating unit 1041 receives an output value from the tilt sensor 110, the buffer amount changing unit 1046 may count the number of the output values from the tilt sensor 110 and transmit the signal described above to the angle calculating unit 1041, and the angle calculating unit 1041 may derive either a straight line or a vector upon receiving the signal.

In addition, the buffer amount changing unit 1046 periodically changes the number of output values from the tilt sensor 110 to be used to derive either a straight line or a vector, or in other words, the buffer amount.

Figure 6:
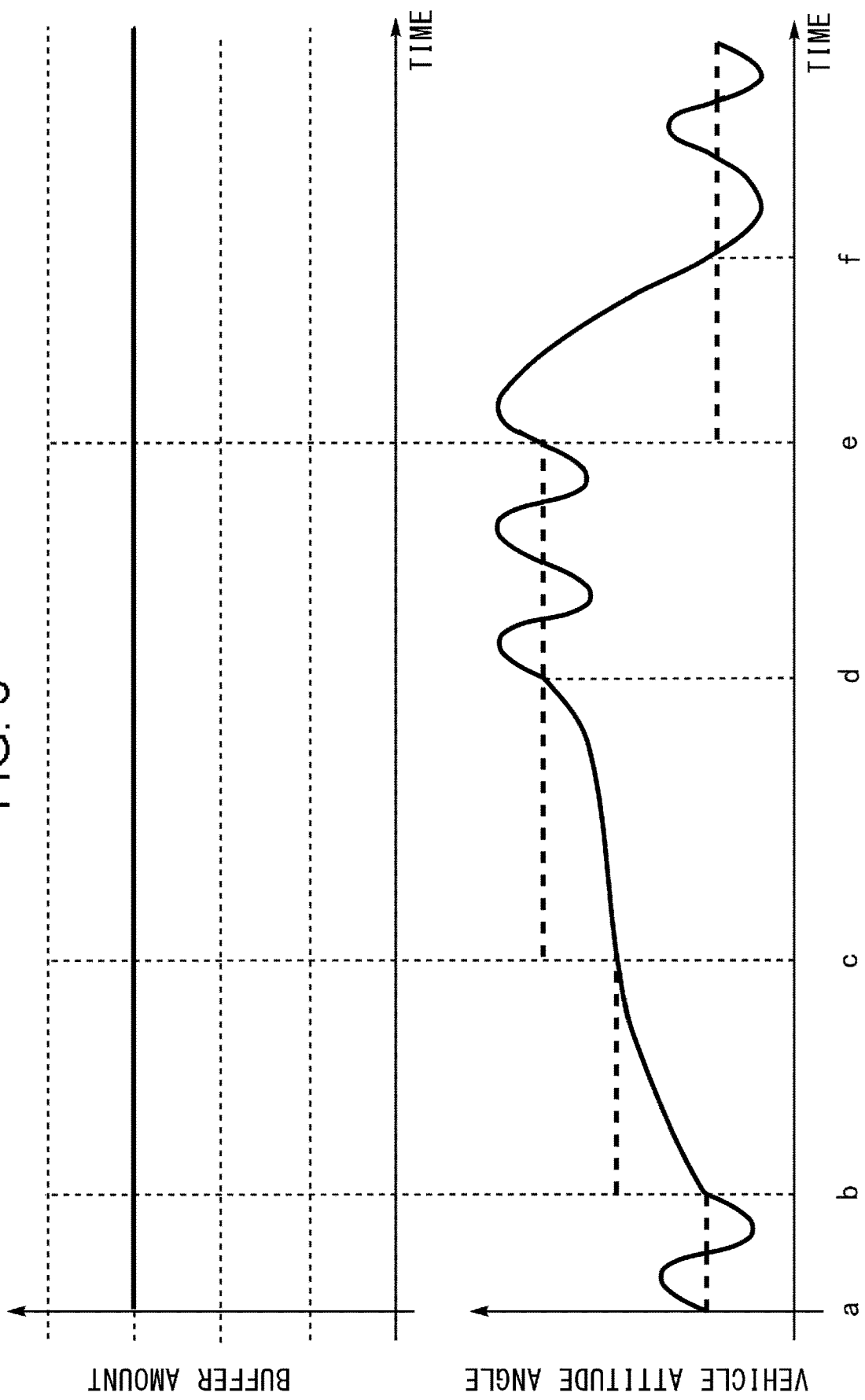
FIG. 6 schematically illustrates a change in a vehicle attitude angle θv when a buffer amount is constant.
Figure 7:
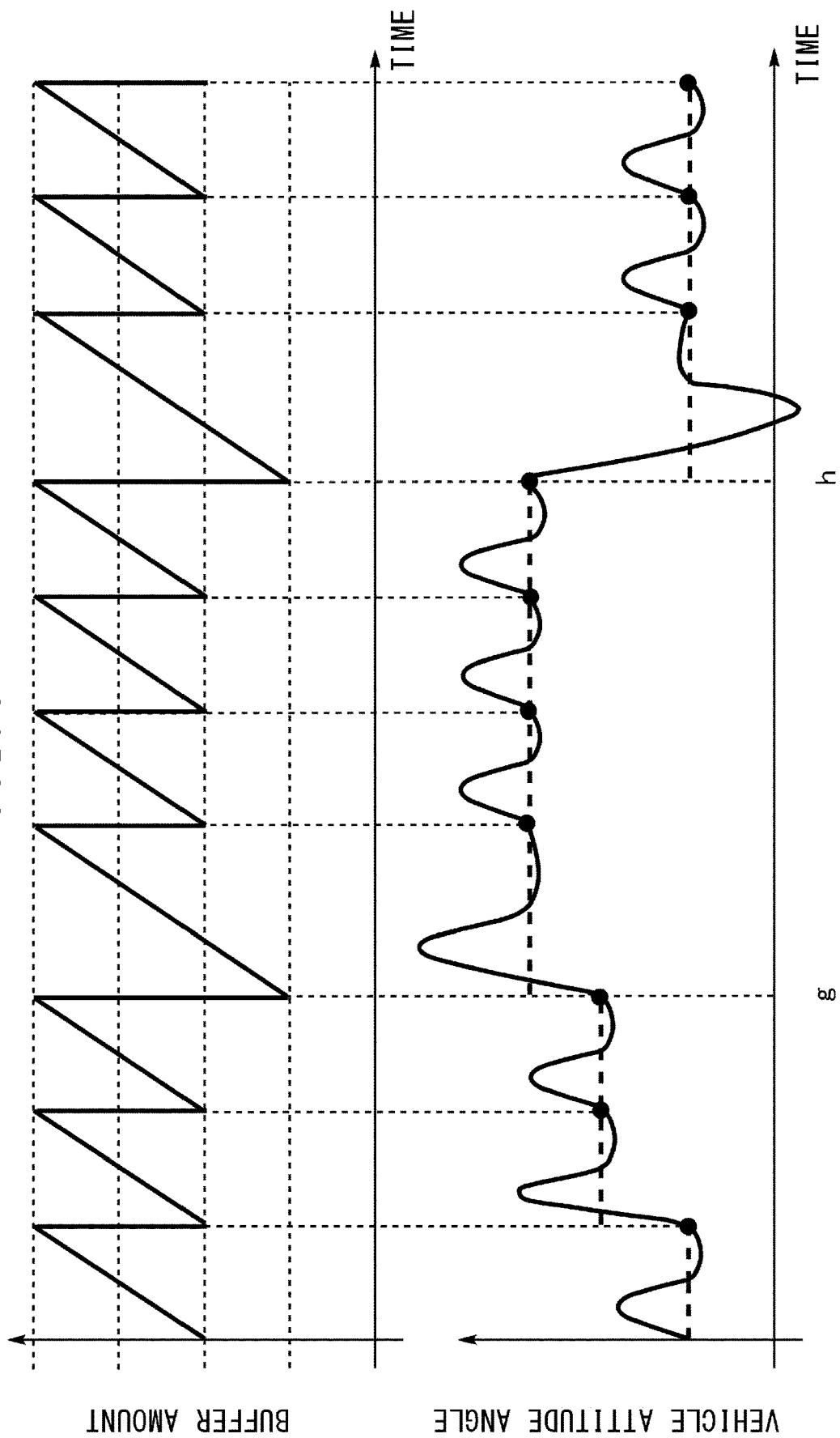
FIG. 7 schematically illustrates a change in a vehicle attitude angle θv when a buffer amount is changed periodically.

Hereinafter, the relationship between the change in the buffer amount and the estimated vehicle attitude angle θv will be described. FIG. 6 schematically illustrates a change in the vehicle attitude angle θv when the buffer amount is constant. FIG. 7 schematically illustrates a change in the vehicle attitude angle θv when the buffer amount is changed periodically. In FIG. 6 and FIG. 7, the upper half indicates the change in the buffer amount, and the lower half indicates the change in the vehicle attitude angle θv. In addition, the dashed lines in the lower half indicate the actual vehicle attitude angle θv, and the solid line indicates the estimated vehicle attitude angle θv.

As illustrated in FIG. 6, when the buffer amount is constant, the estimated vehicle attitude angle θv may greatly deviate from the actual vehicle attitude angle θv immediately after the actual vehicle attitude angle θv has changed, as can be seen in the periods of times b to c, c to d, and e to f (in particular, the first half of these periods). In other words, the following performance of the estimated vehicle attitude angle θv with respect to the change in the actual vehicle attitude angle θv may decrease in the aforementioned periods. In addition, the estimated vehicle attitude angle θv may swing, as can be seen in the periods of times a to b, d to e, and f and thereafter.

In contrast, as illustrated in FIG. 7, when the buffer amount is changed periodically, the following performance of the estimated vehicle attitude angle θv with respect to the actual vehicle attitude angle θv can be enhanced when the buffer amount is relatively small. Meanwhile, the accuracy of estimating the vehicle attitude angle θv can be increased when the buffer amount is relatively large. Thus, the following performance of the estimated vehicle attitude angle θv with respect to the actual vehicle attitude angle θv can be enhanced, and the accuracy of estimating the vehicle attitude angle θv can also be increased. Accordingly, the accuracy of the self-leveling control can be increased. FIG. 7 illustrates a case in which a change in which the buffer amount is increased continuously and the buffer amount is reduced to a lower limit value upon reaching a predetermined upper limit value is executed periodically. The increase in the buffer amount is not limited to a continuous increase, and the buffer amount may be increased stepwise.

The buffer amount changing unit 1046 changes the buffer amount, for example, with a single instance of traveling serving as one cycle. In other words, the duration from when the vehicle 300 starts traveling to when the vehicle 300 stops serves as one cycle. Then, the buffer amount changing unit 1046 lowers the lower limit value of the buffer amount at the beginning of the subsequent cycle, or in other words, the lower limit value of the buffer amount for the subsequent cycle (times g and h) when the output value from the tilt sensor 110 has changed by a predetermined value or more or when a signal indicating that a door of the vehicle 300 has been opened or closed is received from an opening/closing sensor during a period from the end of the current cycle to the beginning of the subsequent cycle, as compared to a case in which the output value from the tilt sensor 110 has not changed by a predetermined value or more or a case in which a signal indicating that the door has been opened or closed is not received from the opening/closing sensor. This operation can suppress a decrease in the following performance of the estimated vehicle attitude angle θv with respect to the actual vehicle attitude angle θv when the change in the vehicle attitude angle θv is large. When the door has been opened or closed, it is highly likely that a passenger has got in or got out of the vehicle 300 or luggage has been loaded onto or removed from the vehicle 300. Therefore, detecting the opening or closing of the door makes it possible to predict that the vehicle attitude angle θv changes greatly.

The angle calculating unit 1041 stores the vehicle attitude angle θv obtained from a straight line derived when the buffer amount is maximum as the reference value (the timings indicated by the solid circles in FIG. 7). Thus, the vehicle attitude angle θv with high estimation accuracy can serve as the reference value, and the accuracy of the self-leveling can be increased.

In the self-leveling control in which the control of deriving either a straight line or a vector from a plot and calculating the vehicle attitude angle θv on the basis of the slope of either the straight line or the vector serves as a basis, the control of periodically changing the buffer amount as described above may be executed.

Another fault state of the leveling ECU 100 can be a state in which the driving of the leveling ECU 100 stops even when the ignition switch is in an on state. As such a state, a case in which the power supply to the leveling ECU 100 is shut off due to a connection failure or the like of a power supply line between the power source 306 and the leveling ECU 100 can be considered. If the leveling ECU 100 is driven again upon the connection failure of the power supply line being resolved after the leveling ECU 100 has entered the stated fault state, the fault detecting unit 1045 determines that the leveling ECU 100 has entered the fault state and that the leveling ECU 100 has recovered from the fault state. Then, the fault detecting unit 1045 transmits a fault recovery signal to the angle calculating unit 1041 and the adjustment instructing unit 1042.

When the power supply to the leveling ECU 100 is shut off due to a connection failure or the like of the power supply line, the leveling ECU 100 stops driving without the termination signal generating unit 1044 generating a termination signal. Therefore, the fault detecting unit 1045 can determine that the leveling ECU 100 has entered a fault state or has recovered from the fault state thereafter on the basis of that a termination signal is not written in the memory 108.

In addition, as a state in which the leveling ECU 100 stops driving even through the ignition switch is in an on state, for example, a case in which the leveling ECU 100 that has been stopped normally upon the ignition switch being turned off does not start normally thereafter even when the ignition switch has entered an on state can be considered. When the leveling ECU 100 starts normally upon the ignition switch being turned off and on again after the leveling ECU 100 has entered the stated fault state, the fault detecting unit 1045 determines that the leveling ECU 100 has entered a fault state and that the leveling ECU 100 has recovered from the fault state. Then, the fault detecting unit 1045 transmits a fault recovery signal to the angle calculating unit 1041 and the adjustment instructing unit 1042.

The fault detecting unit 1045 determines whether the vehicle attitude angle θv calculated by the angle calculating unit 1041 when the leveling ECU 100 starts exceeds a possible maximum value of the vehicle attitude angle θv allowed by the design of the vehicle 300. If this vehicle attitude angle θv exceeds such a maximum value, the fault detecting unit 1045 can determine that the leveling ECU 100 has entered the fault state and has recovered from the fault state thereafter.

The self-leveling control is not executed while the leveling ECU 100 is in a fault state, and thus the optical axis angle θo is inevitably fixed to the current angle. The angle calculating unit 1041 and the adjustment instructing unit 1042 that have received a fault recovery signal execute the processing of estimating the vehicle attitude angle θv described above. In addition, the buffer amount changing unit 1046 executes the processing of changing the buffer amount described above.

Figure 8:
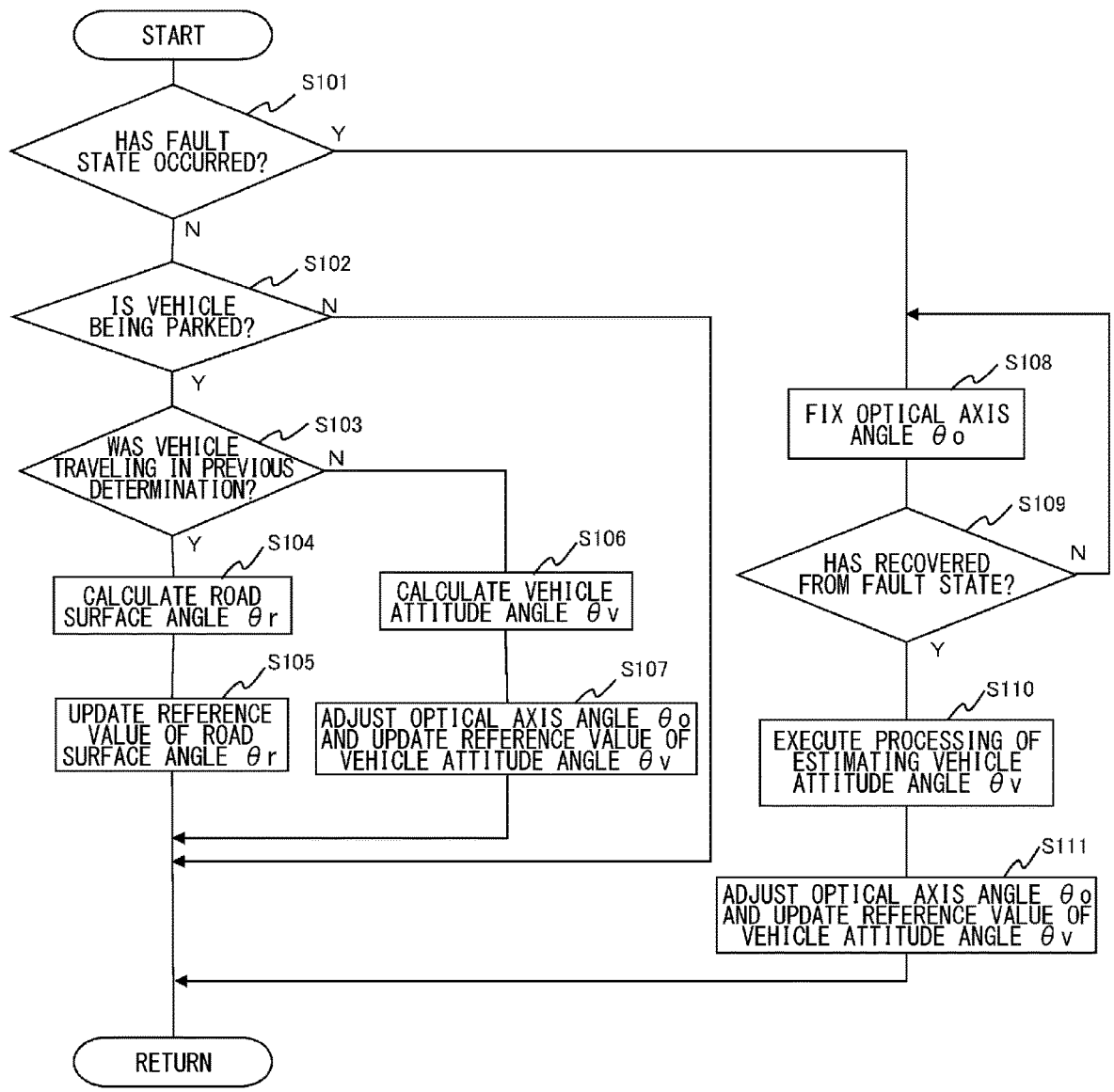
FIG. 8 is a flowchart illustrating an example of self-leveling control executed by a control device for a vehicle lamp according to Embodiment 1.

FIG. 8 is a flowchart illustrating an example of self-leveling control executed by the control device for a vehicle lamp according to Embodiment 1. This flow is executed repeatedly at a predetermined timing by the control unit 104, for example, when the ignition is turned on in a state in which the instruction to execute the self-leveling control has been issued by the light switch 304 and is terminated when the ignition is turned off.

The control unit 104 determines whether a fault has occurred in the leveling ECU 100 (S101). If no fault has occurred in the leveling ECU 100 (N in S101), the control unit 104 determines whether the vehicle 300 is being parked (S102). If the vehicle 300 is not being parked, or in other words, if the vehicle 300 is traveling (N in S102), the control unit 104 terminates this routine. If the vehicle 300 is being parked (Y in S102), the control unit 104 determines whether the vehicle 300 was traveling (N in S102) in the parking determination in step S102 in the previous instance of the routine (S103).

If the vehicle was traveling in the previous instance of determination (Y in S103), which means the case "when the vehicle is stopping," the control unit 104 calculates the road surface angle θr by subtracting the reference value of the vehicle attitude angle θv from the current total angle θ (S104). Then, the new reference value of the road surface angle θr is updated with the obtained road surface angle θr (S105), and the routine is terminated.

If the vehicle was not traveling in the previous instance of determination (N in S103), which means the case "while the vehicle is at rest," the control unit 104 calculates the vehicle attitude angle θv by subtracting the reference value of the road surface angle θr from the current total angle θ (S106). Then, the optical axis angle θo is adjusted by using the obtained vehicle attitude angle θv, the new reference value is updated with the obtained vehicle attitude angle θv (S107), and the routine is terminated.

If a fault has occurred in the leveling ECU 100 (Y in S101), the control unit 104 fixes the optical axis angle θo to a current angle or a predetermined reference angle (S108). Then, the control unit 104 determines whether the leveling ECU 100 has recovered from a fault state (S109). When the fault that has occurred in the leveling ECU 100 is the fault in which the leveling ECU 100 stops driving as described above, the determination of an occurrence of a fault in step S101 and the determination of recovery from the fault in step S109 are carried out concurrently.

If the leveling ECU 100 has not recovered from the fault state (N in S109), the control unit 104 keeps the optical axis angle θo being fixed (S108). If the leveling ECU 100 has recovered from the fault state (Y in S109), the control unit 104 executes the processing of estimating the vehicle attitude angle θv by using the output value from the tilt sensor 110 while the vehicle is traveling (S110). Then, the optical axis angle θo is adjusted by using the estimated vehicle attitude angle θv, the new reference value is updated with the estimated vehicle attitude angle θv (S111), and the routine is terminated.

As described thus far, in the leveling ECU 100 serving as the control device for the vehicle lamp according to the present embodiment, as the basic control, the control unit 104 executes control that includes generating an adjustment signal for the optical axis angle θo with respect to a change in the total angle θ while the vehicle is at rest and storing the vehicle attitude angle θv obtained by including the amount of change in the total angle θ into the reference value of the vehicle attitude angle θv as a new reference value and control that includes avoiding generation or output of an adjustment signal or outputting a maintaining signal instructing that the optical axis angle θo be maintained with respect to a change in the total angle θ while the vehicle is traveling and storing the road surface angle θr obtained by including the amount of change in the total angle θ into the reference value of the road surface angle θr as a new reference value.

In addition, when the fault detecting unit 1045 has determined that the leveling ECU 100 has entered a fault state, the control unit 104 fixes the optical axis angle θo to a current angle or a predetermined reference angle. In addition, after it is determined that the leveling ECU 100 has recovered from the fault state, the control unit 104 estimates the current vehicle attitude angle θv on the basis of the output value from the tilt sensor 110 obtained while the vehicle is traveling. Then, the fixed state of the optical axis angle θo is released, and an adjustment signal is generated by using the estimated vehicle attitude angle θv. This operation makes it possible to prevent an optical axis adjustment that is based on the reference values of the vehicle attitude angle θv and the road surface angle θr of which the accuracy has decreased due to not being updated while the leveling ECU 100 is in the fault state. Thus, a situation in which drivers of other vehicles are affected by glare or the visibility of the driver of the vehicle notably decreases can be suppressed. Thus, according to the leveling ECU 100 of the present embodiment, the performance of the self-leveling control can be enhanced.

In addition, in the present embodiment, the processing of estimating the vehicle attitude angle θv is executed, and thus the self-leveling control can be restarted promptly. Thus, the performance of the self-leveling control can be further enhanced.

The present invention is not limited to Embodiment 1 described above. Modifications, including various design changes, can be made on the basis of the knowledge of a person skilled in the art, and an embodiment with such modifications is also encompassed within the scope of the present invention. A new embodiment conceived of through a combination of Embodiment 1 described above and a modification thereof has effects of each of the combined Embodiment 1 and modification thereof.

Modification 1

In Embodiment 1 described above, the processing of estimating the vehicle attitude angle θv is executed when the leveling ECU 100 has recovered from a fault state, but the following processing may instead be executed after the leveling ECU 100 has recovered from a fault state. Specifically, in the leveling ECU 100 according to Modification 1, the fault detecting unit 1045 refrains from outputting a fault recovery signal until the fault detecting unit 1045 receives a signal indicating the current vehicle attitude angle θv from an external device even if the recovery of the leveling ECU 100 from a fault state has been detected. Then, upon receiving such a signal from an external device, the fault detecting unit 1045 transmits a fault recovery signal to the angle calculating unit 1041 and the adjustment instructing unit 1042. Upon receiving the fault recovery signal from the fault detecting unit 1045, the adjustment instructing unit 1042 releases the fixed state of the optical axis angle θo and generates an adjustment signal by using the received vehicle attitude angle θv. In addition, the angle calculating unit 1041 stores, into the RAM 1043, the received vehicle attitude angle θv as a new reference value.

Examples of the external device include an initialization processing apparatus and a CAN (Controller Area Network) system disposed at a manufacturing plant of a vehicle manufacturer or at a service facility of an auto dealer. For example, as the initialization processing is executed in a state in which the vehicle 300 is placed on the referential road surface described above, the control unit 104 receives a signal indicating the current vehicle attitude angle θv (θv=0°). The control unit 104 may concurrently receive a signal indicating the current road surface angle θr (θr=0°).

Even with the leveling ECU 100 according to Modification 1 as described above, a situation in which drivers of other vehicles are affected by glare or the visibility of the driver of the vehicle notably decreases can be suppressed. Thus, the performance of the self-leveling control can be enhanced.

It is to be noted that the invention according to Embodiment 1 and Modification 1 described above may be specified by the item described hereinafter.

Item 1

A vehicle lamp system, comprising:

a vehicle lamp with an adjustable optical axis;

a tilt sensor enabled for deriving a total angle, the total angle being an angle of inclination of a vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; and a control device that controls an adjustment of an optical axis angle of the vehicle lamp, wherein the control device includes a reception unit that receives a signal indicating an output value from the tilt sensor, and a control unit that executes control, the control including holding a road surface angle reference value and a vehicle attitude angle reference value, generating an adjustment signal for the optical axis angle of the vehicle lamp with respect to a change in the total angle while the vehicle is at rest, storing a vehicle attitude angle obtained by including an amount of change in the total angle into the vehicle attitude angle reference value as a new reference value, outputting a maintaining signal instructing either that generation or output of the adjustment signal be refrained from, or that the optical axis angle be maintained with respect to a change in the total angle while the vehicle is traveling, and storing a road surface angle obtained by including an amount of change in the total angle into the road surface angle reference value as a new reference value, the control unit including a fault detecting unit that detects the control device having entered a fault state and having recovered from the fault state, the control unit fixing the optical axis angle to a current angle or a predetermined reference angle when the fault detecting unit detects the control device having entered the fault state, upon the fault detecting unit detecting the control device having recovered from the fault state, either the control unit estimating a current vehicle attitude angle on the basis of the output value from the tilt sensor obtained while the vehicle is traveling, releasing the state in which the optical axis angle is fixed, and generating the adjustment signal by using the estimated vehicle attitude angle, or the control unit receiving a signal indicating a current vehicle attitude angle from an external device, releasing a state in which the optical axis angle is fixed, and generating the adjustment signal by using the received vehicle attitude angle.

Embodiment 2

FIG. 1 is a schematic vertical sectional view of a headlamp unit that includes a vehicle lamp to be controlled by a control device according to Embodiment 2. A headlamp unit 210 and a lamp unit 10 according to the present embodiment have structures similar to those of the first embodiment.

Figure 9:
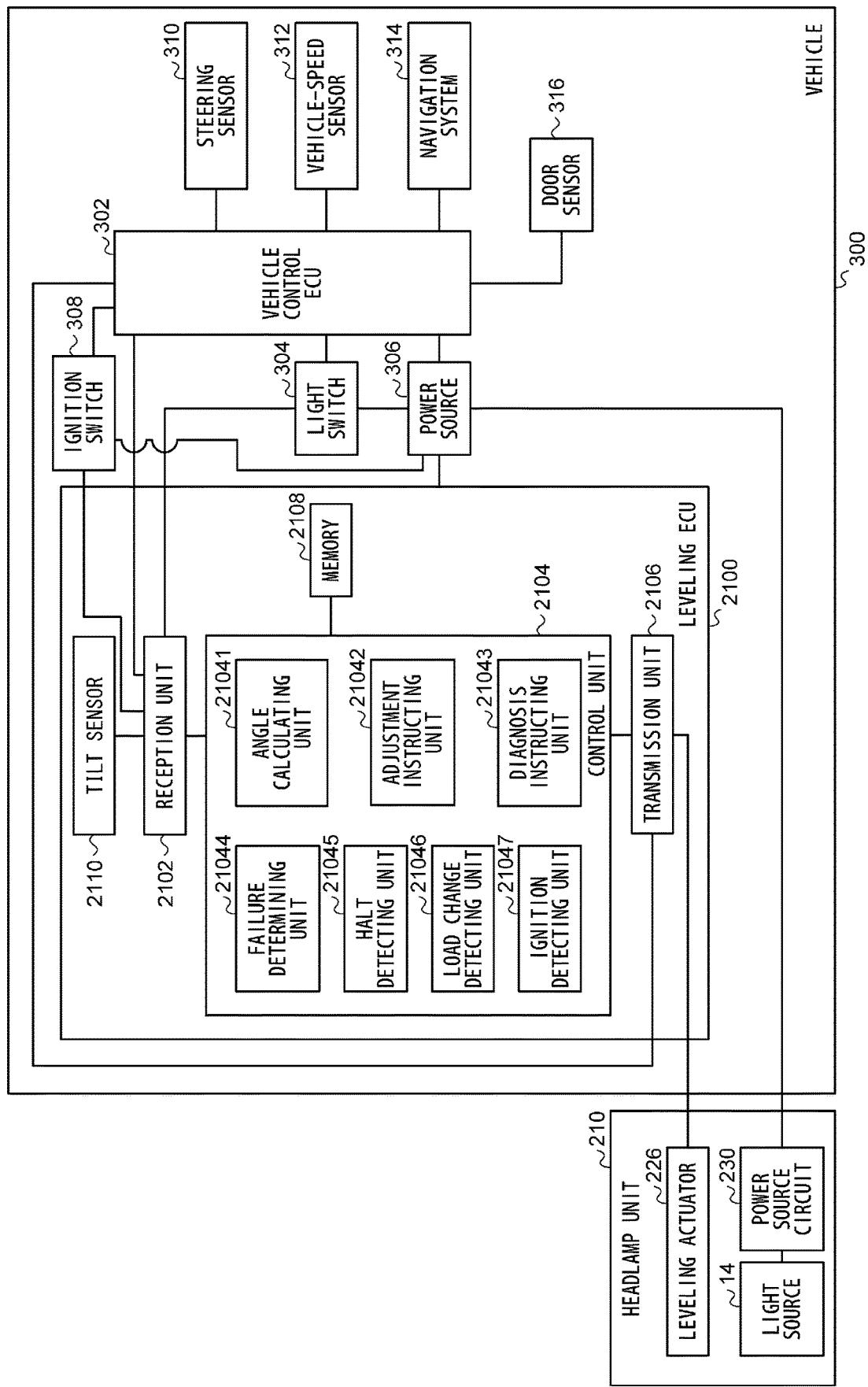
FIG. 9 is a functional block diagram illustrating cooperation of a headlamp unit, a vehicle control ECU, and a leveling ECU according to Embodiment 2.

FIG. 9 is a functional block diagram illustrating cooperation of a headlamp unit, a vehicle control ECU, and a leveling ECU. In FIG. 9, a headlamp unit 210R and a headlamp unit 210L are indicated collectively as the headlamp unit 210. A leveling ECU 2100 and a vehicle control ECU 302 are implemented by elements such as a CPU and a memory of a computer and circuits in terms of the hardware configuration and is implemented by a computer program or the like in terms of the software configuration. In FIG. 9, the leveling ECU 2100 and the vehicle control ECU 302 are depicted as functional blocks implemented through cooperation of the above. Thus, it is to be understood by a person skilled in the art that these functional blocks can be implemented in a variety of forms through combinations of hardware and software.

The leveling ECU 2100, which serves as a control device for a vehicle lamp, includes a reception unit 2102, a control unit 2104, a transmission unit 2106, a memory 2108, and a tilt sensor 2110. The leveling ECU 2100 is installed, for example, in the vicinity of the dashboard of a vehicle 300. The position at which the leveling ECU 2100 is installed is not particularly limited, and the leveling ECU 2100 may be provided, for example, inside the headlamp unit 210. The tilt sensor 2110 may be provided outside the leveling ECU 2100. The vehicle control ECU 302, a light switch 304, an ignition switch 308, and so on are connected to the leveling ECU 2100. Signals output from the vehicle control ECU 302, the light switch 304, the ignition switch 308, and so on are received by the reception unit 2102. The reception unit 2102 also receives a signal indicating an output value from the tilt sensor 2110.

A steering sensor 310, a vehicle-speed sensor 312, a navigation system 314, a door sensor 316, and so on are connected to the vehicle control ECU 302. The door sensor 316 is a sensor that detects opening and closing of a compartment door and/or a trunk door. Signals output from these sensors are received by the reception unit 2102 of the leveling ECU 2100 via the vehicle control ECU 302. The light switch 304 transmits a signal instructing that the headlamp unit 210 be turned on/off, a signal instructing that self-leveling control be executed, or the like in accordance with the content of operation by the driver to a power source 306, the vehicle control ECU 302, the leveling ECU 2100, and so on. The ignition switch 308 transmits a signal indicating its on/off state to the leveling ECU 2100, the vehicle control ECU 302, and the power source 306.

A signal received by the reception unit 2102 is transmitted to the control unit 2104. The control unit 2104 executes the self-leveling control of adjusting the pitch angle of the optical axis O of the lamp unit 10 (hereinafter, this angle is referred to as the optical axis angle $\theta o$, as appropriate) by using the output value from the tilt sensor 2110. The control unit 2104 includes an angle calculating unit 21041, an adjustment instructing unit 21042, a diagnosis instructing unit 21043, a failure determining unit 21044, a halt detecting unit 21045, a load change detecting unit 21046, and an ignition detecting unit 21047.

The angle calculating unit 21041 generates pitch angle information of the vehicle 300 by using the output value from the tilt sensor 2110 and information stored in a RAM (not illustrated) included in the leveling ECU 2100. The adjustment instructing unit 21042 generates an adjustment signal instructing that the optical axis angle $\theta o$ of the lamp unit 10 be adjusted by using the pitch angle information generated by the angle calculating unit 21041. The control unit 2104 outputs the adjustment signal generated by the adjustment instructing unit 21042 to a leveling actuator 226 via the transmission unit 2106. The leveling actuator 226 operates in accordance with the received adjustment signal, and the optical axis O of the lamp unit 10 in the pitch angle direction is adjusted accordingly. The diagnosis instructing unit 21043 outputs an execution-instructing signal instructing that a failure diagnosis of the tilt sensor 2110 be executed to the tilt sensor 2110 via the transmission unit 2106. The failure diagnosis of the tilt sensor 2110 will be described later in detail.

In the failure diagnosis of the tilt sensor 2110, the failure determining unit 21044 determines a failure of the tilt sensor 2110 on the basis of an output value for the failure diagnosis output from the tilt sensor 2110. The halt detecting unit 21045 detects a halt of the vehicle 300. The halt detecting unit 21045 determines that the vehicle 300 has come to a halt, for example, when the output value from the tilt sensor 2110 stabilizes after the detection value of the vehicle-speed sensor 312 has become 0 (that is, when the vehicle is stopping). The load change detecting unit 21046 determines that a passenger has got in or out of the vehicle 300 or that luggage has been loaded onto or removed from the vehicle 300. The load change detecting unit 21046 can determine that a passenger has got in or out of the vehicle or that luggage has been loaded onto or removed from the vehicle when the output value from the tilt sensor 2110 enters an unstable state from a stable state and then enters the stable state again while the vehicle speed is 0. Alternatively, the load change detecting unit 21046 can determine that a passenger has got in or out of the vehicle or that luggage has been loaded onto or removed from the vehicle when a signal indicating that the door has been opened or closed is received from the door sensor 316. The ignition detecting unit 21047 detects on/off of the ignition switch 308 on the basis of, for example, a signal output from the ignition switch 308. Operation of each of the units included in the control unit 2104 will be described later in detail.

The power source 306 that supplies power to the leveling ECU 2100, the vehicle control ECU 302, and the headlamp unit 210 is mounted in the vehicle 300. Upon an instruction to turn on the headlamp unit 210 being issued through the operation of the light switch 304, power is supplied to a light source 14 from the power source 306 via a power source circuit 230. Power is supplied from the power source 306 to the leveling ECU 2100 when the ignition switch 308 is on, and the power supply is shut off when the ignition switch 308 is off.

Subsequently, the self-leveling control by the leveling ECU 2100 having the above-described configuration will be described in detail. FIG. 3 is a schematic diagram for describing an acceleration vector produced in the vehicle and the angle of inclination of the vehicle that can be detected by the tilt sensor.

For example, when luggage is in the trunk in the back side of the vehicle or when a passenger is in the backseat, the vehicle has a backward-tilted attitude. Meanwhile, when luggage is removed from the trunk or when a passenger in the backseat gets out of the vehicle, the vehicle enters a more forward-tilted state than that of the backward-tilted attitude. When the vehicle has a backward-tilted attitude or a forward-tilted attitude, the direction in which the lamp unit 10 shines varies in the top-and-bottom direction accordingly, and the forward range increases or decreases. Thus, the leveling ECU 2100 derives either the angle of inclination of the vehicle 300 in the pitch direction or the amount of change in the angle of inclination from the output value from the tilt sensor 2110 and brings the optical axis angle θo to an angle corresponding to the attitude of the vehicle. Carrying out the self-leveling control of adjusting the leveling of the lamp unit 10 in real time on the basis of the attitude of the vehicle makes it possible to adjust the range of the forward irradiation light to an optimum even when the attitude of the vehicle changes.

In the present embodiment, the tilt sensor 2110 is a triaxial acceleration sensor having an X-axis, a Y-axis, and a Z-axis that are orthogonal to one another. The tilt sensor 2110 is attached to the vehicle 300 at a desired posture and detects the acceleration vector produced in the vehicle 300. The gravitational acceleration and the motion acceleration produced through the movement of the vehicle 300 are produced in the traveling vehicle 300. Thus, the tilt sensor 2110 can detect a composite acceleration vector β in which the gravitational acceleration vector G and the motion acceleration vector α are combined, as illustrated in FIG. 3. In addition, while the vehicle 300 is at rest, the tilt sensor 2110 can detect the gravitational acceleration vector G. The tilt sensor 2110 outputs the numerical value of each of the axial components of the detected acceleration vector.

Since the tilt sensor 2110 is attached to the vehicle 300 at a desired posture, the X-axis, the Y-axis, and the Z-axis of the tilt sensor 2110 (the axes of the sensor) in the state in which the tilt sensor 2110 is mounted in the vehicle 300 do not necessarily coincide with the front-and-back axis, the right-and-left axis, and the top-and-bottom axis of the vehicle 300 (the axes of the vehicle) that determine the attitude of the vehicle 300. Therefore, the control unit 2104 needs to convert the components on the three axes output from the tilt sensor 2110, or in other words, the components on the sensor coordinate system into the components on the three axes of the vehicle 300, or in other words, into the components on the vehicle coordinate system. In order to convert the axial components of the tilt sensor 2110 into the axial components of the vehicle 300 and to calculate the angle of inclination of the vehicle 300, referential axial information is needed that indicates the positional relationship among the axes of the tilt sensor 2110 in the state of being attached to the vehicle 300, the axes of the vehicle 300, and the road surface angle. Thus, the control unit 2104 generates the referential axial information in the following manner, for example.

First, at a manufacturing plant of a vehicle manufacturer, a service facility of an auto dealer, or the like, for example, the vehicle 300 is placed on a road surface designed to be parallel to the horizontal plane (hereinafter, this road surface is referred to as a referential road surface, as appropriate), and this state is set as a first referential state. In the first referential state, the vehicle 300 is in a state in which one passenger is in the driver's seat. Then, an initialization signal is transmitted through a switch operation of an initialization processing apparatus at the plant, communication on a CAN (Controller Area Network) system, or the like. Upon receiving the initialization signal, the control unit 2104 executes predetermined initialization processing. In the initialization processing, an initial aiming adjustment is carried out, and the optical axis O of the lamp unit 10 is made to match an initial angle. In addition, the control unit 2104 maps the positional relationship among the coordinate system of the tilt sensor 2110, the coordinate system of the vehicle 300, and the referential road surface on which the vehicle 300 is located (in other words, the horizontal plane).

Specifically, the control unit 2104 records the output value from the tilt sensor 2110 in the first referential state into a RAM in the control unit 2104 or into the memory 2108 in the form of a first referential vector S1=(X1, Y1, Z1). The memory 2108 is a non-volatile memory. Next, the vehicle 300 is brought into a second state that differs from the first state only in the pitch angle of the vehicle 300. The vehicle 300 can be brought into the second state, for example, by placing a load on the front portion or the back portion of the vehicle 300 that is in the first state. The control unit 2104 records the output value from the tilt sensor 2110 obtained when the vehicle 300 is in the second state into the RAM or the memory 2108 in the form of a second referential vector S2=(X2, Y2, Z2).

The positional relationship between the axes of the tilt sensor and the referential road surface is mapped, and the difference between the Z-axis of the tilt sensor 2110 and the top-and-bottom axis of the vehicle 300 can be grasped by acquiring the first referential vector S1. In addition, the difference between the front-and-back axis of the vehicle 300 and the X-axis of the tilt sensor 2110 and the difference between the right-and-left axis of the vehicle 300 and the Y-axis of the tilt sensor 2110 can be grasped from the changes in the components of the second referential vector S2 relative to the first referential vector S1. Thus, the positional relationship between the axes of the tilt sensor and the axes of the vehicle is mapped, and the positional relationship among the axes of the tilt sensor, the axes of the vehicle, and the referential road surface is mapped as a result. The control unit 2104 records, as the referential axial information, a conversion table that maps the numerical values of the axial components in the output value from the tilt sensor 2110 (including the numerical value on the referential road surface) to the numerical values of the respective axial components of the vehicle 300 into the memory 2108.

The numerical values of the components on the X-axis, the Y-axis, and the Z-axis output from the tilt sensor 2110 are converted to the components on the front-and-back axis, the right-and-left axis, and the top-and-bottom axis of the vehicle 300 by the angle calculating unit 21041 of the control unit 2104 with the use of the conversion table. Therefore, the accelerations in the front-and-back direction of the vehicle, the right-and-left direction of the vehicle, and the top-and-bottom direction of the vehicle can be detected from the output value from the tilt sensor 2110.

The inclination of the vehicle 300 relative to the gravitational acceleration vector G can be derived from the output value from the tilt sensor 2110 while the vehicle is at rest. Specifically, the total angle $\theta$, which is the angle of inclination of the vehicle 300 relative to the horizontal plane, including the road surface angle $\theta r$, which is the angle of inclination of the road surface relative to the horizontal plane, and the vehicle attitude angle $\theta v$, which is the angle of inclination of the vehicle 300 relative to the road surface, is derivable from the output value from the tilt sensor 2110. The road surface angle $\theta r$, the vehicle attitude angle $\theta v$, and the total angle $\theta$ are the angles in the pitch direction of the vehicle 300.

The self-leveling control aims to keep the forward range of the irradiation light to an optimum by absorbing a change in the forward range of the vehicle lamp associated with a change in the angle of inclination of the vehicle 300 in the pitch direction. Therefore, the angle of inclination of the vehicle 300 required in the self-leveling control is the vehicle attitude angle $\theta v$. Specifically, in the self-leveling control, it is desirable that the optical axis angle $\theta o$ of the lamp unit 10 be adjusted when the vehicle attitude angle $\theta v$ has changed and that the optical axis angle $\theta o$ of the lamp unit 10 be maintained when the road surface angle $\theta r$ has changed. In order to achieve this, information on the vehicle attitude angle $\theta v$ needs to be extracted from the total angle $\theta$.

In this respect, as the self-leveling control, the control unit 2104 estimates that a change in the total angle $\theta$ while the vehicle is traveling is a change in the road surface angle $\theta r$ and that a change in the total angle $\theta$ while the vehicle is at rest is a change in the vehicle attitude angle $\theta v$ and derives the vehicle attitude angle $\theta v$ from the total angle $\theta$. While the vehicle is traveling, a change in the vehicle attitude angle $\theta v$ caused by a change in the load or in the number of passengers rarely occurs, and thus it can be estimated that a change in the total angle $\theta$ while the vehicle is traveling is a change in the road surface angle $\theta r$. In addition, a change in the road surface angle $\theta r$ caused by the movement of the vehicle 300 rarely occurs while the vehicle is at rest, and thus it can be estimated that a change in the total angle $\theta$ while the vehicle is at rest is a change in the vehicle attitude angle $\theta v$.

For example, in the initialization processing described above, the angle calculating unit 21041 converts the output value from the tilt sensor 2110 in the first referential state to the components along the three axes of the vehicle 300 by using the generated referential axial information and stores these values into the RAM as the reference value of the road surface angle $\theta r$ ($\theta r=0°$) and the reference value of the vehicle attitude angle $\theta v$ ($\theta v=0°$). In addition, these reference values are written into the memory 2108 as necessary. Then, the control unit 2104 derives the total angle $\theta$ by using the output value from the tilt sensor 2110, generates an adjustment signal for the optical axis angle $\theta o$ with respect to a change in the total angle $\theta$ while the vehicle is at rest, and outputs the adjustment signal. Aside from this, the control unit 2104 stores, as a new reference value, the vehicle attitude angle $\theta v$ obtained by including the amount of the stated change in the total angle $\theta$ into the stored reference value of the vehicle attitude angle $\theta v$. In addition, the control unit 2104 avoids generation or output of an adjustment signal or outputs a maintaining signal instructing that the optical axis angle $\theta o$ be maintained with respect to a change in the total angle $\theta$ while the vehicle is traveling. Aside from this, the control unit 2104 stores, as a new reference value, the road surface angle $\theta r$ obtained by including the amount of the stated change in the total angle $\theta$ into the stored reference value of the road surface angle $\theta r$.

For example, in a condition in which the vehicle 300 is actually used, the control unit 2104 refrains from driving the leveling actuator 226 with respect to a change in the total angle $\theta$ while the vehicle is traveling. The control unit 2104 can refrain from driving the leveling actuator 226 as the adjustment instructing unit 21042 avoids generation or output of an adjustment signal or outputs a maintaining signal instructing that the optical axis angle $\theta o$ be maintained. Then, the angle calculating unit 21041 calculates the current total angle $\theta$ (when the vehicle is stopping) from the output value from the tilt sensor 2110 when the vehicle is stopping. Subsequently, the angle calculating unit 21041 subtracts the reference value of the vehicle attitude angle $\theta v$ from the current total angle $\theta$ to obtain the road surface angle $\theta r$ ($\theta r=\theta-\theta v$ reference value). Then, with the obtained road surface angle $\theta r$ serving as a new reference value of the road surface angle $\theta r$, the reference value of the road surface angle $\theta r$ stored in the RAM is updated. The difference between the reference value of the road surface angle $\theta r$ before an update and the reference value of the road surface angle $\theta r$ after an update corresponds to the amount of change in the total angle $\theta$ before and after the vehicle 300 moves. With this operation, the amount of change in the total angle $\theta$ while the vehicle is traveling that is estimated to be the amount of change in the road surface angle θr is taken into the reference value of the road surface angle θr.

Alternatively, the angle calculating unit 21041 calculates a difference Δθ1 of the total angle θ (an amount of change in the total angle θ) before and after the vehicle moves when the vehicle is stopping. Then, the angle calculating unit 21041 calculates the new reference value of the road surface angle θr by adding the difference Δθ1 into the reference value of the road surface angle θr (new θr reference value=θr reference value+Δθ1) and updates the reference value of the road surface angle θr. With this operation, the change in the total angle θ while the vehicle is traveling that is estimated to be the change in the road surface angle θr is taken into the reference value of the road surface angle θr. The angle calculating unit 21041 can calculate the difference Δθ1 in the following manner. Specifically, the angle calculating unit 21041 stores the total angle θ immediately before the vehicle starts traveling as the reference value of the total angle θ immediately after the vehicle 300 starts traveling. Then, the angle calculating unit 21041 calculates the difference Δθ1 by subtracting the reference value of the total angle θ from the current total angle θ when the vehicle is stopping. While the vehicle is traveling, the control unit 2104 may or may not derive the total angle θ repeatedly.

In addition, the control unit 2104 drives the leveling actuator 226 to adjust the optical axis angle θo with respect to a change in the total angle θ while the vehicle is at rest. Specifically, the angle calculating unit 21041 repeatedly derives the total angle θ by using a plurality of output values from the tilt sensor 2110 while the vehicle is at rest. The control unit 2104, for example, sets the mean value of the plurality of output values as the total angle θ. The calculated total angle θ is stored into the RAM. Then, the angle calculating unit 21041 obtains the vehicle attitude angle θv by subtracting the reference value of the road surface angle θr from the derived total angle θ (θv=θ−θr reference value). In addition, with the obtained vehicle attitude angle θv serving as a new reference value of the vehicle attitude angle θv, the reference value of the vehicle attitude angle θv stored in the RAM is updated. With this operation, the amount of change in the total angle θ while the vehicle is at rest that is estimated to be the amount of change in the vehicle attitude angle θv is taken into the reference value of the vehicle attitude angle θv.

Alternatively, the angle calculating unit 21041 calculates a difference Δθ2 between the current total angle θ and the stored reference value of the total angle θ (the amount of change in the total angle θ) while the vehicle is at rest. The reference value of the total angle θ used in this case, for example, is the total angle θ obtained when the difference Δθ1 has been calculated in the case of calculating the difference Δθ2 for the first time after the vehicle 300 has stopped (i.e., the total angle θ when the vehicle is stopping) or is the total angle θ obtained when the difference Δθ2 has been calculated in the previous instance in the second and later times. Then, the angle calculating unit 21041 calculates a new reference value of the vehicle attitude angle θv by adding the difference Δθ2 into the reference value of the vehicle attitude angle θv (new θv reference value=θv reference value+Δθ2) and updates the reference value of the vehicle attitude angle θv. With this operation, the change in the total angle θ while the vehicle is at rest that is estimated to be the change in the vehicle attitude angle θv is taken into the reference value of the vehicle attitude angle θv.

Then, the adjustment instructing unit 21042 generates an adjustment signal for the optical axis angle θo by using the calculated vehicle attitude angle θv or the updated new reference value of the vehicle attitude angle θv. For example, the adjustment instructing unit 21042 determines the optical axis angle θo by using a conversion table, recorded in advance in the memory 2108, that maps the values of the vehicle attitude angle θv to the values of the optical axis angle θo and generates the adjustment signal. The adjustment signal is output from the transmission unit 2106 to the leveling actuator 226.

Figure 10:
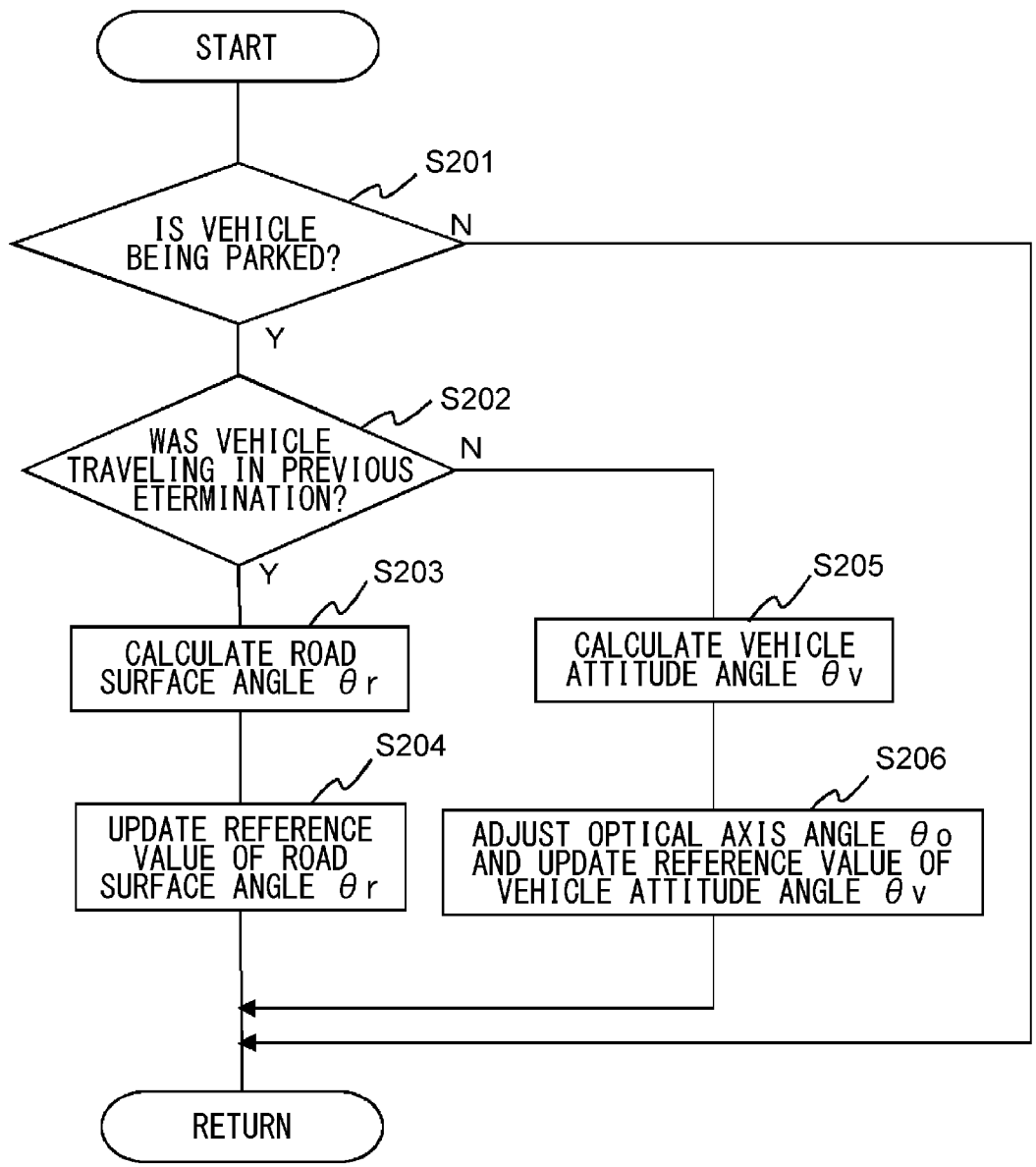
FIG. 10 is a flowchart illustrating an example of self-leveling control executed by a control device for a vehicle lamp according to Embodiment 2.

FIG. 10 is a flowchart illustrating an example of the self-leveling control executed by the control device for a vehicle lamp according to Embodiment 2. This flow is executed repeatedly at a predetermined timing by the control unit 2104, for example, when the ignition switch 308 is turned on in a state in which the instruction to execute the self-leveling control has been issued by the light switch 304 and is terminated when the ignition switch 308 is turned off.

The control unit 2104 determines whether the vehicle 300 is being parked (S201). If the vehicle 300 is not being parked, or in other words, if the vehicle 300 is traveling (N in S201), the control unit 2104 terminates the routine. If the vehicle 300 is being parked (Y in S201), the control unit 2104 determines whether the vehicle 300 was traveling (N in S201) in the parking determination in step S201 in the previous instance of the routine (S202).

If the vehicle was traveling in the previous instance of determination (Y in S202), which means the case "when the vehicle is stopping," the control unit 2104 calculates the road surface angle θr by subtracting the reference value of the vehicle attitude angle θv from the current total angle θ (S203). Then, the new reference value of the road surface angle θr is updated with the obtained road surface angle θr (S204), and the routine is terminated.

If the vehicle was not traveling in the previous instance of determination (N in S202), which means the case "while the vehicle is at rest," the control unit 2104 derives the total angle θ and calculates the vehicle attitude angle θv by subtracting the reference value of the road surface angle θr from the current total angle θ (S205). Then, the optical axis angle θo is adjusted by using the obtained vehicle attitude angle θv, the new reference value is updated with the obtained vehicle attitude angle θv (S206), and the routine is terminated.

Failure Diagnosis of Tilt Sensor 2110

Figure 11A:
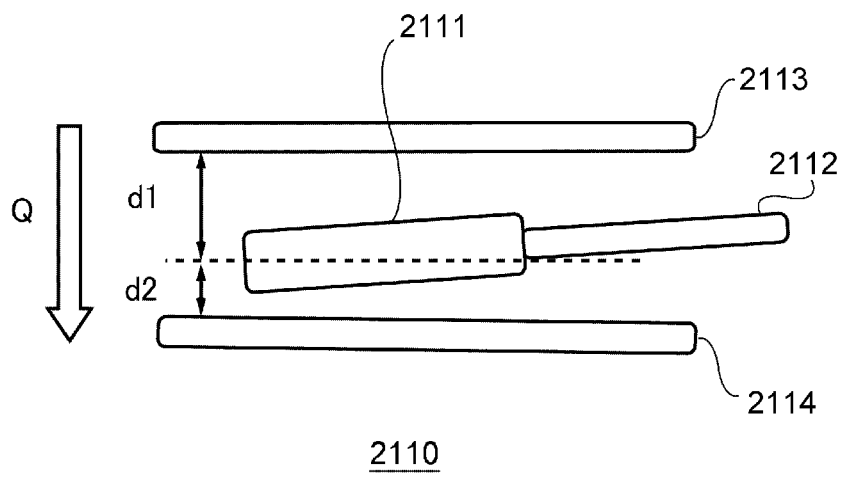
FIG. 11A and FIG. 11B are schematic diagrams for describing a failure diagnosis of a tilt sensor.
Figure 11B:
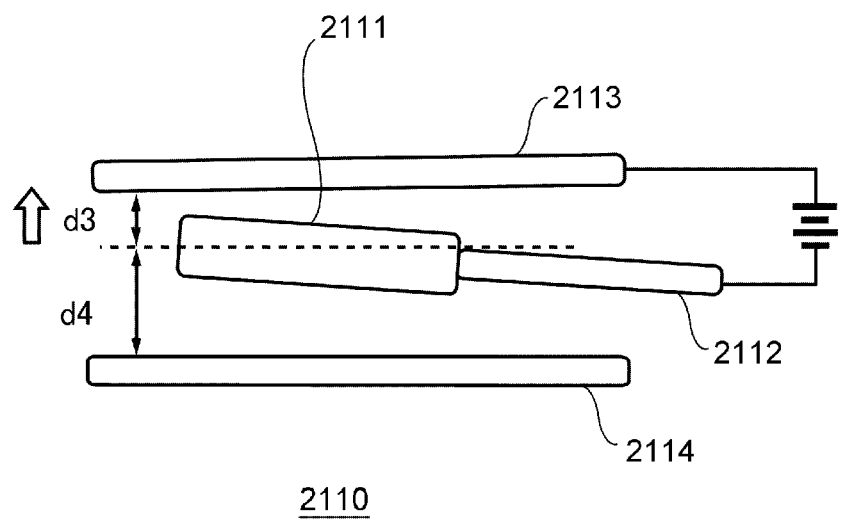
Figure 12:
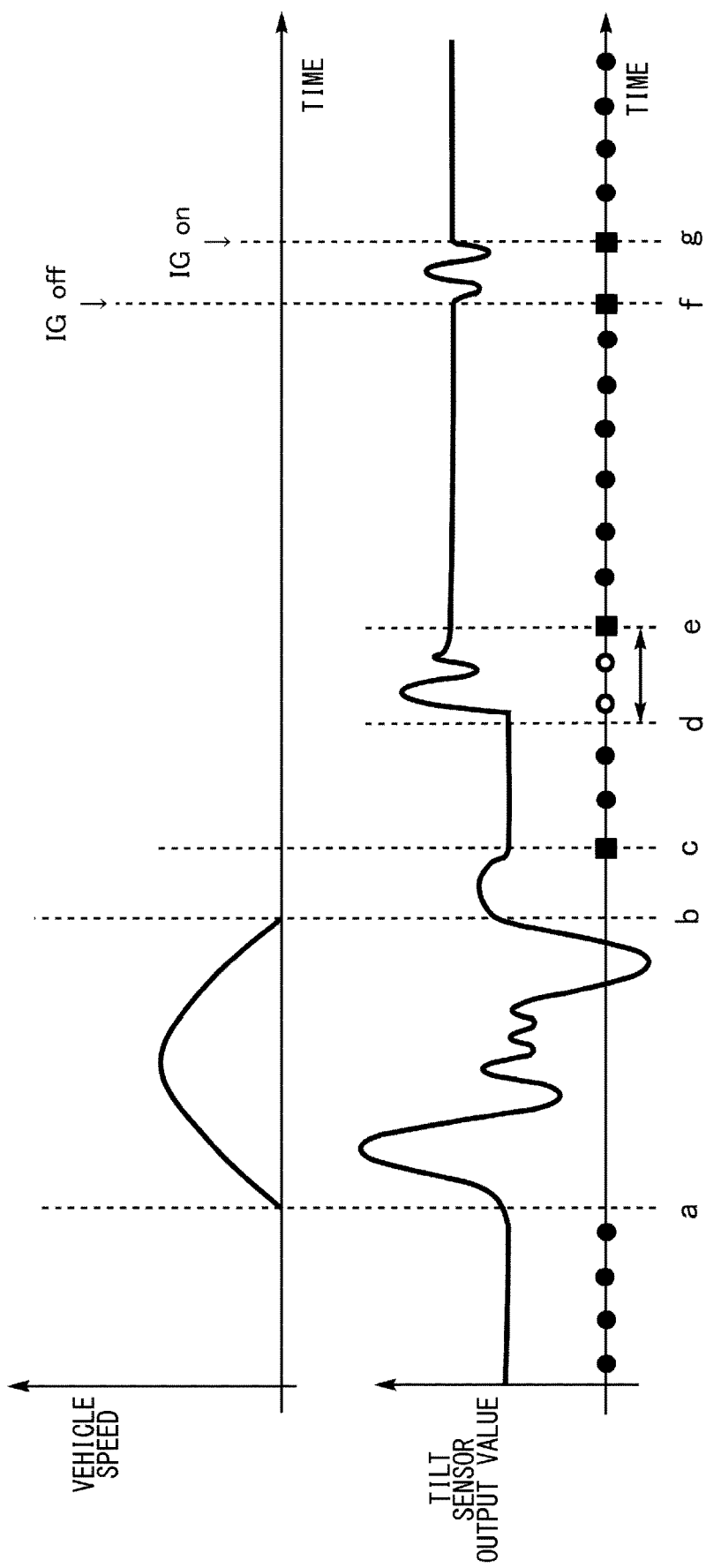
FIG. 12 is a timing chart for describing an execution timing of a failure diagnosis according to Embodiment 2.

The tilt sensor 2110 includes a self-failure-diagnosis function. FIG. 11A and FIG. 11B are schematic diagrams for describing a failure diagnosis of the tilt sensor. FIG. 11A illustrates a normal operation state of the tilt sensor 2110. FIG. 11B illustrates an operation state during a failure diagnosis of the tilt sensor 2110. FIG. 12 is a timing chart for describing the execution timings of the failure diagnosis. The top-and-bottom axis in the upper half indicates the vehicle speed. The top-and-bottom axis in the lower half indicates the total angle. The horizontal axes in the upper half and in the lower half indicate the time. The solid circles (●) in the lower half indicate the execution timings of a periodical diagnosis. The solid rectangles (■) indicate the execution timings of a specific diagnosis. The open circles (○) indicate the timings that fall on the execution timings of the periodical diagnosis but at which the execution of the diagnosis is refrained from because the vehicle 300 is not in a stable state.

The tilt sensor 2110 is, for example, a triaxial acceleration sensor of an electrostatic capacity type and includes a weight portion 2111, a diaphragm 2112 that supports the weight portion 2111, a first electrode 2113, and a second electrode 2114. The first electrode 2113 and the second electrode 2114 are disposed with a space provided therebetween, and the weight portion 2111 and the diaphragm 2112 are disposed between the first electrode 2113 and the second electrode 2114.

As illustrated in FIG. 11A, when the acceleration Q is applied to the tilt sensor 2110 in the normal use condition of the tilt sensor 2110, the acceleration Q acts on the weight portion 2111, which displaces the diaphragm 2112. Thus, the electrostatic capacity between the diaphragm 2112 and the first electrode 2113 and second electrode 2114 changes. The tilt sensor 2110 can detect the acceleration Q applied to the tilt sensor 2110 by detecting the stated change in the electrostatic capacity. The diaphragm 2112 can be displaced in the X-, Y-, and Z-directions of the tilt sensor 2110, and thus the tilt sensor 2110 can detect the accelerations in the X-, Y-, and Z-directions. In FIG. 11A, the diaphragm 2112 and the first electrode 2113 are spaced apart by a distance d1, and the diaphragm 2112 and the second electrode 2114 are spaced apart by a distance d2. The tilt sensor 2110 converts the electrostatic capacity corresponding to the distances d1 and d2 to an electric signal and outputs the electric signal.

The tilt sensor 2110 executes the failure diagnosis upon receiving an execution-instructing signal for the failure diagnosis from the diagnosis instructing unit 21043. In the failure diagnosis, a predetermined voltage is applied across the first electrode 2113 and the second electrode 2114. This forces the diaphragm 2112 to be displaced. Then, the tilt sensor 2110 outputs an electric signal corresponding to the position of the diaphragm 2112 as an output value for the failure diagnosis.

The leveling ECU 2100 stores in advance in the RAM or the memory 2108 a diagnosis table that maps the values of the voltage to be applied to the tilt sensor 2110 to the output values output when the diaphragm 2112 is displaced normally upon the voltage being applied thereto. The failure determining unit 21044 diagnoses a failure of the tilt sensor 2110 by using the output value for the failure diagnosis and the diagnosis table. For example, the failure determining unit 21044 determines that the tilt sensor 2110 is working normally when the output value for the failure diagnosis is equal to the output value to which the applied voltage in the failure diagnosis is mapped in the diagnosis table. In addition, the failure determining unit 21044 determines that a failure has occurred in the tilt sensor 2110 when the output value for the failure diagnosis is not equal to the output value to which the applied voltage is mapped. When the diaphragm 2112 is being damaged or bent due to an impact or the like from the outside, the diaphragm 2112 is not displaced to a proper position corresponding to the applied voltage even if a predetermined voltage is applied. Thus, the failure determining unit 21044 can determine that a failure has occurred in the tilt sensor 2110 when the output value for the failure diagnosis is not equal to the output value to which the applied voltage is mapped in the diagnosis table.

The failure determining unit 21044 may determine a failure of the tilt sensor 2110 on the basis of a plurality of diagnosis results. For example, the failure determining unit 21044 determines that a failure has occurred in the tilt sensor 2110 when the output value for the failure diagnosis takes a value indicating a failure continually a predetermined number of times or more.

In FIG. 11B, a voltage is applied such that the diaphragm 2112 is displaced to a position that is spaced apart from the first electrode 2113 by a distance d3 and spaced apart from the second electrode 2114 by a distance d4. Then, this application of the voltage forces the diaphragm 2112 to be displaced to a position that is spaced apart from the first electrode 2113 by the distance d3 and spaced apart from the second electrode 2114 by the distance d4. The tilt sensor 2110 outputs an electric signal corresponding to this position of the diaphragm 2112 to the failure determining unit 21044 as the output value for the failure diagnosis. In FIG. 11B, the diaphragm 2112 is displaced to the proper position corresponding to the applied voltage. Thus, the output value for the failure diagnosis is equal to the output value to which the applied voltage is mapped in the diagnosis table. Therefore, the failure determining unit 21044 determines that the tilt sensor 2110 is working normally.

Even when the tilt sensor 2110 is a sensor of a type other than the triaxial acceleration sensor of an electrostatic capacity type described above, a failure diagnosis that is suitable for a given type can be executed. Such a failure diagnosis function is well known, and thus detailed descriptions thereof will be omitted.

In a situation in which an acceleration other than the gravitational force is on the tilt sensor 2110 during the failure diagnosis of the tilt sensor 2110, an accurate failure diagnosis becomes difficult due to the influence of this acceleration. Therefore, it is desirable that the failure diagnosis of the tilt sensor 2110 be carried out under the condition in which no acceleration other than the gravitational force is on the tilt sensor 2110. Therefore, the diagnosis instructing unit 21043 outputs an execution-instructing signal for the failure diagnosis when the vehicle 300 is in the stable state in which the amount of change in the output value from the tilt sensor 2110 is no greater than a predetermined amount. Thus, the failure diagnosis of the tilt sensor 2110 can be carried out with higher accuracy. As a result, the possibility of failing to find a failure of the tilt sensor 2110 can be reduced, and thus the accuracy of the self-leveling control of the vehicle lamp can be increased.

In addition, as illustrated in FIG. 12, the diagnosis instructing unit 21043 periodically outputs an execution-instructing signal. Specifically, the diagnosis instructing unit 21043 instructs that the periodical diagnosis of the tilt sensor 2110 be executed. In this manner, as the diagnosis instructing unit 21043 periodically outputs an execution-instructing signal, a failure of the tilt sensor 2110 can be found more promptly.

In FIG. 12, a period of times a to b is a period in which the vehicle is traveling, time c is when the vehicle is stopping, and periods up to time a and after time c are the periods in which the vehicle is at rest. A period of times d to e is a period in which a passenger is getting in or out of the vehicle 300 or luggage is being loaded onto or removed from the vehicle 300. The output value from the tilt sensor 2110 changes from the stable state to the unstable state at time d and changes back to the stable state at time e. Time f corresponds to a point at which the ignition switch 308 enters an off state, and time g corresponds to a point at which the ignition switch 308 enters an on state.

In the present embodiment, the diagnosis instructing unit 21043 executes the periodical diagnosis while the vehicle is at rest (the timings indicated by the solid circles in FIG. 12). However, the diagnosis instructing unit 21043 may also execute the periodical diagnosis while the vehicle is traveling. In addition, the diagnosis instructing unit 21043 refrains from transmitting an execution-instructing signal when the vehicle 300 is in the unstable state in which the amount of change in the output value from the tilt sensor 2110 exceeds a predetermined amount, as in the period of times d to e, even at the execution timing of the diagnosis in the periodical diagnosis. With this operation, the failure diagnosis of the tilt sensor 2110 is refrained from when the vehicle 300 is in the unstable state (the timings indicated by the open circles in FIG. 12).

In addition, the diagnosis instructing unit 21043 executes a specific diagnosis along with the periodical diagnosis. In the specific diagnosis, an execution-instructing signal is output when a predetermined event has occurred in the vehicle 300. Specifically, the diagnosis instructing unit 21043 outputs an execution-instructing signal when a halt of the vehicle 300 is detected, when a passenger getting in or out of the vehicle or luggage being loaded onto or removed from the vehicle is detected, and when a switch between on and off of the ignition switch 308 is detected. The diagnosis instructing unit 21043 outputs an execution-instructing signal when a halt of the vehicle 300 is detected by the halt detecting unit 21045 (time c in FIG. 12). In addition, the diagnosis instructing unit 21043 outputs an execution-instructing signal when the load change detecting unit 21046 detects a passenger getting in or out of the vehicle or luggage being loaded onto or removed from the vehicle (time e in FIG. 12). Furthermore, the diagnosis instructing unit 21043 outputs an execution-instructing signal when the ignition detecting unit 21047 detects the ignition switch 308 being turned off (time f in FIG. 12) and when the ignition detecting unit 21047 detects the ignition switch 308 being turned on (time g in FIG. 12).

In this manner, by executing the specific diagnosis in addition to the periodical diagnosis, a failure of the tilt sensor 2110 can be found more promptly. In addition, there is a high possibility that the vehicle 300 is in the stable state when the halt detecting unit 21045 detects a halt of the vehicle 300, when the load change detecting unit 21046 detects a passenger getting in or out of the vehicle or luggage being loaded onto or removed from the vehicle, and when the ignition detecting unit 21047 detects on/off of the ignition switch 308. Thus, by executing the specific diagnosis, the accuracy of the failure diagnosis of the tilt sensor 2110 can be increased, and the accuracy of the self-leveling control can be increased in turn.

As described above, the output value from the tilt sensor 2110 received by the control unit 2104 includes an output value during a failure diagnosis. The output value during the failure diagnosis is a value corresponding not to the acceleration on the vehicle 300 during the failure diagnosis but to the voltage applied to the tilt sensor 2110. Therefore, the accuracy of the self-leveling control may decrease if the total angle θ is derived by using the output value during the failure diagnosis.

Accordingly, the angle calculating unit 21041 uses the output value excluding an output value during a failure diagnosis when deriving the total angle θ in the self-leveling control. With this configuration, a more accurate total angle θ can be derived, and thus the accuracy of the self-leveling control can be further increased. For example, the tilt sensor 2110 outputs a signal indicating that a failure diagnosis has been executed as well when outputting an output value during a failure diagnosis. The output value during the failure diagnosis is stored into the RAM or the memory 2108 along with the signal indicating that the failure diagnosis has been executed. The angle calculating unit 21041 can determine whether the output value from the tilt sensor 2110 is an output value during a failure diagnosis on the basis of the presence of a signal indicating that the failure diagnosis has been executed.

Alternatively, the diagnosis instructing unit 21043 outputs an execution-instructing signal such that the plurality of output values from the tilt sensor 2110 used in a single instance of deriving a total angle θ in the self-leveling control include an output value during a failure diagnosis in no greater than a predetermined number. For example, the diagnosis instructing unit 21043 outputs an execution-instructing signal such that no greater than one output value during a failure diagnosis is included in the plurality of output values used to derive the total angle θ. Thus, a decrease in the accuracy of deriving the total angle θ can be suppressed when the total angle θ is derived while including an output value during a failure diagnosis. In addition, a decrease in the accuracy of deriving the total angle θ associated with a decrease in the number of output values used to derive the total angle θ can be suppressed when the total angle θ is derived while excluding an output value during a failure diagnosis.

As an example, the adjustment instructing unit 21042 fixes the optical axis angle θo to a current angle or a predetermined reference angle, upon the failure determining unit 21044 detecting a failure of the tilt sensor 2110. Examples of the reference angle include an initial angle and a safe angle. The initial angle is an angle set in the attitude of the vehicle 300 in the initialization processing described above (the attitude in the first state), or in other words, the optical axis angle corresponding to θv=0°. The safe angle is the optical axis angle at which glare caused to others is reduced. The safe angle can be an optical axis angle that aims more downward than the horizontal plane, or for example, that aims in the most downward direction. To which angle the reference angle is set can be determined, as appropriate, from the viewpoint of suppressing glare caused to drivers of other vehicles and improving visibility of the driver of the vehicle.

As described thus far, in the leveling ECU 2100 according to the present embodiment, the diagnosis instructing unit 21043 outputs an execution-instructing signal of a failure diagnosis to the tilt sensor 2110 while the vehicle 300 is in the stable state. Thus, the failure diagnosis of the tilt sensor 2110 can be carried out with higher accuracy. Accordingly, the accuracy of the self-leveling control can be increased. In addition, the diagnosis instructing unit 21043 periodically outputs an execution-instructing signal. Thus, a failure of the tilt sensor 2110 can be found promptly, and thus a situation in which self-leveling control is executed by using the tilt sensor 2110 in which a failure has occurred can be suppressed. Accordingly, the accuracy of the self-leveling control can be further increased.

In addition, the angle calculating unit 21041 derives the total angle θ without using an output value during a failure diagnosis when deriving the total angle θ in the self-leveling control. Alternatively, the diagnosis instructing unit 21043 outputs an execution-instructing signal such that the plurality of output values from the tilt sensor 2110 used in a single instance of deriving the total angle θ include an output value during a failure diagnosis in no greater than a predetermined number. With these configurations, a decrease in the accuracy of deriving the total angle θ can be suppressed, and thus the accuracy of the self-leveling control can be increased.

In addition, the diagnosis instructing unit 21043 outputs an execution-instructing signal when a halt of a vehicle is detected, when a passenger getting in or out of the vehicle or luggage being loaded onto or removed from the vehicle is detected, and when a switch between on and off of the ignition switch is detected. In this manner, as the failure diagnosis is executed at a timing different from that of the periodical diagnosis, a failure of the tilt sensor 2110 can be found more promptly. Accordingly, the accuracy of the self-leveling control can be further increased.

Embodiment 3

A leveling ECU 2100 according to Embodiment 3 has a configuration common to that of the leveling ECU 2100 according to Embodiment 2 except in that the optical axis angle θo is adjusted on the basis of the vehicle attitude angle θv derived from the output value from the tilt sensor 2110 while the vehicle is traveling. Hereinafter, the leveling ECU 2100 according to Embodiment 3 will be described with the description centered on the configuration different from that of Embodiment 2.

In the present embodiment, the angle calculating unit 21041 derives the current vehicle attitude angle θv by using the accelerations in the front-and-back direction and the top-and-bottom direction of the vehicle obtained from the output value from the tilt sensor 2110 while the vehicle is traveling. Hereinafter, a method of deriving the vehicle attitude angle θv that is based on the output value from the tilt sensor 2110 obtained while the vehicle is traveling will be described.

FIG. 4A and FIG. 4B are schematic diagrams for describing a relationship between the direction of the motion acceleration vector of the vehicle and the vehicle attitude angle. FIG. 4A illustrates a state in which the vehicle attitude angle θv is 0°, and FIG. 4B illustrates a state in which the vehicle attitude angle θv has changed from 0°. In addition, in FIG. 4A and FIG. 4B, the motion acceleration vector α produced when the vehicle 300 moves forward and the composite acceleration vector β are indicated by the solid arrows, and the motion acceleration vector α produced when the vehicle 300 reduces its speed or moves backward and the composite acceleration vector β are indicated by the dashed arrows. FIG. 5 is a graph illustrating a relationship between the acceleration in the front-and-back direction of the vehicle and the acceleration in the top-and-bottom direction of the vehicle. It is to be noted that the reference numeral "110" in FIG. 4A and FIG. 4B is replaced with the reference numeral "2110" in the following description.

The vehicle 300 moves parallel to the road surface. Thus, the motion acceleration vector α is a vector parallel to the road surface regardless of the vehicle attitude angle θv. In addition, as illustrated in FIG. 4A, when the vehicle attitude angle θv of the vehicle 300 is 0°, theoretically, the front-and-back axis L of the vehicle 300 (or the X-axis of the tilt sensor 2110) is parallel to the road surface. Thus, the motion acceleration vector α is a vector parallel to the front-and-back axis L of the vehicle 300. Thus, when the magnitude of the motion acceleration vector α changes in association with the acceleration and deceleration of the vehicle 300, the trajectory of the leading end of the composite acceleration vector β, detected by the tilt sensor 2110 is a straight line parallel to the front-and-back axis L of the vehicle 300.

Meanwhile, as illustrated in FIG. 4B, when the vehicle attitude angle θv is not 0°, the front-and-back axis L of the vehicle 300 is inclined relative to the road surface, and thus the motion acceleration vector α is a vector extending diagonally relative to the front-and-back axis L of the vehicle 300. Then, the trajectory of the leading end of the composite acceleration vector β when the magnitude of the motion acceleration vector α changes in association with the acceleration or deceleration of the vehicle 300 is a straight line inclined relative to the front-and-back axis L of the vehicle 300.

When the output values from the tilt sensor 2110 obtained while the vehicle is traveling are plotted onto the coordinates in which the acceleration in the front-and-back direction of the vehicle is set in a first axis (X-axis) and the acceleration in the top-and-bottom direction of the vehicle is set in a second axis (Z-axis), the result illustrated in FIG. 5 can be obtained. In FIG. 5, points $t_{A1}$ to $t_{An}$ are the detection values at times $t_1$ to $t_n$ in the state illustrated in FIG. 4A. Points $t_{B1}$ to $t_{Bn}$ are the detection values at times $t_1$ to $t_n$ in the state illustrated in FIG. 4B. Plotting of these output values includes plotting of the acceleration values on the vehicle coordinate system obtained from the output values from the tilt sensor 2110.

The vehicle attitude angle θv can be derived by deriving either a straight line or a vector from at least two points plotted in this manner and by obtaining the slope of either the straight line or the vector. For example, linear approximation equations A and B are obtained by using the least-squares method, the moving-average method, or the like on the plurality of plotted points $t_{A1}$ to $t_{An}$ and $t_{B1}$ to $t_{Bn}$, and the slopes of the linear approximation equations A and B are calculated. When the vehicle attitude angle θv is 0°, the linear approximation equation A that is parallel to the x-axis can be obtained from the output values from the tilt sensor 2110. In other words, the slope of the linear approximation equation A is 0. In contrast, when the vehicle attitude angle θv is not 0°, the linear approximation equation B having a slope corresponding to the vehicle attitude angle θv can be obtained from the output values from the tilt sensor 2110. Thus, the angle formed by the linear approximation equation A and the linear approximation equation B ($\theta_{AB}$ in FIG. 5) or the slope of the linear approximation equation B serves as the vehicle attitude angle θv. Therefore, the vehicle attitude angle θv can be derived from the slope of either a straight line or a vector obtained by plotting the output values from the tilt sensor 2110 while the vehicle is traveling.

Accordingly, the angle calculating unit 21041 plots the output values from the tilt sensor 2110 obtained while the vehicle is traveling onto the coordinates in which the acceleration in the front-and-back direction of the vehicle is set in the first axis and the acceleration in the top-and-bottom direction of the vehicle is set in the second axis. Then, the vehicle attitude angle θv is derived by using the slope of either a straight line or a vector obtained from the plurality of plotted points. Then, the adjustment instructing unit 21042 outputs an adjustment signal by using the derived vehicle attitude angle θv.

For example, the angle calculating unit 21041 starts the processing of deriving the vehicle attitude angle θv described above upon determining that the vehicle 300 is traveling on the basis of the output value from the vehicle-speed sensor 312. The output value from the tilt sensor 2110 is transmitted to the control unit 2104 repeatedly at a predetermined time interval and is stored into the RAM or the memory 2108. Then, the angle calculating unit 21041 plots the output values from the tilt sensor 2110 onto the coordinates described above and derives either a straight line or a vector when the number of the output values has reached a predetermined number required for a single instance of deriving either a straight line or a vector. Alternatively, the angle calculating unit 21041 may plot the output values onto the coordinates each time the angle calculating unit 21041 receives an output value from the tilt sensor 2110 and may derive either a straight line or a vector when the number of the plotted points has reached a number required for a single instance of deriving either a straight line or a vector.

Failure Diagnosis of Tilt Sensor 2110

Figure 13:
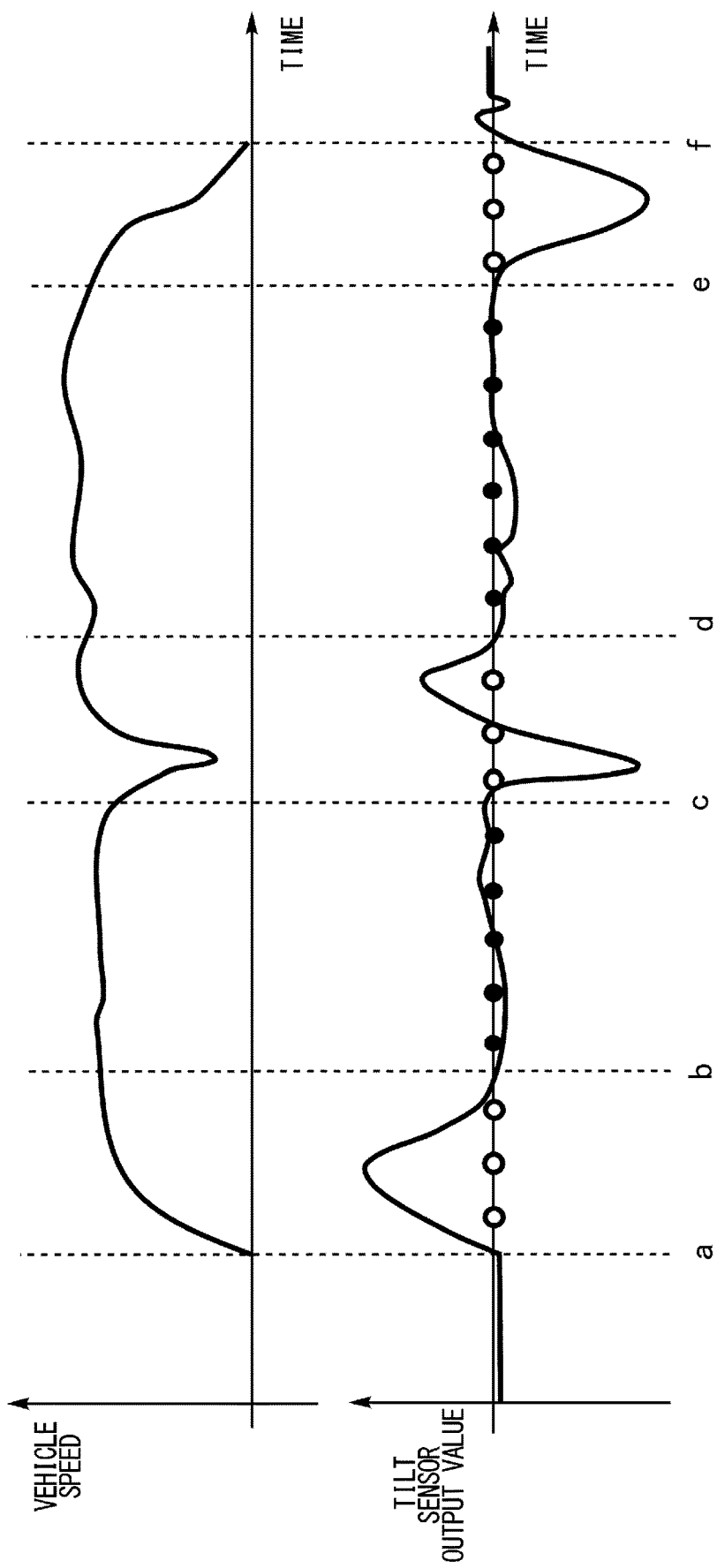
FIG. 13 is a timing chart for describing an execution timing of a failure diagnosis according to Embodiment 3.

The tilt sensor 2110 includes a failure diagnosis function similar to that of Embodiment 2. FIG. 13 is a timing chart for describing the execution timings of the failure diagnosis.

The top-and-bottom axis in the upper half indicates the vehicle speed. The top-and-bottom axis in the lower half indicates the total angle. The horizontal axes in the upper half and in the lower half indicate the time. The solid circles (●) in the lower half indicate the execution timings of a periodical diagnosis. The open circles (○) indicate the timings that fall on the execution timings of the periodical diagnosis but at which the execution of the diagnosis is refrained from because the vehicle 300 is not in the stable state.

In the present embodiment, similarly to Embodiment 2, the diagnosis instructing unit 21043 outputs an execution-instructing signal for the failure diagnosis when the vehicle 300 is in the stable state in which the amount of change in the output value from the tilt sensor 2110 is no greater than a predetermined amount. Thus, the failure diagnosis of the tilt sensor 2110 can be carried out with higher accuracy. As a result, the accuracy of the self-leveling control of the vehicle lamp can be increased.

In addition, as illustrated in FIG. 13, the diagnosis instructing unit 21043 periodically outputs an execution-instructing signal. As the diagnosis instructing unit 21043 periodically outputs an execution-instructing signal, a failure of the tilt sensor 2110 can be found more promptly. In FIG. 13, a period of times a to f is a period in which the vehicle is traveling. Periods of times a to b, c to d, and e to f are periods in which the vehicle 300 is in the unstable state. In the present embodiment, the diagnosis instructing unit 21043 executes the periodical diagnosis while the vehicle is traveling (the timings indicated by the solid circles in FIG. 13). However, the diagnosis instructing unit 21043 may also execute the periodical diagnosis while the vehicle is at rest. In addition, the diagnosis instructing unit 21043 refrains from transmitting an execution-instructing signal when the output value from the tilt sensor 2110 is in the unstable state, as in the periods of times a to b, c to d, and e to f, at the execution timing of the diagnosis in the periodical diagnosis. Thus, the failure diagnosis of the tilt sensor 2110 is refrained from when the vehicle 300 is in the unstable state (the timings indicated by the open circles in FIG. 13).

The diagnosis instructing unit 21043 may determine that the vehicle 300 is in the stable state on the basis of not only the amount of change in the output value from the tilt sensor 2110 but also the output value from the steering sensor 310, the vehicle-speed sensor 312, a yaw-rate sensor, an accelerator sensor that detects an accelerator pedal being stepped on, a brake sensor that detects a brake pedal being stepped on, a shift position sensor, or the like. Alternatively, in place of the amount of change in the output value from the tilt sensor 2110, whether the vehicle 300 is in the stable state may be estimated on the basis of the output values from the stated sensors.

The output value from the tilt sensor 2110 received by the control unit 2104 includes an output value during a failure diagnosis. In contrast, the angle calculating unit 21041 uses the output value excluding an output value during a failure diagnosis when deriving the vehicle attitude angle θv in the self-leveling control. Thus, a more accurate total angle θ can be derived, and thus the accuracy of the self-leveling control can be further increased.

Alternatively, the diagnosis instructing unit 21043 outputs an execution-instructing signal such that the plurality of output values from the tilt sensor 2110 used in a single instance of deriving the vehicle attitude angle θv in the self-leveling control include an output value during a failure diagnosis in no greater than a predetermined number. For example, the diagnosis instructing unit 21043 outputs an execution-instructing signal such that no greater than one output value during a failure diagnosis is included in the plurality of output values used to derive the total angle θ. Thus, a decrease in the accuracy of deriving the vehicle attitude angle θv can be suppressed when the vehicle attitude angle θv is derived while including an output value during a failure diagnosis. In addition, a decrease in the accuracy of deriving the vehicle attitude angle θv associated with a decrease in the number of output values used to derive the vehicle attitude angle θv can be suppressed when the vehicle attitude angle θv is derived while excluding an output value during a failure diagnosis.

The present invention is not limited to Embodiments 2 and 3 described above. It is also possible to combine Embodiments 2 and 3, or modifications, including various design changes, can be made on the basis of the knowledge of a person skilled in the art. An embodiment obtained through such combinations or with such modifications is also encompassed by the scope of the present invention. A new embodiment conceived of by combining Embodiments 2 and 3 described above or by combining Embodiments 2 and 3 described above and a modification has effects of each of Embodiments 2 and 3 and the modification that are combined.

Modification 2

A leveling ECU 2100 according to Modification 2 executes the self-leveling control described in Embodiment 2 (hereinafter, this control is referred to as first control) and the self-leveling control described in Embodiment 3 (hereinafter, this control is referred to as second control) in combination.

For example, the control unit 2104 executes the first control as basic control. In the first control, an adjustment signal is output with respect to a change in the total angle θ while the vehicle is at rest, and the vehicle attitude angle θv obtained by including an amount of change in the stated total angle θ into the reference value of the vehicle attitude angle θv is stored as a new reference value. In addition, the optical axis angle is maintained with respect to a change in the total angle θ while the vehicle is traveling, and the road surface angle θr obtained by including the amount of change in the stated total angle θ into the reference value of the road surface angle θr is stored as a new reference value.

In addition, the control unit 2104 executes the second control while the vehicle is traveling. In the second control, the output values from the tilt sensor 2110 obtained while the vehicle is traveling are plotted onto the coordinates in which the acceleration in the front-and-back direction of the vehicle is set in a first axis and the acceleration in the top-and-bottom direction of the vehicle is set in a second axis, and the vehicle attitude angle θv is derived by using the slope of either a straight line or a vector obtained from the plurality of plotted points. Then, the control unit 2104 corrects the reference value of the vehicle attitude angle θv on the basis of the vehicle attitude angle θv obtained in the second control. For example, the control unit 2104 replaces the reference value of the vehicle attitude angle θv with the vehicle attitude angle θv obtained in the second control. Alternatively, the control unit 2104 corrects the reference value of the vehicle attitude angle θv so as to approach the vehicle attitude angle θv obtained in the second control. Furthermore, the optical axis angle θo is corrected on the basis of the vehicle attitude angle θv obtained in the second control.

In the present modification as well, a failure diagnosis of the tilt sensor 2110 similar to those of Embodiments 2 and 3 is carried out. In addition, the way in which an output value during a failure diagnosis is handled is similar to those of Embodiments 2 and 3. The failure determining unit 21044 may determine a failure of the tilt sensor 2110 by combining the result of a failure diagnosis executed while the vehicle is at rest and the result of a failure diagnosis carried out while the vehicle is traveling.

In Embodiments 2 and 3 and Modification 2 described above, the specific diagnosis may be executed on the basis of only one or two of a halt of the vehicle, a passenger getting in or out of the vehicle or luggage being loaded onto or removed from the vehicle, and a switch between on and off of the ignition switch 308. In other words, the specific diagnosis is executed on the basis of at least one of a halt of the vehicle, a passenger getting in or out of the vehicle or luggage being loaded onto or removed from the vehicle, and a switch between on and off of the ignition switch 308.

In Embodiments 2 and 3 and Modification 2 described above, the diagnosis instructing unit 21043 refrains from outputting an execution-instructing signal while the vehicle 300 is in the unstable state. However, this configuration is not a limiting example, and the diagnosis instructing unit 21043 may output an execution-instructing signal even when the vehicle 300 is in the unstable state but the failure determining unit 21044 may refrain from determining a failure by using the output value for the failure diagnosis obtained in the unstable state.

It is to be noted that the invention according to Embodiments 2 and 3 and Modification 2 described above may be specified by the item described hereinafter.

Item 2

A vehicle lamp system, comprising:
a vehicle lamp with an adjustable optical axis;
a tilt sensor having a self-failure-diagnosis function; and
a control device that controls an adjustment of an optical axis angle of the vehicle lamp, wherein
the control device includes
a reception unit that receives a signal indicating an output value from the tilt sensor, and
a control unit that derives either an angle of inclination of a vehicle or an amount of change in the angle by using the output value from the tilt sensor and that outputs an adjustment signal for an optical axis angle of the vehicle lamp,
the control unit including a diagnosis instructing unit that outputs to the tilt sensor an execution-instructing signal of a failure diagnosis,
the diagnosis instructing unit outputting the execution-instructing signal when the vehicle is in a stable state in which an amount of change in the output value is no greater than a predetermined amount.

Embodiment 4

FIG. 1 is a schematic vertical sectional view of a headlamp unit that includes a vehicle lamp to be controlled by a control device according to Embodiment 4. A headlamp unit 210 and a lamp unit 10 according to the present embodiment have structures similar to those of the first embodiment.

Figure 14:
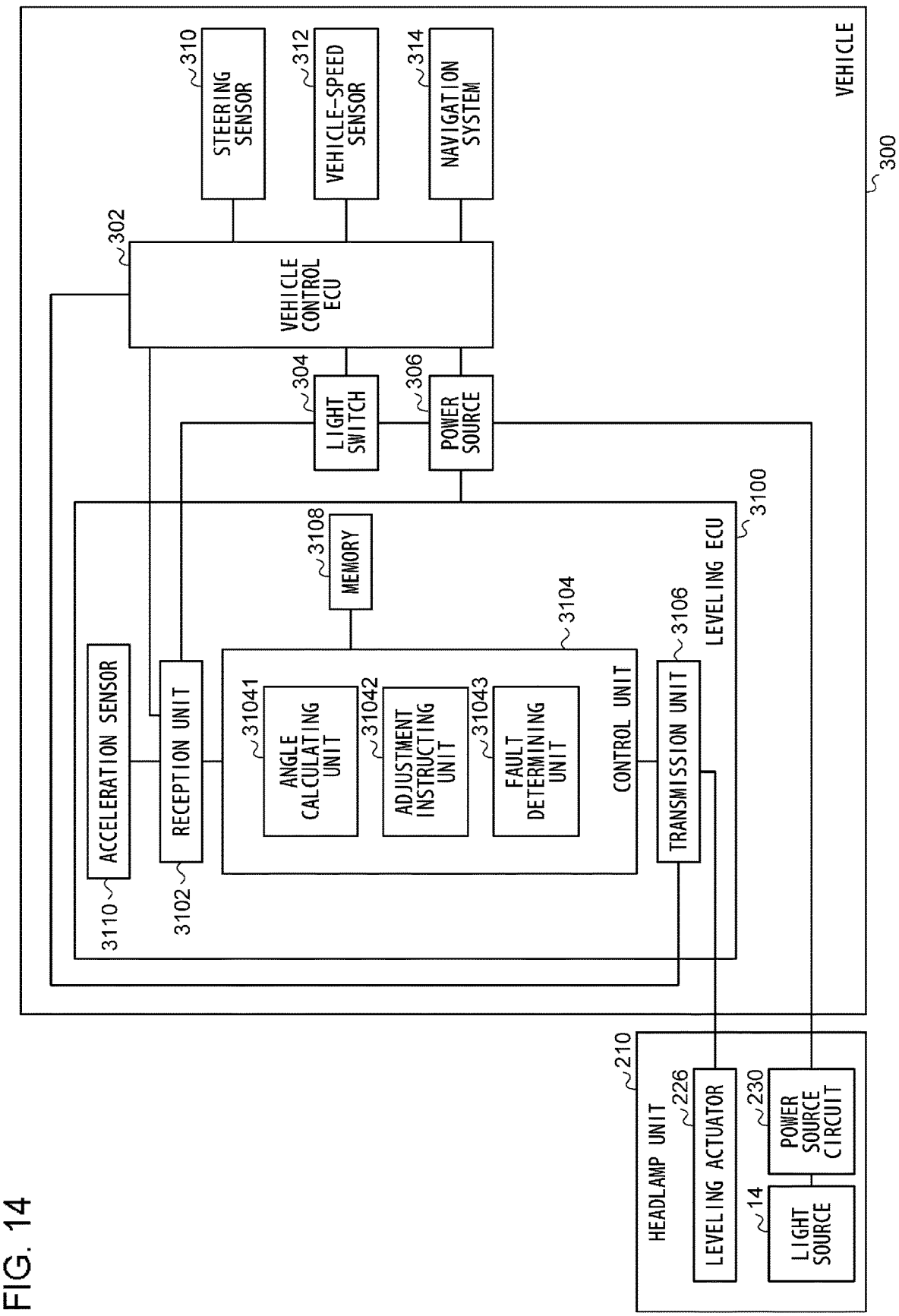
FIG. 14 is a functional block diagram illustrating cooperation of a headlamp unit, a vehicle control ECU, and a leveling ECU according to Embodiment 4.

FIG. 14 is a functional block diagram illustrating cooperation of a headlamp unit, a vehicle control ECU, and a leveling ECU. In FIG. 14, a headlamp unit 210R and a headlamp unit 210L are indicated collectively as the headlamp unit 210. A leveling ECU 3100 and a vehicle control ECU 302 are implemented by elements such as a CPU and a memory of a computer and circuits in terms of the hardware configuration and are implemented by a computer program or the like in terms of the software configuration, and the leveling ECU 3100 and the vehicle control ECU 302 are depicted as functional blocks implemented through cooperation of the above in FIG. 14. Thus, it is to be understood by a person skilled in the art that these functional blocks can be implemented in a variety of forms through combinations of hardware and software.

The leveling ECU 3100, which serves as a control device for a vehicle lamp, includes a reception unit 3102, a control unit 3104, a transmission unit 3106, a memory 3108, and an acceleration sensor 3110. The leveling ECU 3100 is installed, for example, in the vicinity of the dashboard of a vehicle 300. The position at which the leveling ECU 3100 is installed is not particularly limited, and the leveling ECU 3100 may be provided, for example, inside the headlamp unit 210. In addition, the acceleration sensor 3110 may be provided outside the leveling ECU 3100. The vehicle control ECU 302, a light switch 304, and so on are connected to the leveling ECU 3100. Signals output from the vehicle control ECU 302, the light switch 304, and so on are received by the reception unit 3102. The reception unit 3102 also receives a signal indicating an output value from the acceleration sensor 3110.

A steering sensor 310, a vehicle-speed sensor 312, a navigation system 314, and so on are connected to the vehicle control ECU 302. Signals output from these sensors are received by the reception unit 3102 of the leveling ECU 3100 via the vehicle control ECU 302. The vehicle-speed sensor 312 is a sensor that calculates the speed of the vehicle 300 on the basis of the number of rotations of the wheels, for example. The light switch 304 transmits a signal instructing that the headlamp unit 210 be turned on/off in accordance with the content of operation by the driver, a signal instructing that self-leveling control be executed, or the like to a power source 306, the vehicle control ECU 302, the leveling ECU 3100, and so on.

A signal received by the reception unit 3102 is transmitted to the control unit 3104. The control unit 3104 executes self-leveling control of deriving either the angle of inclination of the vehicle 300 or the amount of change in the angle by using the output value from the acceleration sensor 3110 and outputting an adjustment signal for the pitch angle of the optical axis O of the lamp unit 10 (hereinafter, this angle is referred to as the optical axis angle $\theta o$, as appropriate). The control unit 3104 includes an angle calculating unit 31041, an adjustment instructing unit 31042, and a fault determining unit 31043.

The angle calculating unit 31041 generates pitch angle information of the vehicle 300 by using the output value from the acceleration sensor 3110 and, as necessary, information stored in a RAM (not illustrated) included in the leveling ECU 3100. The adjustment instructing unit 31042 generates an adjustment signal instructing that the optical axis angle $\theta o$ of the lamp unit 10 be adjusted on the basis of the pitch angle information generated by the angle calculating unit 31041. The control unit 3104 outputs the adjustment signal generated by the adjustment instructing unit 31042 to a leveling actuator 226 via the transmission unit 3106. The leveling actuator 226 operates in accordance with the received adjustment signal, and the optical axis O of the lamp unit 10 in the pitch angle direction is adjusted accordingly. The fault determining unit 31043 determines a fault of the acceleration sensor 3110 by using the output value from the vehicle-speed sensor 312 and the output value from the acceleration sensor 3110. The operation of each of the units included in the control unit 3104 and the fault determination of the acceleration sensor 3110 will be described later in detail.

The power source 306 that supplies power to the leveling ECU 3100, the vehicle control ECU 302, and the headlamp unit 210 is mounted in the vehicle 300. Upon an instruction to turn on the headlamp unit 210 being issued through the operation of the light switch 304, power is supplied to a light source 14 from the power source 306 via a power source circuit 230. Power is supplied from the power source 306 to the leveling ECU 3100 when an ignition switch is on, and the power supply is shut off when the ignition switch is off.

Self-Leveling Control

Subsequently, the self-leveling control of the leveling ECU 3100 having the above-described configuration will be described in detail. FIG. 15 is a schematic diagram for describing a relationship between the sensor coordinate system and the vehicle coordinate system. In FIG. 15, the diagram on the left side illustrates the vehicle coordinate system, the diagram in the middle illustrates the sensor coordinate system, and the diagram on the right side illustrates the sensor coordinate system and the vehicle coordinate system in a state in which the acceleration sensor 3110 is mounted in the vehicle 300. FIG. 3 is a schematic diagram for describing the acceleration vector produced in the vehicle and the angle of inclination of the vehicle that can be detected by the acceleration sensor.

For example, when luggage is in the trunk in the back side of the vehicle or when a passenger is in the backseat, the vehicle has a backward-tilted attitude. Meanwhile, when luggage is removed from the trunk or when a passenger in the backseat gets out of the vehicle, the vehicle enters a more forward-tilted state than that of the backward-tilted attitude. When the vehicle 300 has a backward-tilted attitude or a forward-tilted attitude, the direction in which the lamp unit 10 shines varies in the top-and-bottom direction accordingly, and the forward range increases or decreases. Thus, the leveling ECU 3100 derives the angle of inclination of the vehicle 300 in the pitch direction or the change in the angle of inclination from the output value from the acceleration sensor 3110 and brings the optical axis angle θo to an angle corresponding to the attitude of the vehicle. Carrying out the self-leveling control of adjusting the leveling of the lamp unit 10 in real time on the basis of the attitude of the vehicle makes it possible to adjust the range of the forward irradiation light to an optimum even when the attitude of the vehicle changes.

As illustrated in FIG. 15, the acceleration sensor 3110 is a triaxial acceleration sensor that includes an X-axis $S_X$, a Y-axis $S_Y$, and a Z-axis $S_Z$ that are orthogonal to one another and that detects the acceleration along each of the axes. In addition, the vehicle 300 includes a front-and-back axis $V_X$, a right-and-left axis $V_Y$, and a top-and-bottom axis $V_Z$ that determine the attitude of the vehicle 300. The acceleration sensor 3110 is attached to the vehicle 300 such that the sensor coordinate system coincides with the vehicle coordinate system of the vehicle 300. Specifically, the positional relationship between the acceleration sensor 3110 and the vehicle 300 is determined such that the X-axis $S_X$ and the front-and-back axis $V_X$ are parallel to each other, the Y-axis $S_Y$ and the right-and-left axis $V_Y$ are parallel to each other, and the Z-axis $S_Z$ and the top-and-bottom axis $V_Z$ are parallel to each other. Then, the acceleration sensor 3110 detects the acceleration vector produced in the vehicle 300.

The gravitational acceleration and the motion acceleration produced through the movement of the vehicle 300 are produced in the traveling vehicle 300. Thus, as illustrated in FIG. 3, the acceleration sensor 3110 can detect a composite acceleration vector β in which the gravitational acceleration vector G and the motion acceleration vector α are combined.

In addition, while the vehicle 300 is at rest, the acceleration sensor 3110 can detect the gravitational acceleration vector G. The acceleration sensor 3110 outputs the numerical value of each of the axial components of the detected acceleration vector. As described above, the coordinate system of the acceleration sensor 3110 and the coordinate system of the vehicle 300 coincide with each other, and thus the numerical values of the axial components on the sensor coordinate system output from the acceleration sensor 3110 serve, unmodified, as the numerical values of the respective axial components of the vehicle coordinate system.

The inclination of the vehicle 300 relative to the gravitational acceleration vector G can be derived from the output value from the acceleration sensor 3110 while the vehicle is at rest. Specifically, the total angle θ, which is the angle of inclination of the vehicle 300 relative to the horizontal plane, including the road surface angle θr, which is the angle of inclination of the road surface relative to the horizontal plane, and the vehicle attitude angle θv, which is the angle of inclination of the vehicle 300 relative to the road surface, is derivable from the output value from the acceleration sensor 3110. The road surface angle θr, the vehicle attitude angle θv, and the total angle θ are the angles in the pitch direction of the vehicle 300.

The self-leveling control aims to keep the forward range of the irradiation light to an optimum by absorbing a change in the forward range of the vehicle lamp associated with a change in the angle of inclination of the vehicle 300 in the pitch direction. Therefore, the angle of inclination of the vehicle 300 required in the self-leveling control is the vehicle attitude angle θv. Specifically, in the self-leveling control, it is desirable that the optical axis angle θo of the lamp unit 10 be adjusted when the vehicle attitude angle θv has changed and that the optical axis angle θo of the lamp unit 10 be maintained when the road surface angle θr has changed. In order to achieve this, information on the vehicle attitude angle θv needs to be extracted from the total angle θ.

Basic Control

In this respect, as basic control in self-leveling, the control unit 3104 estimates that a change in the total angle θ while the vehicle is traveling is a change in the road surface angle θr and that a change in the total angle θ while the vehicle is at rest is a change in the vehicle attitude angle θv and derives the vehicle attitude angle θv from the total angle θ. While the vehicle is traveling, a change in the vehicle attitude angle θv caused by a change in the load or in the number of passengers rarely occurs, and thus it can be estimated that a change in the total angle θ while the vehicle is traveling is a change in the road surface angle θr. In addition, a change in the road surface angle θr caused by the movement of the vehicle 300 rarely occurs while the vehicle is at rest, and thus it can be estimated that a change in the total angle θ while the vehicle is at rest is a change in the vehicle attitude angle θv.

First, at a manufacturing plant of a vehicle manufacturer, a service facility of an auto dealer, or the like, for example, the vehicle 300 is placed on a road surface designed to be parallel to the horizontal plane (hereinafter, this road surface is referred to as a referential road surface, as appropriate), and this state is set as a referential state. In the referential state, the vehicle 300 is in a state in which one passenger is in the driver's seat. Then, an initialization signal is transmitted through a switch operation of an initialization processing apparatus at the plant, communication on a CAN (Controller Area Network) system, or the like. Upon receiving the initialization signal, the control unit 3104 executes predetermined initialization processing. In the initialization processing, an initial aiming adjustment is carried out, and the optical axis O of the lamp unit 10 is made to match an initial angle. In addition, the angle calculating unit 31041 of the control unit 3104 stores the output value from the acceleration sensor 3110 in the referential state into the RAM as a reference value of the road surface angle θr (θr=0°) and a reference value of the vehicle attitude angle θv (θv=0°). In addition, the angle calculating unit 31041 writes these reference values into the memory 3108, as necessary.

Then, the control unit 3104 drives the leveling actuator 226 to adjust the optical axis angle θo with respect to a change in the total angle θ while the vehicle is at rest. Aside from this, the control unit 3104 stores, as a new reference value, the vehicle attitude angle θv obtained by including the amount of the stated change in the total angle θ into the stored reference value of the vehicle attitude angle θv. In addition, the control unit 3104 refrains from driving the leveling actuator 226 with respect to a change in the total angle θ while the vehicle is traveling. Aside from this, the control unit 3104 stores, as a new reference value, the road surface angle θr obtained by including the amount of the stated change in the total angle θ into the stored reference value of the road surface angle θr.

For example, in a condition in which the vehicle 300 is actually used, the angle calculating unit 31041 avoids generation or output of an adjustment signal or outputs a maintaining signal instructing that the optical axis angle θo be maintained with respect to a change in the total angle θ while the vehicle is traveling and thus refrains from driving the leveling actuator 226. Then, the angle calculating unit 31041 calculates the current total angle θ (when the vehicle is stopping) from the output value from the acceleration sensor 3110 when the vehicle is stopping. Subsequently, the angle calculating unit 31041 obtains the road surface angle θr by subtracting the reference value of the vehicle attitude angle θv from the current total angle θ (θr=θ−θv reference value). Then, with the obtained road surface angle θr serving as a new reference value of the road surface angle θr, the reference value of the road surface angle θr stored in the RAM is updated. The difference between the reference value of the road surface angle θr before an update and the reference value of the road surface angle θr after an update corresponds to the amount of change in the total angle θ before and after the vehicle 300 moves. Thus, the amount of change in the total angle θ while the vehicle is traveling that is estimated to be the amount of change in the road surface angle θr is taken into the reference value of the road surface angle θr.

Alternatively, the angle calculating unit 31041 calculates a difference Δθ1 in the total angle θ (an amount of change in the total angle θ) before and after the vehicle moves when the vehicle is stopping. Then, the angle calculating unit 31041 calculates a new reference value of the road surface angle θr by adding the difference Δθ1 into the reference value of the road surface angle θr (new θr reference value=θr reference value+Δθ1) and updates the reference value of the road surface angle θr. With this operation, the change in the total angle θ while the vehicle is traveling that is estimated to be the change in the road surface angle θr is taken into the reference value of the road surface angle θr. The angle calculating unit 31041 can calculate the difference Δθ1 in the following manner. Specifically, the angle calculating unit 31041 stores the total angle θ immediately before the vehicle starts traveling as the reference value of the total angle θ immediately after the vehicle 300 starts traveling. Then, the angle calculating unit 31041 calculate the difference Δθ1 by subtracting the reference value of the total angle θ from the current total angle θ when the vehicle is stopping.

In addition, the control unit 3104 generates and outputs an adjustment signal for the optical axis angle θo of the lamp unit 10 with respect to a change in the total angle θ while the vehicle is at rest and thus drives the leveling actuator 226. Specifically, while the vehicle is at rest, the angle calculating unit 31041 calculates the current total angle θ repeatedly at predetermined timings from the output value from the acceleration sensor 3110. The calculated total angle θ is stored into the RAM. Then, the angle calculating unit 31041 obtains the vehicle attitude angle θv by subtracting the reference value of the road surface angle θr from the current total angle θ (θv=θ−θr reference value). In addition, with the obtained vehicle attitude angle θv serving as a new reference value of the vehicle attitude angle θv, the reference value of the vehicle attitude angle θv stored in the RAM is updated. With this operation, the amount of change in the total angle θ while the vehicle is at rest that is estimated to be the amount of change in the vehicle attitude angle θv is taken into the reference value of the vehicle attitude angle θv.

Alternatively, the angle calculating unit 31041 calculates a difference Δθ2 between the current total angle θ and the stored reference value of the total angle θ (the amount of change in the total angle θ) while the vehicle is at rest. The reference value of the total angle θ used in this case is, for example, the total angle θ obtained when the difference Δθ1 has been calculated in the case of calculating the difference Δθ2 for the first time after the vehicle 300 has stopped (i.e., the total angle θ when the vehicle is stopping) or is the total angle θ obtained when the difference Δθ2 has been calculated in the previous instance in the second and later times. Then, the angle calculating unit 31041 calculates a new reference value of the vehicle attitude angle θv by adding the difference Δθ2 into the reference value of the vehicle attitude angle θv (new θv reference value=θv reference value+Δθ2) and updates the reference value of the vehicle attitude angle θv. With this operation, the change in the total angle θ while the vehicle is at rest that is estimated to be the change in the vehicle attitude angle θv is taken into the reference value of the vehicle attitude angle θv.

Then, the adjustment instructing unit 31042 generates an adjustment signal for the optical axis angle θo on the basis of the calculated vehicle attitude angle θv or the updated new reference value of the vehicle attitude angle θv. For example, the adjustment instructing unit 31042 determines the optical axis angle θo by using a conversion table, recorded in advance in the memory 3108, that maps the values of the vehicle attitude angle θv to the values of the optical axis angle θo and generates the adjustment signal. The adjustment signal is output from the transmission unit 3106 to the leveling actuator 226.

Correction Processing

As described above, in the basic control of self-leveling, the reference value of the vehicle attitude angle θv or the road surface angle θr is subtracted from the total angle θ, and the reference value is updated repeatedly. Alternatively, the difference Δθ1 of the change in the total angle θ is added into the reference value of the road surface angle θr, and the difference Δθ2 is added into the reference value of the vehicle attitude angle θv; thus, the reference value is updated repeatedly. Thus, the changes in the road surface angle θr and the vehicle attitude angle θv are taken into the respective reference values. When the reference value of the road surface angle θr and the reference value of the vehicle attitude angle θv are overwritten repeatedly in this manner, the detection error or the like of the acceleration sensor 3110 accumulates in the reference values, and the accuracy of the self-leveling control may decrease. Thus, the leveling ECU 3100 executes the processing of correcting the reference value and the optical axis angle θo described hereinafter.

FIG. 4A and FIG. 4B are schematic diagrams for describing the relationship between the direction of the motion acceleration vector of the vehicle and the vehicle attitude angle. FIG. 4A illustrates a state in which the vehicle attitude angle θv is 0°, and FIG. 4B illustrates a state in which the vehicle attitude angle θv has changed from 0°. In addition, in FIG. 4A and FIG. 4B, the motion acceleration vector α produced when the vehicle 300 moves forward and the composite acceleration vector β are indicated by the solid arrows, and the motion acceleration vector α produced when the vehicle 300 reduces its speed or moves backward and the composite acceleration vector β are indicated by the dashed arrows. FIG. 5 is a graph illustrating the relationship between the acceleration in the front-and-back direction of the vehicle and the acceleration in the top-and-bottom direction of the vehicle. It is to be noted that, in the following description, the reference numeral "110" in FIG. 4A and FIG. 4B is replaced with the reference numeral "3110," and the reference character "L" is replaced with the reference character "$V_X$".

The vehicle 300 moves parallel to the road surface. Thus, the motion acceleration vector α is a vector parallel to the road surface regardless of the vehicle attitude angle θv. In addition, as illustrated in FIG. 4A, when the vehicle attitude angle θv of the vehicle 300 is 0°, theoretically, the front-and-back axis $V_X$ of the vehicle 300 and the X-axis $S_X$ of the acceleration sensor 3110 are parallel to the road surface. Thus, the motion acceleration vector α is a vector parallel to the front-and-back axis $V_X$ of the vehicle 300. Thus, when the magnitude of the motion acceleration vector α changes in association with the acceleration and deceleration of the vehicle 300, the trajectory of the leading end of the composite acceleration vector β detected by the acceleration sensor 3110 is a straight line parallel to the front-and-back axis $V_X$ of the vehicle 300.

Meanwhile, as illustrated in FIG. 4B, when the vehicle attitude angle θv is not 0°, the front-and-back axis $V_X$ of the vehicle 300 is inclined relative to the road surface, and thus the motion acceleration vector α is a vector extending diagonally relative to the front-and-back axis $V_X$ of the vehicle 300. Then, the trajectory of the leading end of the composite acceleration vector β obtained when the magnitude of the motion acceleration vector α changes in association with the acceleration or deceleration of the vehicle 300 is a straight line inclined relative to the front-and-back axis $V_X$ of the vehicle 300.

When the output values from the acceleration sensor 3110 obtained while the vehicle is traveling are plotted onto the coordinates in which the acceleration in the front-and-back direction of the vehicle is set in a first axis (X-axis) and the acceleration in the top-and-bottom direction of the vehicle is set in a second axis (Z-axis), the result illustrated in FIG. 5 can be obtained. In FIG. 5, points $t_{A1}$ to $t_{An}$ are the detection values at times $t_1$ to $t_n$ in the state illustrated in FIG. 4A. Points $t_{B1}$ to $t_{Bn}$ are the detection values at times $t_1$ to $t_n$ in the state illustrated in FIG. 4B. Plotting these output values includes plotting the acceleration values on the vehicle coordinate system obtained from the output values from the acceleration sensor 3110.

The vehicle attitude angle θv can be estimated by deriving either a straight line or a vector from at least two points plotted in this manner and by obtaining the slope of either the straight line or the vector. For example, linear approximation equations A and B are obtained by using the least-squares method, the moving-average method, or the like on the plurality of plotted points $t_{A1}$ to $t_{An}$ and $t_{B1}$ to $t_{Bn}$, and the slopes of the linear approximation equations A and B are calculated. When the vehicle attitude angle θv is 0°, the linear approximation equation A that is parallel to the x-axis can be obtained from the output values from the acceleration sensor 3110. In other words, the slope of the linear approximation equation A is 0. In contrast, when the vehicle attitude angle θv is not 0°, the linear approximation equation B having a slope corresponding to the vehicle attitude angle θv can be obtained from the output values from the acceleration sensor 3110. Thus, the angle formed by the linear approximation equation A and the linear approximation equation B ($θ_{AB}$ in FIG. 5) or the slope of the linear approximation equation B serves as the vehicle attitude angle θv. Therefore, the vehicle attitude angle θv can be estimated from the slope of either a straight line or a vector obtained by plotting the output values from the acceleration sensor 3110 while the vehicle is traveling.

Accordingly, the angle calculating unit 31041 plots the output values from the acceleration sensor 3110 obtained while the vehicle is traveling onto the coordinates in which the acceleration in the front-and-back direction of the vehicle is set in the first axis and the acceleration in the top-and-bottom direction of the vehicle is set in the second axis. Then, the vehicle attitude angle θv is estimated by using the slope of either a straight line or a vector obtained from the plurality of plotted points, and the reference value of the vehicle attitude angle θv is adjusted on the basis of the estimated vehicle attitude angle θv. Alternatively, the estimated vehicle attitude angle θv is stored as a new reference value. With this operation, the reference value of the vehicle attitude angle θv is corrected. In addition, the adjustment instructing unit 31042 generates an adjustment signal for the optical axis angle θo by using the estimated vehicle attitude angle θv or the updated new reference value of the vehicle attitude angle θv. The adjustment signal is output from the transmission unit 3106 to the leveling actuator 226. Thus, the optical axis angle θo is corrected. Thereafter, the basic control described above is restarted with the corrected or updated vehicle attitude angle θv serving as the reference value of the vehicle attitude angle θv and with the road surface angle θr obtained from the current total angle θ and the stated reference value of the vehicle attitude angle θv serving as the reference value of the road surface angle θr (thus, the reference value of the road surface angle θr is corrected).

For example, the angle calculating unit 31041 starts the correction processing upon determining that the vehicle 300 is traveling on the basis of the output value from the vehicle-speed sensor 312. In the correction processing, the output value from the acceleration sensor 3110 is transmitted to the control unit 3104 repeatedly at a predetermined time interval. The output value from the acceleration sensor 3110 transmitted to the control unit 3104 is stored into the RAM or the memory 3108. Then, the angle calculating unit 31041 plots the output values from the acceleration sensor 3110 onto the coordinates described above and derives either a straight line or a vector when the number of the output values has reached a predetermined number required for a single instance of deriving either a straight line or a vector. Alternatively, the angle calculating unit 31041 may plot the output value onto the coordinates each time the angle calculating unit 31041 receives an output value from the acceleration sensor 3110 and may derive either a straight line or a vector when the number of plotted output values has reached a predetermined number.

Fault Determination of Acceleration Sensor 3110

The fault determining unit 31043 determines whether a fault has occurred in the acceleration sensor 3110 by comparing the acceleration derived from the output value from the vehicle-speed sensor 312 (hereinafter, this acceleration is referred to as the vehicle-speed-sensor-derived acceleration, as appropriate) and the acceleration in the front-and-back direction of the vehicle derived from the output value from the acceleration sensor 3110 (hereinafter, this acceleration is referred to as the acceleration-sensor-derived acceleration, as appropriate) obtained while the vehicle is traveling, or in other words, on the basis of the difference between these accelerations.

Figure 16A:
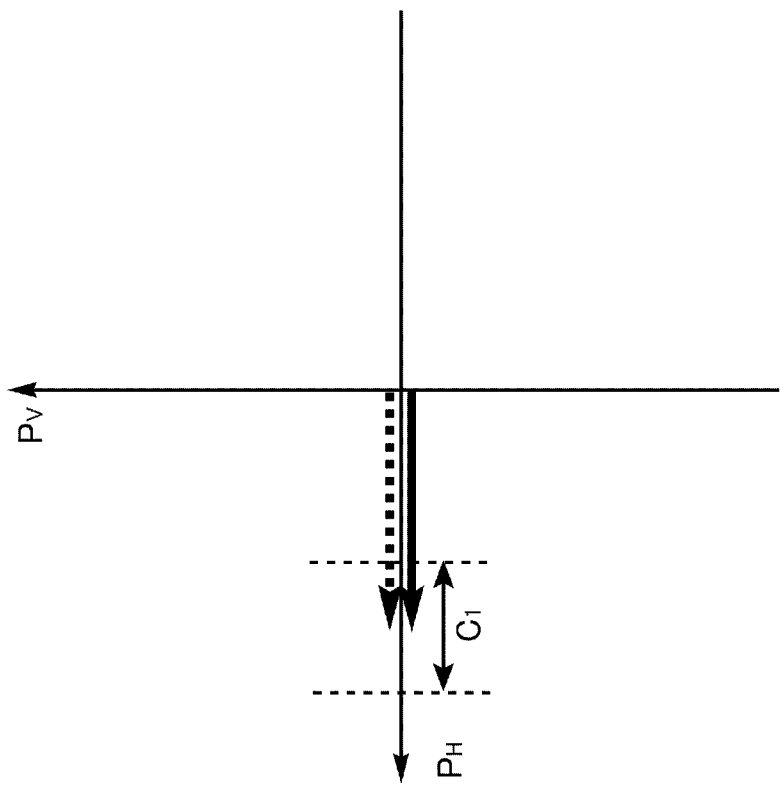
FIG. 16A and FIG. 16B are schematic diagrams for describing a fault determination of an acceleration sensor by a fault determining unit according to Embodiment 4.
Figure 16B:
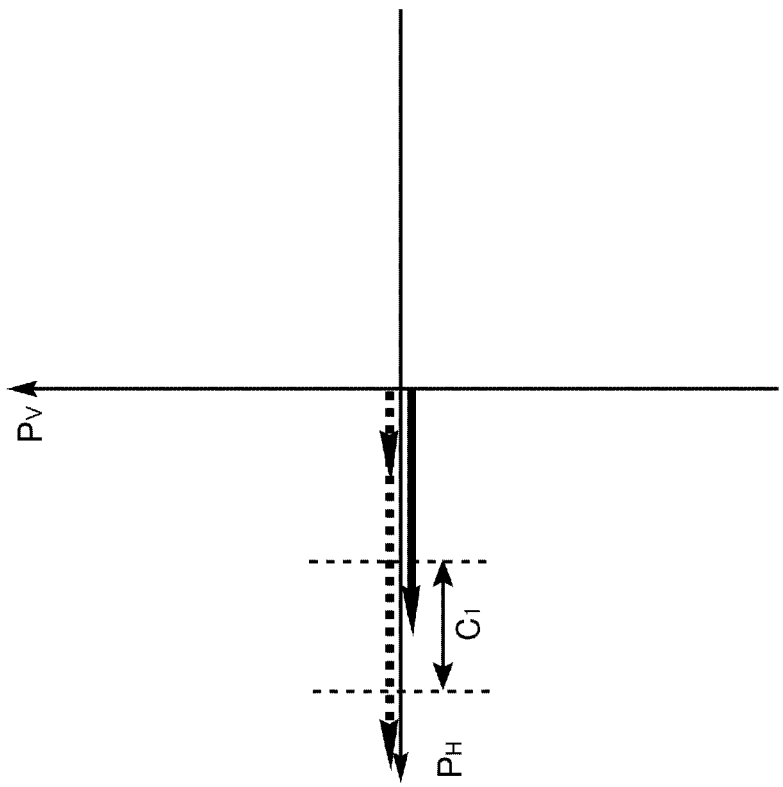

FIG. 16A and FIG. 16B are schematic diagrams for describing a fault determination of the acceleration sensor by the fault determining unit. In FIG. 16A and FIG. 16B, the horizontal axis is the road surface horizontal axis $P_H$ parallel to the road surface on which the vehicle 300 is located, and the top-and-bottom axis is the road surface top-and-bottom axis $P_V$ perpendicular to the road surface on which the vehicle 300 is located. In addition, the solid arrows represent the vectors of the vehicle-speed-sensor-derived acceleration, and the dashed arrows represent the vectors of the acceleration-sensor-derived acceleration.

Upon receiving a signal indicating the speed of the vehicle 300 from the vehicle-speed sensor 312, the fault determining unit 31043 obtains the vehicle-speed-sensor-derived acceleration by differentiating the vehicle speed with respect to time. In addition, the fault determining unit 31043 uses, as the acceleration-sensor-derived acceleration, the value of the component along the front-and-back direction of the vehicle in the output value from the acceleration sensor 3110 plotted on the coordinates in the correction processing described above. FIG. 16A illustrates the vehicle-speed-sensor-derived acceleration and the acceleration-sensor-derived acceleration derived in a situation in which the vehicle 300 of which the vehicle attitude angle θv is 0° is traveling on a horizontal road surface. In this case, if the acceleration sensor 3110 is working normally, the magnitude of the vehicle-speed-sensor-derived acceleration and the magnitude of the acceleration-sensor-derived acceleration coincide with each other. Therefore, if the vehicle attitude angle θv is 0° and the road surface angle θr is 0°, a fault of the acceleration sensor 3110 can be determined on the basis of whether the two accelerations coincide with each other.

However, the motion acceleration vector α is parallel to the road surface, and thus the vector of the vehicle-speed-sensor-derived acceleration is parallel to the road surface horizontal axis $P_H$. Meanwhile, the acceleration-sensor-derived acceleration is the acceleration in the front-and-back direction of the vehicle, and the angle of the front-and-back direction of the vehicle, or in other words, the angle of the front-and-back axis $V_X$ of the vehicle 300 relative to the road surface changes with a change in the vehicle attitude angle θv. Therefore, the vector of the acceleration-sensor-derived acceleration is not necessarily parallel to the road surface. Thus, the magnitude of the acceleration-sensor-derived acceleration may differ from the magnitude of the vehicle-speed-sensor-derived acceleration even when the acceleration sensor 3110 is working normally. In addition, the acceleration sensor 3110 detects the composite acceleration vector β in which the gravitational acceleration vector G and the motion acceleration vector α are combined. Thus, the gravitational acceleration is included in the acceleration-sensor-derived acceleration when the front-and-back axis $V_X$ of the vehicle 300 is not parallel to the road surface (that is, when the vehicle attitude angle θv is not 0) and when the road surface is not parallel (that is, when the road surface angle θr is not 0). Thus, the magnitude of the acceleration-sensor-derived acceleration may differ from the magnitude of the vehicle-speed-sensor-derived acceleration even when the acceleration sensor 3110 is working normally.

Thus, the fault determining unit 31043 determines that a fault has occurred in the acceleration sensor 3110 when the difference between the magnitude of the vehicle-speed-sensor-derived acceleration and the magnitude of the acceleration-sensor-derived acceleration exceeds a predetermined permissible range $C_1$. The fault determining unit 31043 may repeat deriving the difference between these magnitudes a plurality times and may determine that a fault has occurred in the acceleration sensor 3110 when the difference between these magnitudes exceeds the permissible range $C_1$ continually a predetermined number of times or more. The permissible range $C_1$ is a range determined on the basis of the amount of change in the acceleration-sensor-derived acceleration associated with a change in the road surface angle θr and the vehicle attitude angle θv. The range of the change in the vehicle attitude angle θv taken into consideration when the permissible range $C_1$ is determined is a possible range of the vehicle attitude angle θv that is allowed by the design of the vehicle 300. In addition, the range of the road surface angle θr taken into consideration when the permissible range $C_1$ is determined is a range of angles of inclination of a typical road and, for example, is ±10%. The permissible range $C_1$ can be set as appropriate on the basis of an experiment or a simulation by the designer.

In the present embodiment, the sensor coordinate system and the vehicle coordinate system coincide with each other. Thus, the acceleration in the front-and-back direction of the vehicle is the acceleration in the direction of the X-axis $S_X$ of the acceleration sensor 3110. Thus, when the difference between the magnitude of the vehicle-speed-sensor-derived acceleration and the acceleration-sensor-derived acceleration exceeds the permissible range $C_1$, a fault that has occurred in the X-axis $S_X$ of the acceleration sensor 3110 can be detected.

The fault determining unit 31043 starts a fault determination of the acceleration sensor 3110, upon determining that the vehicle 300 is traveling on the basis of the output value from the vehicle-speed sensor 312, for example. Then, the fault determining unit 31043 periodically executes the fault determination while the vehicle is traveling. In this manner, as the fault determination is executed periodically, a fault of the acceleration sensor 3110 can be found more promptly. Upon detecting a fault of the acceleration sensor 3110, the fault determining unit 31043 transmits a fault occurrence signal to the adjustment instructing unit 31042 and the vehicle control ECU 302.

Upon receiving a fault occurrence signal from the fault determining unit 31043, the adjustment instructing unit 31042 fixes the optical axis angle θo to a current angle or to a predetermined reference angle. Examples of the reference angle include an initial angle and a safe angle. The initial angle is an angle set in the attitude of the vehicle 300 in the initialization processing described above (the attitude in the referential state), or in other words, the optical axis angle corresponding to θv=0°. The safe angle is an optical axis angle at which glare caused to others is reduced. The safe angle can be an optical axis angle that aims more downward than the horizontal plane, or for example, that aims in the most downward direction. To which angle the reference angle is set can be determined, as appropriate, from the viewpoint of suppressing glare caused to drivers of other vehicles and improving visibility of the driver of the vehicle. For example, the initial angle is suitable for the reference angle when reduction of glare and improvement of visibility are both taken into consideration. In addition, when reduction of glare takes priority, the safe angle is suitable for the reference angle. The vehicle control ECU 302 turns on an indicator upon receiving a fault occurrence signal. Thus, the user of the vehicle 300 is informed of a fault of the acceleration sensor 3110.

Figure 17:
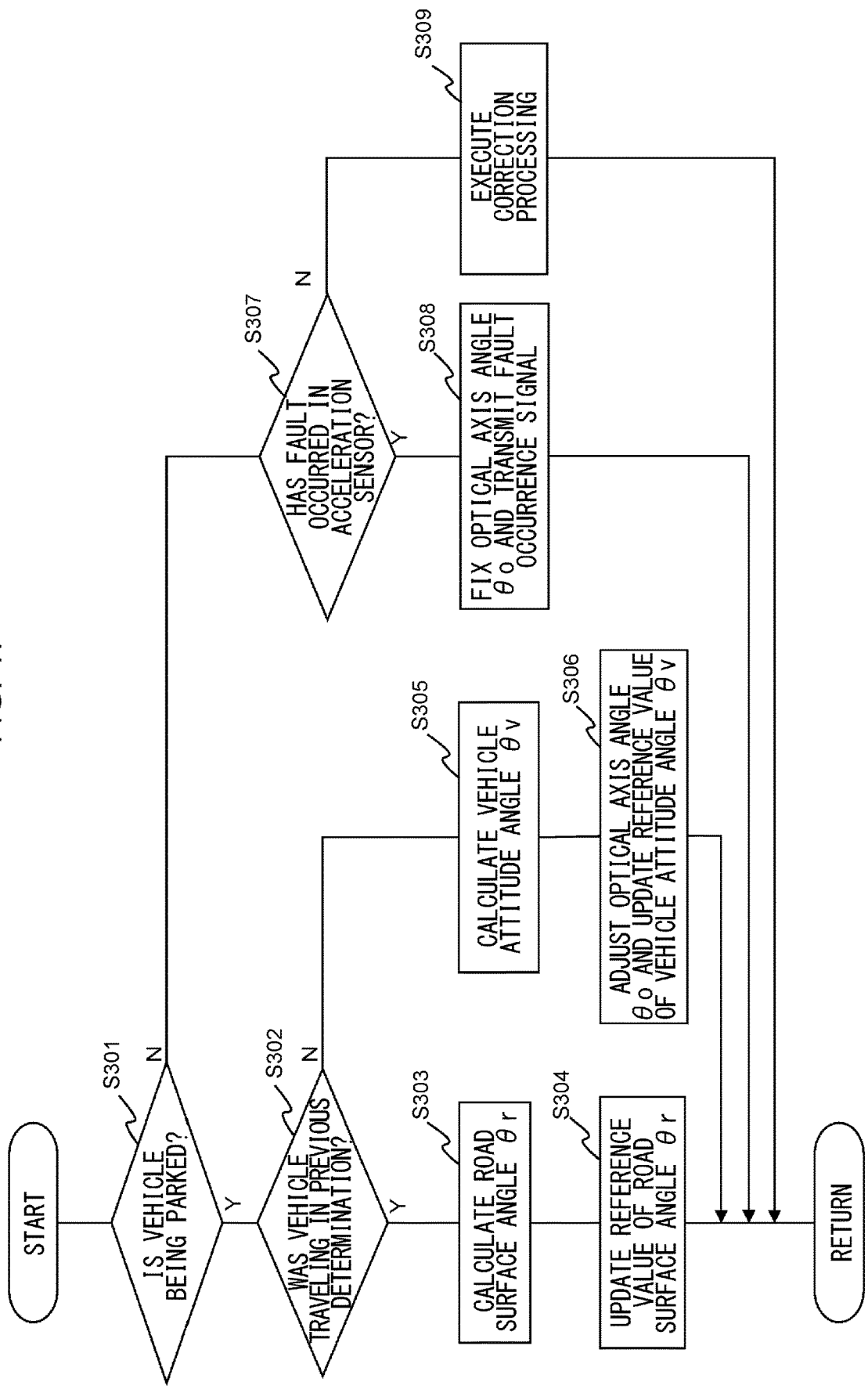
FIG. 17 is a flowchart illustrating an example of self-leveling control executed by a control device for a vehicle lamp according to Embodiment 4.

FIG. 17 is a flowchart illustrating an example of self-leveling control executed by the control device for a vehicle lamp according to Embodiment 4. This flow is executed repeatedly at a predetermined timing by the control unit 3104, for example, when the light switch 304 has instructed an execution of the self-leveling control and the ignition is on and is terminated when the instruction to execute the self-leveling control is released (or the termination is instructed) or the ignition is turned off.

The control unit 3104 determines whether the vehicle 300 is being parked (S301). If the vehicle 300 is being parked (Y in S301), the control unit 3104 determines whether the vehicle 300 was traveling (N in S301) in the parking determination in step S301 in the previous instance of the routine (S302). If the vehicle was traveling in the previous instance of determination (Y in S302), which means the case "when the vehicle is stopping," the control unit 3104 calculates the road surface angle θr by subtracting the reference value of the vehicle attitude angle θv from the current total angle θ (S303). Then, the new reference value of the road surface angle θr is updated with the obtained road surface angle θr (S304), and the routine is terminated.

If the vehicle was not traveling in the previous instance of determination (N in S302), which means the case "while the vehicle is at rest," the control unit 3104 calculates the vehicle attitude angle θv by subtracting the reference value of the road surface angle θr from the current total angle θ (S305). Then, the optical axis angle θo is adjusted by using the obtained vehicle attitude angle θv, the new reference value is updated with the obtained vehicle attitude angle θv (S306), and the routine is terminated.

If the vehicle 300 is not being parked, or in other words, if the vehicle 300 is traveling (N in S301), the control unit 3104 executes the fault determination of the acceleration sensor 3110 that uses the vehicle-speed-sensor-derived acceleration and determines whether a fault has occurred in the acceleration sensor 3110 (S307). If a fault has occurred in the acceleration sensor 3110 (Y in S307), the control unit 3104 fixes the optical axis angle θo to a current angle or a predetermined reference angle, transmits a fault occurrence signal to the vehicle control ECU 302 (S308), and terminates the routine. In addition, the control unit 3104 stops the execution of the flow thereafter.

If no fault has occurred in the acceleration sensor 3110 (N in S307), the control unit 3104 executes the correction processing that uses the output value from the acceleration sensor 3110 while the vehicle is traveling (S309). In the correction processing, the control unit 3104 estimates the vehicle attitude angle θv, corrects the optical axis angle θo by using the estimated vehicle attitude angle θv, and updates a new reference value with the estimated vehicle attitude angle θv. Then, the control unit 3104 terminates the routine.

As described thus far, the leveling ECU 3100 according to the present embodiment includes the fault determining unit 31043 that determines a fault of the acceleration sensor 3110. Then, the fault determining unit 31043 determines a fault of the acceleration sensor 3110 on the basis of the difference between the acceleration derived from the output value from the vehicle-speed sensor 312 and the acceleration in the front-and-back direction of the vehicle derived from the output value from the acceleration sensor 3110 obtained while the vehicle is traveling. Thus, a fault of the acceleration sensor 3110 can be found, which can thus suppress execution of the self-leveling control that uses the acceleration sensor 3110 in which a fault has occurred. Accordingly, the accuracy of the self-leveling control can be increased. In addition, the vehicle-speed-sensor-derived acceleration changes frequently, and thus the fault determination of the acceleration sensor 3110 can be executed with ease and with high accuracy.

Embodiment 5

A leveling ECU 3100 according to Embodiment 5 has a configuration common to that of the leveling ECU 3100 according to Embodiment 4 except in the posture at which the leveling ECU 3100 is mounted in the vehicle 300. Hereinafter, the leveling ECU 3100 according to Embodiment 5 will be described with the description centered on the configuration different from that of Embodiment 4.

Figure 18:
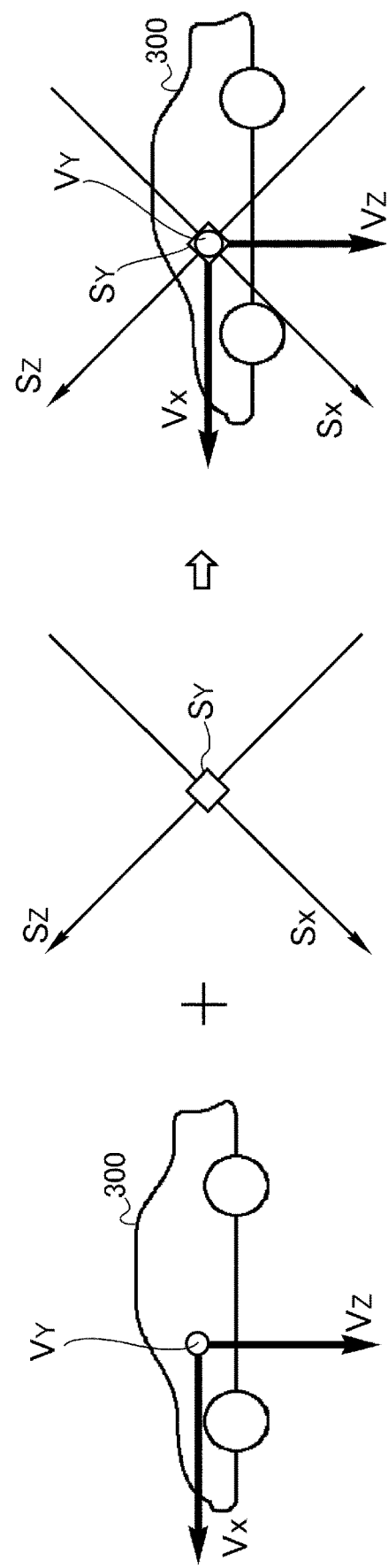
FIG. 18 is a schematic diagram for describing a relationship between a sensor coordinate system and a vehicle coordinate system according to Embodiment 5.

FIG. 18 is a schematic diagram for describing a relationship between the sensor coordinate system and the vehicle coordinate system according to Embodiment 5. In FIG. 18, the diagram on the left side illustrates the vehicle coordinate system, the diagram in the middle illustrates the sensor coordinate system, and the diagram on the right side illustrates the sensor coordinate system and the vehicle coordinate system in a state in which the acceleration sensor 3110 is mounted in the vehicle 300.

In the present embodiment, the posture of the acceleration sensor 3110 relative to the vehicle 300 is set such that the X-axis $S_X$ and the front-and-back axis $V_X$ of the vehicle 300 are nonparallel to each other and the Z-axis $S_Z$ and the top-and-bottom axis $V_Z$ of the vehicle 300 are nonparallel to each other. In this case, in the self-leveling control and the fault determination of the acceleration sensor 3110, the control unit 3104 needs to convert the components along the three axes output from the acceleration sensor 3110 to the components along the three axes of the vehicle 300. In order to convert the axial components of the acceleration sensor 3110 to the axial components of the vehicle 300, the referential axial information that indicates the positional relationship among the axes of the acceleration sensor 3110 mounted in the vehicle 300, the axes of the vehicle 300, and the road surface angle is needed. Thus, the control unit 3104 generates the referential axial information in the following manner, for example.

First, the vehicle 300 is set in the referential state described in Embodiment 4 (hereinafter, this referential state is referred to as a first referential state, as appropriate). Then, in the initialization processing, the control unit 3104 records the output value from the acceleration sensor 3110 in the first referential state into a RAM or a memory 3108 in the form of a first referential vector S1=(X1, Y1, Z1). Next, the vehicle 300 is set in a second state that differs from the first state only in the pitch angle of the vehicle 300. The vehicle 300 can be brought into the second state, for example, by placing a load on the front portion or the back portion of the vehicle 300 that is in the first state. The control unit 3104 records the output value from the acceleration sensor 3110 obtained when the vehicle 300 is in the second state into the RAM or the memory 3108 in the form of a second referential vector S2=(X2, Y2, Z2).

The positional relationship between the axes of the acceleration sensor and the referential road surface is mapped, and the difference between the Z-axis $S_Z$ of the acceleration sensor 3110 and the top-and-bottom axis $V_Z$ of the vehicle 300 can be grasped by acquiring the first referential vector S1. In addition, the difference between the front-and-back axis $V_X$ and the X-axis $S_X$ and the difference between the right-and-left axis $V_Y$ and the Y-axis $S_Y$ can be grasped from the changes in the components of the second referential vector S2 relative to the first referential vector S1. Thus, the positional relationship between the axes of the acceleration sensor and the axes of the vehicle is mapped, and the positional relationship among the axes of the acceleration sensor, the axes of the vehicle, and the referential road surface is mapped as a result. The control unit 3104 records, as the referential axial information, a conversion table that maps the numerical values of the axial components in the output value from the acceleration sensor 3110 (including the numerical values of the referential road surface) to the numerical values of the respective axial components of the vehicle 300 into the memory 3108. The numerical values of the components along the X-axis $S_X$, the Y-axis $S_Y$, and the Z-axis $S_Z$ output from the acceleration sensor 3110 are converted to the components along the front-and-back axis $V_X$, the right-and-left axis $V_Y$, and the top-and-bottom axis $V_Z$ of the vehicle 300 by the angle calculating unit 31041 with the use of the conversion table.

In this manner, in the present embodiment, the X-axis $S_X$ and the front-and-back axis $V_X$ are nonparallel to each other, and the Z-axis $S_Z$ and the top-and-bottom axis $V_Z$ are nonparallel to each other. Therefore, the acceleration-sensor-derived acceleration used in the fault determination of the acceleration sensor 3110, or in other words, the acceleration in the front-and-back direction of the vehicle is derived on the basis of the component on the X-axis $S_X$ and the component on the Z-axis $S_Z$ in the output value from the acceleration sensor 3110. Thus, when the difference between the magnitude of the vehicle-speed-sensor-derived acceleration and the acceleration-sensor-derived acceleration exceeds the permissible range $C_1$, a fault that has occurred in either the X-axis $S_X$ or the Z-axis $S_Z$ of the acceleration sensor 3110 can be detected. Therefore, according to the present embodiment, the number of axes on which a determination is made in the fault determination of the acceleration sensor 3110 can be increased, and thus the accuracy of the self-leveling control can be further increased.

Embodiment 6

A leveling ECU 3100 according to Embodiment 6 has a configuration common to that of the leveling ECU 3100 according to Embodiment 4 except in that the gravitational acceleration, in place of the vehicle-speed-sensor-derived acceleration, is used in the fault determination of the acceleration sensor 3110. Hereinafter, the leveling ECU 3100 according to Embodiment 6 will be described with the description centered on the configuration different from that of Embodiment 4.

In the leveling ECU 3100 according to the present embodiment, the fault determining unit 31043 determines whether a fault has occurred in the acceleration sensor 3110 by comparing the gravitational acceleration at a position where the vehicle 300 is present and the acceleration in the top-and-bottom direction of the vehicle derived from the output value from the acceleration sensor 3110 (hereinafter, this acceleration is referred to as the acceleration-sensor-derived acceleration, as appropriate), or in other words, on the basis of the difference between these accelerations.

Figure 19A:
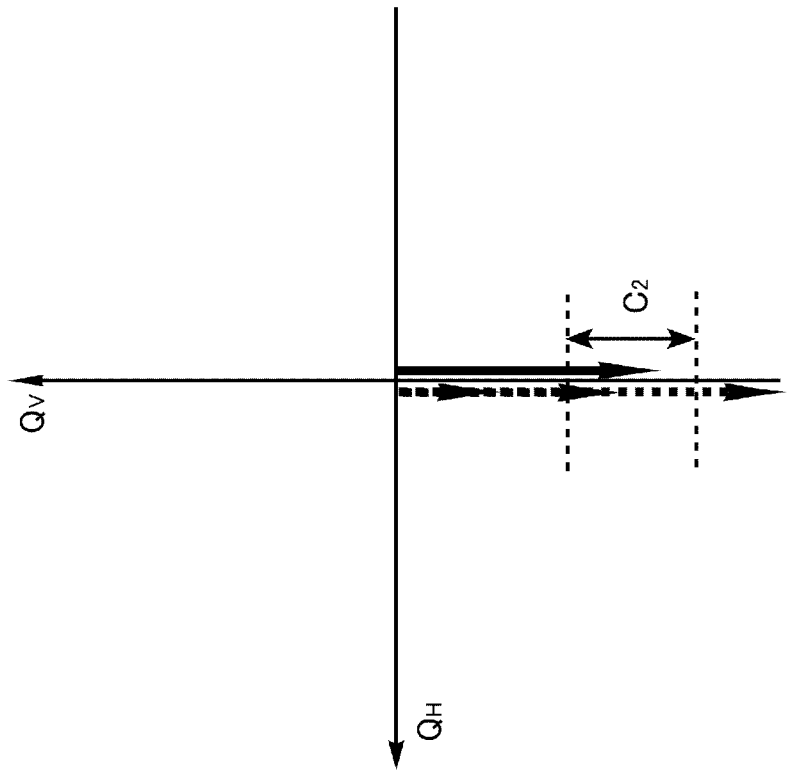
FIG. 19A and FIG. 19B are schematic diagrams for describing a fault determination of an acceleration sensor by a fault determining unit according to Embodiment 6.
Figure 19B:
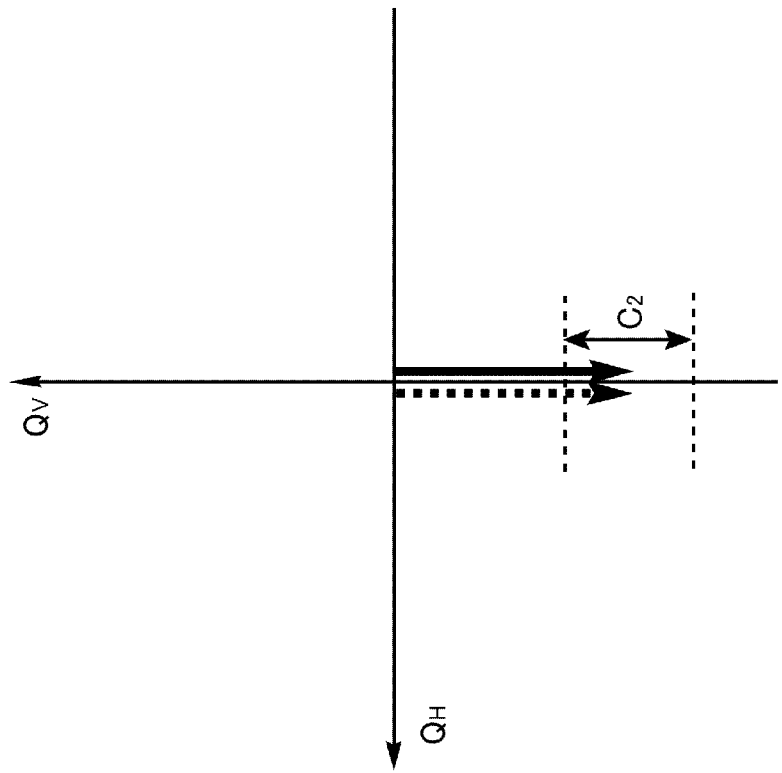

FIG. 19A and FIG. 19B are schematic diagrams for describing a fault determination of the acceleration sensor by the fault determining unit according to Embodiment 6. In FIG. 19A and FIG. 19B, the top-and-bottom axis is the top-and-bottom axis $Q_V$ parallel to the top-and-bottom direction at a position where the vehicle 300 is present, and the horizontal axis is the horizontal axis $Q_H$ parallel to the horizontal direction at the position where the vehicle 300 is present. In addition, the solid arrows represent the vectors of the gravitational acceleration, and the dashed arrows represent the vectors of the acceleration-sensor-derived acceleration.

The fault determining unit 31043 uses, as the acceleration-sensor-derived acceleration, the value of the component in the top-and-bottom direction of the vehicle in the output value from the acceleration sensor 3110 plotted on the coordinates in the correction processing described above. FIG. 19A illustrates the gravitational acceleration and the acceleration-sensor-derived acceleration derived in a situation in which the vehicle 300 of which the vehicle attitude angle θv is 0° is located on a horizontal road surface. In this case, if the acceleration sensor 3110 is working normally, the magnitude of the gravitational acceleration and the magnitude of the acceleration-sensor-derived acceleration coincide with each other. Therefore, if the vehicle attitude angle θv is 0° and the road surface angle θr is 0°, a fault of the acceleration sensor 3110 can be determined on the basis of whether the two accelerations coincide with each other.

However, the gravitational acceleration is parallel to the top-and-bottom direction, and thus the vector of the gravitational acceleration is parallel to the top-and-bottom axis $Q_V$. Meanwhile, the acceleration-sensor-derived acceleration is the acceleration in the top-and-bottom direction of the vehicle, and the angle of the top-and-bottom direction of the vehicle, or in other words, the angle of the top-and-bottom axis $V_Z$ of the vehicle 300 relative to the top-and-bottom direction changes with a change in the vehicle attitude angle θv. Therefore, the vector of the acceleration-sensor-derived acceleration is not necessarily parallel to the top-and-bottom direction. Thus, the magnitude of the acceleration-sensor-derived acceleration may differ from the magnitude of the gravitational acceleration even when the acceleration sensor 3110 is working normally. In addition, the acceleration sensor 3110 detects the composite acceleration vector β in which the gravitational acceleration vector G and the motion acceleration vector α are combined while the vehicle is traveling. Thus, when the top-and-bottom axis $V_Z$ of the vehicle 300 is not parallel to the top-and-bottom direction and when the road surface is not horizontal, the motion acceleration is included in the acceleration-sensor-derived acceleration. Thus, the magnitude of the acceleration-sensor-derived acceleration may differ from the magnitude of the gravitational acceleration even when the acceleration sensor 3110 is working normally.

Thus, the fault determining unit 31043 determines that a fault has occurred in the acceleration sensor 3110 when the difference between the magnitude of the gravitational acceleration and the magnitude of the acceleration-sensor-derived acceleration exceeds a predetermined permissible range $C_2$. The permissible range $C_2$ is a range determined on the basis of the amount of change in the acceleration-sensor-derived acceleration associated with a change in the road surface angle θr, a change in the vehicle attitude angle θv, and a change in the motion acceleration produced in the vehicle 300. The range of the change in the vehicle attitude angle θv taken into consideration when the permissible range $C_2$ is determined is a possible range of the vehicle attitude angle $\theta v$ that is allowed by the design of the vehicle 300. In addition, the range of the road surface angle $\theta r$ taken into consideration when the permissible range $C_2$ is determined is a range of the angle of inclination of a typical road and, for example, is ±10%. In addition, the range of the magnitude of the motion acceleration taken into consideration when the permissible range $C_2$ is determined is a range of the motion acceleration that can be produced in the vehicle 300 by the design. The permissible range $C_2$ can be set as appropriate on the basis of an experiment or a simulation by the designer.

In the present embodiment, the sensor coordinate system and the vehicle coordinate system coincide with each other. Thus, the acceleration in the top-and-bottom direction of the vehicle is the acceleration in the direction of the Z-axis $S_Z$ of the acceleration sensor 3110. Thus, when the difference between the magnitude of the gravitational acceleration and the magnitude of the acceleration-sensor-derived acceleration exceeds the permissible range $C_2$, a fault that has occurred in the Z-axis $S_Z$ of the acceleration sensor 3110 can be detected.

It is preferable that the fault determination of the acceleration sensor 3110 be executed while the vehicle is at rest. Thus, a change in the acceleration-sensor-derived acceleration associated with the motion acceleration can be excluded, and thus the accuracy of the fault determination of the acceleration sensor 3110 can be increased. In this case, the fault determining unit 31043 starts the fault determination of the acceleration sensor 3110, upon determining that the vehicle 300 is at rest on the basis of the output value from the vehicle-speed sensor 312, for example. Then, the fault determining unit 31043 periodically executes the fault determination while the vehicle is at rest. Upon detecting a fault of the acceleration sensor 3110, the fault determining unit 31043 transmits a fault occurrence signal to the adjustment instructing unit 31042 and the vehicle control ECU 302.

FIG. 20 is a flowchart illustrating an example of self-leveling control executed by the control device for a vehicle lamp according to Embodiment 6. The execution timing of this flow is similar to that of Embodiment 4 (FIG. 17).

The control unit 3104 determines whether the vehicle 300 is being parked (S401). If the vehicle 300 is being parked (Y in S401), the control unit 3104 determines whether the vehicle 300 was traveling (N in S401) in the parking determination in step S401 in the previous instance of the routine (S402). If the vehicle was traveling in the previous instance of determination (Y in S402), the control unit 3104 calculates the road surface angle $\theta r$ by subtracting the reference value of the vehicle attitude angle $\theta v$ from the current total angle $\theta$ (S403). Then, the new reference value of the road surface angle $\theta r$ is updated with the obtained road surface angle $\theta r$ (S404), and the routine is terminated.

If the vehicle was not traveling in the previous instance of determination (N in S402), the control unit 3104 executes the fault determination of the acceleration sensor 3110 that uses the gravitational acceleration and determines whether a fault has occurred in the acceleration sensor 3110 (S405). If a fault has occurred in the acceleration sensor 3110 (Y in S405), the control unit 3104 fixes the optical axis angle $\theta o$ to a current angle or a predetermined reference angle, transmits a fault occurrence signal to the vehicle control ECU 302 (S406), and terminates the routine. In addition, the control unit 3104 stops the execution of the flow thereafter.

If no fault has occurred in the acceleration sensor 3110 (N in S405), the control unit 3104 calculates the vehicle attitude angle $\theta v$ by subtracting the reference value of the road surface angle $\theta r$ from the current total angle $\theta$ (S407). Then, the optical axis angle $\theta o$ is adjusted by using the obtained vehicle attitude angle $\theta v$, the new reference value is updated with the obtained vehicle attitude angle $\theta v$ (S408), and the routine is terminated. If the vehicle 300 is not being parked, or in other words, if the vehicle 300 is traveling (N in S401), the control unit 3104 executes the correction processing that uses the output value from the acceleration sensor 3110 while the vehicle is traveling (S409) and terminates the routine.

As described thus far, in the leveling ECU 3100 according to the present embodiment, the fault determining unit 31043 determines a fault of the acceleration sensor 3110 on the basis of the difference between the gravitational acceleration and the acceleration in the top-and-bottom direction of the vehicle derived from the output value from the acceleration sensor 3110. With this operation, a fault of the acceleration sensor 3110 can be found, which can thus suppress execution of the self-leveling control that uses the acceleration sensor 3110 in which a fault has occurred. Accordingly, the accuracy of the self-leveling control can be increased.

Embodiment 7

A leveling ECU 3100 according to Embodiment 7 has a configuration common to that of the leveling ECU 3100 according to Embodiment 6 except in the posture at which the leveling ECU 3100 is mounted in the vehicle 300. Hereinafter, the leveling ECU 3100 according to Embodiment 7 will be described with the description centered on the configuration different from that of Embodiment 6.

In the present embodiment, the posture of the acceleration sensor 3110 relative to the vehicle 300 is set such that the X-axis $S_X$ and the front-and-back axis $V_X$ of the vehicle 300 are nonparallel to each other and the Z-axis $S_Z$ and the top-and-bottom axis $V_Z$ of the vehicle 300 are nonparallel to each other (refer to FIG. 18). Therefore, in the present embodiment, the control unit 3104 has referential axial information, as in Embodiment 5. The numerical values of the components on the X-axis $S_X$, the Y-axis $S_Y$, and the Z-axis $S_Z$ output from the acceleration sensor 3110 are converted to the components on the front-and-back axis $V_X$, the right-and-left axis $V_Y$, and the top-and-bottom axis $V_Z$ of the vehicle 300 by the angle calculating unit 31041 with the use of the referential axial information.

In the present embodiment, the X-axis $S_X$ and the front-and-back axis $V_X$ are not parallel to each other, and the Z-axis $S_Z$ and the top-and-bottom axis $V_Z$ are not parallel to each other. Therefore, the acceleration-sensor-derived acceleration, or in other words, the acceleration in the top-and-bottom direction of the vehicle is derived on the basis of the component on the X-axis $S_X$ and the component on the Z-axis $S_Z$ in the output value from the acceleration sensor 3110. Thus, when the difference between the magnitude of the gravitational acceleration and the magnitude of the acceleration-sensor-derived acceleration exceeds the permissible range $C_2$, a fault that has occurred in either the X-axis $S_X$ or the Z-axis $S_Z$ of the acceleration sensor 3110 can be detected. Therefore, according to the present embodiment, the number of axes on which a determination is made in the fault determination of the acceleration sensor 3110 can be increased, and thus the accuracy of the self-leveling control can be further increased.

The present invention is not limited to Embodiments 4 to 7 described above. It is also possible to combine Embodiments 4 to 7, or modifications, including various design changes, can be made on the basis of the knowledge of a person skilled in the art, and an embodiment obtained through such combinations or added modifications is also encompassed by the scope of the present invention. A new embodiment conceived of by combining Embodiments 4 to 7 described above or by combining Embodiments 4 to 7 described above with a modification has effects of each of the combined embodiments and modifications.

In Embodiments 4 to 7, as the self-leveling control, the basic control of adjusting the optical axis with respect to a change in the total angle θ while the vehicle is at rest and of maintaining the optical axis angle with respect to a change in the total angle θ while the vehicle is traveling and the correction processing carried out by using the slope of either a straight line or the like derived from the output value from the acceleration sensor 3110 while the vehicle is traveling are executed. However, the configuration is not particularly limited to such a configuration, and the leveling ECU 3100 may execute only the basic control or may execute only the correction processing as the basic control.

The fault determination of the acceleration sensor 3110 that uses the vehicle-speed-sensor-derived acceleration is executed in Embodiments 4 and 5, and the fault determination of the acceleration sensor 3110 that uses the gravitational acceleration is executed in Embodiments 6 and 7. However, the configuration is not particularly limited to such configurations, and the leveling ECU 3100 may execute both the fault determination that uses the vehicle-speed-sensor-derived acceleration and the fault determination that uses the gravitational acceleration. In this case, a fault of the acceleration sensor 3110 may be determined by combining the determination results of the two.

In Embodiments 5 and 7, the Y-axis $S_Y$ and the right-and-left axis $V_Y$ are parallel to each other, but the Y-axis $S_Y$ and the right-and-left axis $V_Y$ may be nonparallel to each other. With this configuration, the fault determination can be carried out on the three axes of the acceleration sensor 3110. In other words, the X-axis $S_X$ and the front-and-back axis $V_X$ of the vehicle 300 are made nonparallel to each other in the fault determination that uses the vehicle-speed-sensor-derived acceleration, and at least either the Y-axis $S_Y$ and the right-and-left axis $V_Y$ of the vehicle 300 or the Z-axis $S_Z$ and the top-and-bottom axis $V_Z$ of the vehicle 300 are made nonparallel to each other. Thus, the determination target in the fault determination can be broadened as compared to a case in which the sensor coordinate system and the vehicle coordinate system are made to coincide with each other. In addition, the Z-axis $S_Z$ and the top-and-bottom axis $V_Z$ of the vehicle 300 are made nonparallel to each other in the fault determination that uses the gravitational acceleration, and at least either the X-axis $S_X$ and the front-and-back axis $V_X$ of the vehicle 300 or the Y-axis $S_Y$ and the right-and-left axis $V_Y$ of the vehicle 300 are made nonparallel to each other. Thus, the determination target in the fault determination can be broadened as compared to a case in which the sensor coordinate system and the vehicle coordinate system are made to coincide with each other.

In Embodiments 4 and 5, the leveling ECU 3100 may include the coordinates constituted by the road surface horizontal axis $P_H$ and the road surface top-and-bottom axis $P_V$ (refer to FIG. 16A and FIG. 16B) and execute the fault determination of the acceleration sensor 3110 by using these coordinates. In this case, the output values from the acceleration sensor 3110 are plotted on these coordinates, and the magnitude of the component along the road surface horizontal axis and the magnitude of the vehicle-speed-sensor-derived acceleration in the plotted output values are compared. The control unit 3104 generates the stated coordinates by using the output value from the acceleration sensor 3110 in the vehicle 300 that is in the referential state (first referential state) in the initialization processing described above. In addition, the control unit 3104 reflects the amount of change in the road surface angle θr onto the stated coordinates. Thus, the accuracy of the fault determination of the acceleration sensor 3110 can be further increased.

In a similar manner, in Embodiments 6 and 7, the leveling ECU 3100 may include the coordinates constituted by the horizontal axis $Q_H$ and the top-and-bottom axis $Q_V$ (refer to FIG. 19A and FIG. 19B) and execute the fault determination of the acceleration sensor 3110 by using these coordinates. In this case, the output values from the acceleration sensor 3110 are plotted onto these coordinates, and the magnitude of the component along the top-and-bottom axis and the magnitude of the gravitational acceleration in the plotted output values are compared. The control unit 3104 generates the stated coordinates by using the output value from the acceleration sensor 3110 in the vehicle 300 that is in the referential state (first referential state) in the initialization processing described above. In addition, the control unit 3104 reflects the amount of change in the vehicle attitude angle θv and the mount in change in the road surface angle θr onto the stated coordinates. Thus, the accuracy of the fault determination of the acceleration sensor 3110 can be further increased.

It is to be noted that the inventions according to Embodiments 4 to 7 and the modifications described above may be specified by the items described hereinafter.

Item 3

A vehicle lamp system, comprising:
a vehicle lamp with an adjustable optical axis;
a vehicle-speed sensor;
an acceleration sensor; and
a control device that controls an adjustment of an optical axis angle of the vehicle lamp, wherein
the control device includes
a reception unit that receives a signal indicating an output value from the vehicle-speed sensor and an output value from the acceleration sensor, and
a control unit that derives either an angle of inclination of a vehicle or an amount of change in the angle by using the output value from the acceleration sensor and that outputs an adjustment signal for an optical axis angle of the vehicle lamp,
the control unit including a fault determining unit that determines a fault of the acceleration sensor,
the fault determining unit determining the fault of the acceleration sensor on the basis of a difference between an acceleration derived from the output value from the vehicle-speed sensor and an acceleration in a front-and-back direction of the vehicle derived from the output value from the acceleration sensor obtained while the vehicle is traveling.

Item 4

A vehicle lamp system, comprising:
a vehicle lamp with an adjustable optical axis;
an acceleration sensor; and
a control device that controls an adjustment of an optical axis angle of the vehicle lamp, wherein
the control device includes
a reception unit that receives a signal indicating an output value from the acceleration sensor, and
a control unit that derives either an angle of inclination of a vehicle or an amount of change in the angle by using the output value from the acceleration sensor and that outputs an adjustment signal for an optical axis angle of the vehicle lamp, the control unit including a fault determining unit that determines a fault of the acceleration sensor, the fault determining unit determining the fault of the acceleration sensor on the basis of a difference between a gravitational acceleration at a position where the vehicle is present and an acceleration in a top-and-bottom direction of the vehicle derived from the output value from the acceleration sensor.

What is claimed is:

1. A control device for a lamp in a vehicle, the control device comprising:
    a reception unit that receives a signal indicating an output value from a tilt sensor enabled for deriving a total angle, the total angle being an angle of inclination of a vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; and
    a control unit that executes control, the control including:
        storing a road surface angle reference value and a vehicle attitude angle reference value;
    generating an adjustment signal for an optical axis angle of the vehicle lamp in response to a change in the total angle while the vehicle is at rest, and storing a vehicle attitude angle obtained by including an amount of change in the total angle into the vehicle attitude angle reference value as a new reference value; and
    in response to a change in the total angle while the vehicle is traveling, avoiding generation or output of the adjustment signal or outputting a maintaining signal instructing that the optical axis angle be maintained, and storing a road surface angle obtained by including an amount of change in the total angle into the road surface angle reference value as a new reference value, wherein
    the control unit includes a fault detecting unit that detects the control device for the vehicle lamp having entered a fault state and having recovered from the fault state,
    the control unit fixes the optical axis angle to a current angle or a predetermined reference angle when the fault detecting unit detects the control device having entered the fault state, and
    upon the fault detecting unit detecting the control device having recovered from the fault state, either the control unit estimates a current vehicle attitude angle on the basis of the output value from the tilt sensor obtained while the vehicle is traveling, releases the state in which the optical axis angle is fixed, and generates the adjustment signal by using the estimated vehicle attitude angle, or the control unit receives a signal indicating a current vehicle attitude angle from an external device, releases the state in which the optical axis angle is fixed, and generates the adjustment signal by using the received vehicle attitude angle.

2. The control device for a vehicle lamp according to claim 1, wherein
    the tilt sensor is an acceleration sensor capable of detecting an acceleration in a front-and-back direction of the vehicle and an acceleration in a top-and-bottom direction of the vehicle, and
    when estimating the vehicle attitude angle, the control unit plots the output value obtained while the vehicle is traveling onto coordinates in which the acceleration in the front-and-back direction of the vehicle is set in a first axis and the acceleration in the top-and-bottom direction of the vehicle is set in a second axis, and estimates the vehicle attitude angle by using a slope of either a straight line or a vector obtained from a plurality of plotted points.

3. The control device for a vehicle lamp according to claim 2, further comprising:
    a buffer amount changing unit that periodically changes the number of the output value used to derive either the straight line or the vector.

4. A vehicle lamp system, comprising:
    a vehicle lamp with an adjustable optical axis;
    a tilt sensor enabled for deriving a total angle, the total angle being an angle of inclination of a vehicle relative to a horizontal plane, the total angle including a road surface angle and a vehicle attitude angle, the road surface angle being an angle of inclination of a road surface relative to the horizontal plane, the vehicle attitude angle being an angle of inclination of the vehicle relative to the road surface; and
    a control device that controls an adjustment of an optical axis angle of the vehicle lamp, wherein
    the control device includes
        a reception unit that receives a signal indicating an output value from the tilt sensor, and
        a control unit that executes control, the control including: storing a road surface angle reference value and a vehicle attitude angle reference value;
    generating an adjustment signal for an optical axis angle of the vehicle lamp in response to a change in the total angle while the vehicle is at rest, and storing a vehicle attitude angle obtained by including an amount of change in the total angle into the vehicle attitude angle reference value as a new reference value; and
    in response to a change in the total angle while the vehicle is traveling, avoiding generation or output of the adjustment signal or outputting a maintaining signal instructing that the optical axis angle be maintained, and storing a road surface angle obtained by including an amount of change in the total angle into the road surface angle reference value as a new reference value,
    the control unit including a fault detecting unit that detects the control device having entered a fault state and having recovered from the fault state,
    the control unit fixing the optical axis angle to a current angle or a predetermined reference angle when the fault detecting unit detects the control device having entered the fault state,
    upon the fault detecting unit detecting the control device having recovered from the fault state, either the control unit estimating a current vehicle attitude angle on the basis of the output value from the tilt sensor obtained while the vehicle is traveling, releasing the state in which the optical axis angle is fixed, and generating the adjustment signal by using the estimated vehicle attitude angle, or the control unit receiving a signal indicating a current vehicle attitude angle from an external device, releasing the state in which the optical axis angle is fixed, and generating the adjustment signal by using the received vehicle attitude angle.

* * * * *